US012663952B2

(12) United States Patent
Yu et al.

(10) Patent No.: US 12,663,952 B2
(45) Date of Patent: Jun. 23, 2026

(54) SIGNAL PROCESSING DEVICE AND DISPLAY APPARATUS FOR VEHICLE INCLUDING THE SAME

(71) Applicant: LG ELECTRONICS INC., Seoul (KR)

(72) Inventors: Ganghee Yu, Seoul (KR); Kyungjun Shin, Seoul (KR); Soohwan Oh, Seoul (KR); Sangkyeong Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/122,661

(22) PCT Filed: Oct. 21, 2022

(86) PCT No.: PCT/KR2022/016130
§ 371 (c)(1),
(2) Date: Apr. 18, 2025

(87) PCT Pub. No.: WO2024/085284
PCT Pub. Date: Apr. 25, 2024

(65) Prior Publication Data
US 2026/0010331 A1 Jan. 8, 2026

(51) Int. Cl.
*G06F 3/14* (2006.01)
*G06F 9/451* (2018.01)
(Continued)

(52) U.S. Cl.
CPC .......... *G06F 3/1438* (2013.01); *G06F 3/1423* (2013.01); *G06F 9/452* (2018.02);
(Continued)

(58) Field of Classification Search
CPC .... G06F 3/1454; G06F 9/451; G06F 9/45545; G06F 2212/173; G06F 3/1438;
(Continued)

(56) References Cited

U.S. PATENT DOCUMENTS 8,473,958 B2 * 6/2013 Kamay ............... G06F 9/45558
715/740
9,082,239 B2 * 7/2015 Ricci ....................... G06F 21/00
(Continued)

FOREIGN PATENT DOCUMENTS

CN 107809671 A 3/2018
CN 115195621 A 10/2022
(Continued)

*Primary Examiner* — Michael J Jansen, II
(74) *Attorney, Agent, or Firm* — Birch, Stewart, Kolasch & Birch, LLP

(57) ABSTRACT

A signal processing device and a display apparatus including the same are disclosed. The signal processing device includes a processor to perform signal processing, wherein the processor is configured to execute a server virtual machine and a plurality of guest virtual machines on a hypervisor, first and second guest virtual machine operate for first and second display, respectively, the server virtual machine is configured to encode and store processed video data in a shared memory, the first guest virtual machine is configured to receive and decode the encoded video data and store decoded video data in the shared memory, and the second guest virtual machine is configured to receive the decoded video data and display at least a portion of the decoded video data on the second display. Accordingly, it is possible to reduce a delay in displaying images between a plurality of displays.

17 Claims, 35 Drawing Sheets

(51) Int. Cl.

| | |
|---|---|
| *G06F 9/455* | (2018.01) |
| *G09G 5/36* | (2006.01) |
| *G09G 5/393* | (2006.01) |
| *G09G 5/395* | (2006.01) |

(52) U.S. Cl.
CPC .......... *G06F 9/45558* (2013.01); *G06F 9/451* (2018.02); *G06F 9/45545* (2013.01); *G06F 2009/45579* (2013.01); *G06F 2009/45583* (2013.01); *G06F 2212/173* (2013.01); *G09G 5/363* (2013.01); *G09G 5/393* (2013.01); *G09G 5/395* (2013.01); *G09G 2360/121* (2013.01)

(58) Field of Classification Search
CPC .... G06F 3/1423; G06F 9/452; G06F 9/45558; G06F 2009/45579; G06F 2009/45583; G06F 9/455; H04N 19/423; G09G 5/363; G09G 5/393; G09G 5/395; G09G 2360/121
See application file for complete search history.

(56) References Cited

U.S. PATENT DOCUMENTS

| | | | | |
|---|---|---|---|---|
| 9,235,941 | B2 * | 1/2016 | Ricci | G06F 16/951 |
| 9,507,618 | B2 * | 11/2016 | Kamay | G06F 9/45558 |
| 10,552,200 | B2 * | 2/2020 | Franciosi | G06F 9/45558 |
| 10,565,065 | B2 * | 2/2020 | Guzik | G06F 11/1464 |
| 10,860,208 | B2 * | 12/2020 | Narayan | B60K 35/29 |
| 10,891,921 | B2 * | 1/2021 | Mittal | G06F 9/4406 |
| 11,042,341 | B2 * | 6/2021 | Rush | G09G 5/377 |
| 11,330,087 | B2 * | 5/2022 | Wouhaybi | G06F 11/2023 |
| 11,493,975 | B2 * | 11/2022 | Gras | G06F 9/5094 |
| 12,242,880 | B2 * | 3/2025 | Yoon | B60K 35/22 |
| 12,353,899 | B2 * | 7/2025 | Yu | G06F 3/14 |
| 12,466,332 | B2 * | 11/2025 | Yu | G06F 3/1423 |
| 2010/0306306 | A1 * | 12/2010 | Kamay | G06F 9/45558 718/1 |
| 2010/0306771 | A1 * | 12/2010 | Kamay | G06F 9/45558 718/1 |
| 2014/0309806 | A1 * | 10/2014 | Ricci | G06F 21/31 701/1 |
| 2014/0310739 | A1 * | 10/2014 | Ricci | G06V 20/593 725/75 |
| 2016/0328254 | A1 * | 11/2016 | Ahmed | G06F 9/45545 |
| 2016/0328272 | A1 * | 11/2016 | Ahmed | G06F 9/4881 |
| 2017/0046230 | A1 * | 2/2017 | Guzik | H04L 65/765 |
| 2019/0294462 | A1 * | 9/2019 | Franciosi | G06F 9/45533 |
| 2020/0218443 | A1 * | 7/2020 | Narayan | B60K 35/22 |
| 2020/0218487 | A1 * | 7/2020 | Rush | B60R 11/0229 |
| 2020/0219469 | A1 * | 7/2020 | Mittal | G09G 5/006 |
| 2020/0310394 | A1 * | 10/2020 | Wouhaybi | H04L 67/12 |
| 2020/0326967 | A1 * | 10/2020 | Hayes | G06F 9/45558 |
| 2022/0091651 | A1 * | 3/2022 | Gras | G06F 9/5077 |
| 2022/0327986 | A1 | 10/2022 | Jang et al. | |
| 2023/0168913 | A1 * | 6/2023 | Yoon | B60K 35/29 |
| 2023/0168914 | A1 * | 6/2023 | Han | G06F 9/45558 |
| 2023/0244509 | A1 * | 8/2023 | Chen | G06F 9/45558 718/1 |
| 2023/0305878 | A1 * | 9/2023 | Na | G06F 9/45558 |
| 2023/0406224 | A1 * | 12/2023 | Yu | H04L 65/61 |
| 2024/0134675 | A1 * | 4/2024 | Yoon | B60K 35/213 |
| 2024/0143360 | A1 * | 5/2024 | Yoon | B60K 35/213 |
| 2024/0143374 | A1 * | 5/2024 | Han | G06F 9/45558 |
| 2024/0143375 | A1 * | 5/2024 | Han | G06F 3/1423 |
| 2024/0152370 | A1 * | 5/2024 | Han | B60K 35/29 |
| 2024/0168690 | A1 * | 5/2024 | Yoon | B60K 35/22 |
| 2024/0231881 | A9 * | 7/2024 | Yoon | B60K 35/213 |
| 2024/0419469 | A1 * | 12/2024 | Yu | G06F 3/14 |
| 2025/0284512 | A1 * | 9/2025 | Yu | G06F 9/544 |

FOREIGN PATENT DOCUMENTS

| | | | | |
|---|---|---|---|---|
| JP | 2017-507401 | A | 3/2017 | |
| JP | 2020-201761 | A | 12/2020 | |
| KR | 10-2014-0033169 | A | 3/2014 | |
| KR | 10-2018-0050018 | A | 5/2018 | |
| KR | 10-2020-0110229 | A | 9/2020 | |
| KR | 10-2022-0139790 | A | 10/2022 | |
| KR | 10-2022-0139853 | A | 10/2022 | |
| WO | WO-2022098103 | A1 * | 5/2022 | ............ B60K 35/29 |

* cited by examiner

100

SIGNAL PROCESSING DEVICE AND DISPLAY APPARATUS FOR VEHICLE INCLUDING THE SAME

CROSS REFERENCE TO RELATED APPLICATIONS

This application is the National Phase of PCT International Application No. PCT/KR2022/016130, filed on Oct. 21, 2022, which is hereby expressly incorporated by reference into the present application.

BACKGROUND

1. Field

The present disclosure relates to a signal processing device and a display apparatus for vehicle including the same, and more particularly, to a signal processing device capable of reducing delay in displaying an image between a plurality of displays, a display apparatus for a vehicle including the same.

2. Description of the Related Art

A vehicle is an apparatus that a driver moves in a desired direction. A representative example of the vehicle is a car.

Meanwhile, a display apparatus for vehicle is mounted in the vehicle for convenience of users who use the vehicle.

For example, a display is disposed in a cluster to display various kinds of information. Meanwhile, to display vehicle driving information, various displays, such as an audio video navigation (AVN) display, are mounted in the vehicle, in addition to the cluster.

In the case in which the number of displays in the display apparatus for vehicle is increased, however, signal processing for the displays is complicated.

In particular, there is a problem that the amount of image processing and delay significantly increase when moving and displaying images or copying images by using separate signal processing devices for each of a plurality of displays.

SUMMARY

An object of the present disclosure is to provide a signal processing device capable of reducing delay in displaying images between a plurality of displays, and a display apparatus for a vehicle including the same.

Another object of the present disclosure is to provide a signal processing device capable of reducing delay in moving and displaying images between a plurality of displays, and a display apparatus for a vehicle including the same.

A further object of the present disclosure is to provide a signal processing device capable of reducing delay in copying and displaying images between a plurality of displays, and a display apparatus for a vehicle including the same.

A further object of the present disclosure is to provide a signal processing device capable of reducing delay in displaying images between a plurality of displays even when operating systems of a plurality of virtual machines are different, and a display apparatus for a vehicle including the same.

A further object of the present disclosure is to provide a signal processing device capable of reducing delay in images corresponding to resolutions of each of a plurality of displays and displaying the same, and a display apparatus for a vehicle including the same.

In accordance with an aspect of the present disclosure, the above and other objects can be accomplished by the provision of a signal processing device including a processor configured to perform signal processing for a plurality of displays mounted in a vehicle, wherein the processor is configured to execute a server virtual machine and a plurality of guest virtual machines on a hypervisor within the processor, a first guest virtual machine and a second guest virtual machine among the plurality of guest virtual machines operate for a first display and a second display, respectively, the server virtual machine is configured to encode processed video data and store the encoded video data in a shared memory, the first guest virtual machine is configured to receive and decode the encoded video data stored in the shared memory and store decoded video data in the shared memory, and the second guest virtual machine is configured to receive the decoded video data stored in the shared memory and display at least a portion of the decoded video data on the second display.

Meanwhile, the first guest virtual machine can be configured to receive and decode the encoded video data stored in the shared memory and display at least a portion of the decoded video data on the first display.

Meanwhile, the first guest virtual machine can be configured to display a first image on the first display at a first time point, and the second guest virtual machine can be configured to display a second image corresponding to the first image on the second display at a second time point after the first time point.

Meanwhile, the first guest virtual machine can be configured to display the first image on the first display at the first time point and at the second time point after the first time point, and the second guest virtual machine can be configured to display the second image on the second display at the second time point, corresponding to the first image.

Meanwhile, the second guest virtual machine can be configured to output the scaled second image to the second display based on a size, output resolution or operating system of the second display.

Meanwhile, a third guest virtual machine among the plurality of guest virtual machines can operate for a third display, and the third guest virtual machine can be configured to receive the decoded video data stored in the shared memory and display at least a portion of the decoded video data on the third display.

Meanwhile, the second guest virtual machine and the third guest virtual machine can be configured to share a portion of the shared memory in which the decoded video data is stored.

Meanwhile, the first guest virtual machine can be configured to display the first image on the first display at a first time point, the second guest virtual machine can be configured to display the second image corresponding to the first image on the second display at a second time point after the first time point, and the third guest virtual machine can be configured to display the third image corresponding to the first image on the third display at a third time point after the second time point.

Meanwhile, the first guest virtual machine can be configured to display the first image on the first display at a first time point, a second time point after the first time point, and a third time point after the second time point, the second guest virtual machine can be configured to display the second image corresponding to the first image on the second display at the second time point and the third time point, and the third guest virtual machine can be configured to display the third image corresponding to the first image on the second display at the third time point.

In accordance with another aspect of the present disclosure, there is provided a signal processing device including a processor configured to perform signal processing for a plurality of displays mounted in a vehicle, wherein the processor is configured to execute a server virtual machine and a plurality of guest virtual machines on a hypervisor within the processor, a first guest virtual machine and a second guest virtual among the plurality of guest virtual machines operate for a first display and a second display, respectively, the server virtual machine is configured to encode processed video data and store the encoded video data in a shared memory, the first guest virtual machine is configured to receive the encoded video data stored in the shared memory and transmit a decoding request to the server virtual machine, the server virtual machine is configured to decode the encoded video data based on the decoding request and store the decoded video data in the shared memory, and the first guest virtual machine is configured to receive the decoded video data stored in the shared memory and display at least a portion of the decoded video data on the first display.

Meanwhile, the second guest virtual machine can be configured to receive the decoded video data stored in the shared memory and display at least a portion of the decoded video data on the second display.

Meanwhile, the first guest virtual machine can be configured to display a first image on the first display at a first time point, and the second guest virtual machine can be configured to display a second image corresponding to the first image on the second display at a second time point after the first time point.

Meanwhile, the first guest virtual machine can be configured to display the first image on the first display at the first time point and at the second time point after the first time point, and the second guest virtual machine can be configured to display the second image on the second display at the second time point, corresponding to the first image.

Meanwhile, the second guest virtual machine can be configured to output the scaled second image to the second display based on a size, output resolution or operating system of the second display.

Meanwhile, a third guest virtual machine among the plurality of guest virtual machines can operate for a third display, and the third guest virtual machine can be configured to receive the decoded video data stored in the shared memory and display at least a portion of the decoded video data on the third display.

Meanwhile, the first guest virtual machine can be configured to display the first image on the first display at a first time point, the second guest virtual machine can be configured to display the second image corresponding to the first image on the second display at a second time point after the first time point, and the third guest virtual machine can be configured to display the third image corresponding to the first image on the third display at a third time point after the second time point.

Meanwhile, the first guest virtual machine can be configured to display the first image on the first display at a first time point, a second time point after the first time point, and a third time point after the second time point, the second guest virtual machine can be configured to display the second image corresponding to the first image on the second display at the second time point and the third time point, and the third guest virtual machine can be configured to display the third image corresponding to the first image on the second display at the third time point.

In accordance with a further aspect of the present disclosure, there is provided a display apparatus for a vehicle including a plurality of displays; and a signal processing device including a processor configured to perform signal plurality of displays, wherein the signal processing device includes a processor configured to perform signal processing for a plurality of displays mounted in a vehicle, wherein the processor is configured to execute a server virtual machine and a plurality of guest virtual machines on a hypervisor within the processor, a first guest virtual machine and a second guest virtual machine among the plurality of guest virtual machines operate for a first display and a second display, respectively, the server virtual machine is configured to encode processed video data and store the encoded video data in a shared memory, the first guest virtual machine is configured to receive and decode the encoded video data stored in the shared memory and store decoded video data in the shared memory, and the second guest virtual machine is configured to receive the decoded video data stored in the shared memory and display at least a portion of the decoded video data on the second display.

Effects of the Disclosure

The signal processing device according to an embodiment of the present disclosure includes a processor configured to perform signal processing for a plurality of displays mounted in a vehicle, wherein the processor is configured to execute a server virtual machine and a plurality of guest virtual machines on a hypervisor within the processor, a first guest virtual machine and a second guest virtual machine among the plurality of guest virtual machines operate for a first display and a second display, respectively, the server virtual machine is configured to encode processed video data and store the encoded video data in a shared memory, the first guest virtual machine is configured to receive and decode the encoded video data stored in the shared memory and store decoded video data in the shared memory, and the second guest virtual machine is configured to receive the decoded video data stored in the shared memory and display at least a portion of the decoded video data on the second display. Accordingly, it is possible to reduce a delay in displaying images between a plurality of displays.

Meanwhile, the first guest virtual machine can be configured to receive and decode the encoded video data stored in the shared memory and display at least a portion of the decoded video data on the first display. Accordingly, it is possible to reduce a delay in displaying images between a plurality of displays. In addition, images corresponding to resolutions for a plurality of displays can be displayed with a reduced delay.

Meanwhile, the first guest virtual machine can be configured to display a first image on the first display at a first time point, and the second guest virtual machine is configured to display a second image corresponding to the first image on the second display at a second time point after the first time point. Accordingly, a delay in moving and displaying images between a plurality of displays can be reduced.

Meanwhile, the first guest virtual machine can be configured to display the first image on the first display at the first time point and at the second time point after the first time point, and the second guest virtual machine can be configured to display the second image on the second display at the second time point, corresponding to the first image. Accordingly, a delay in copying and displaying images between a plurality of displays can be reduced.

Meanwhile, the second guest virtual machine can be configured to output the scaled second image to the second display based on a size, output resolution or operating system of the second display. Accordingly, images corresponding to resolutions for a plurality of displays can be displayed with a reduced delay.

Meanwhile, a third guest virtual machine among the plurality of guest virtual machines can operate for a third display, and the third guest virtual machine can be configured to receive the decoded video data stored in the shared memory and display at least a portion of the decoded video data on the third display.

Meanwhile, the second guest virtual machine and the third guest virtual machine can be configured to share a portion of the shared memory in which the decoded video data is stored. Accordingly, it is possible to reduce a delay in displaying images between a plurality of displays.

Meanwhile, the first guest virtual machine can be configured to display the first image on the first display at a first time point, the second guest virtual machine can be configured to display the second image corresponding to the first image on the second display at a second time point after the first time point, and the third guest virtual machine can be configured to display the third image corresponding to the first image on the third display at a third time point after the second time point. Accordingly, a delay in moving and displaying images between a plurality of displays can be reduced.

Meanwhile, the first guest virtual machine can be configured to display the first image on the first display at a first time point, a second time point after the first time point, and a third time point after the second time point, the second guest virtual machine can be configured to display the second image corresponding to the first image on the second display at the second time point and the third time point, and the third guest virtual machine can be configured to display the third image corresponding to the first image on the second display at the third time point. Accordingly, a delay in copying and displaying images between a plurality of displays can be reduced.

In accordance with another aspect of the present disclosure, there is provided a signal processing device including a processor configured to perform signal processing for a plurality of displays mounted in a vehicle, wherein the processor is configured to execute a server virtual machine and a plurality of guest virtual machines on a hypervisor within the processor, a first guest virtual machine and a second guest virtual machine among the plurality of guest virtual machines operate for a first display and a second display, respectively, the server virtual machine is configured to encode processed video data and store the encoded video data in a shared memory, the first guest virtual machine is configured to receive the encoded video data stored in the shared memory and transmit a decoding request to the server virtual machine, the server virtual machine is configured to decode the encoded video data based on the decoding request and store the decoded video data in the shared memory, and the first guest virtual machine is configured to receive the decoded video data stored in the shared memory and display at least a portion of the decoded video data on the first display. Accordingly, it is possible to reduce a delay in displaying images between a plurality of displays.

Meanwhile, the second guest virtual machine can be configured to receive the decoded video data stored in the shared memory and display at least a portion of the decoded video data on the second display. Accordingly, it is possible to reduce a delay in displaying images between a plurality of displays. In addition, images corresponding to resolutions for a plurality of displays can be displayed with a reduced delay.

Meanwhile, the first guest virtual machine can be configured to display a first image on the first display at a first time point, and the second guest virtual machine can be configured to display a second image corresponding to the first image on the second display at a second time point after the first time point. Accordingly, a delay in moving and displaying images between a plurality of displays can be reduced.

Meanwhile, the first guest virtual machine can be configured to display the first image on the first display at the first time point and at the second time point after the first time point, and the second guest virtual machine can be configured to display the second image on the second display at the second time point, corresponding to the first image. Accordingly, a delay in copying and displaying images between a plurality of displays can be reduced.

Meanwhile, the second guest virtual machine can be configured to output the scaled second image to the second display based on a size, output resolution or operating system of the second display. Accordingly, images corresponding to resolutions for a plurality of displays can be displayed with a reduced delay.

Meanwhile, a third guest virtual machine among the plurality of guest virtual machines can operate for a third display, and the third guest virtual machine can be configured to receive the decoded video data stored in the shared memory and display at least a portion of the decoded video data on the third display. Accordingly, it is possible to reduce a delay in displaying images between a plurality of displays.

Meanwhile, the first guest virtual machine can be configured to display the first image on the first display at a first time point, the second guest virtual machine can be configured to display the second image corresponding to the first image on the second display at a second time point after the first time point, and the third guest virtual machine can be configured to display the third image corresponding to the first image on the third display at a third time point after the second time point. Accordingly, a delay in moving and displaying images between a plurality of displays can be reduced.

Meanwhile, the first guest virtual machine can be configured to display the first image on the first display at a first time point, a second time point after the first time point, and a third time point after the second time point, the second guest virtual machine can be configured to display the second image corresponding to the first image on the second display at the second time point and the third time point, and the third guest virtual machine can be configured to display the third image corresponding to the first image on the second display at the third time point. Accordingly, a delay in copying and displaying images between a plurality of displays can be reduced.

In accordance with a further aspect of the present disclosure, there is provided a display apparatus for a vehicle including a plurality of displays; and a signal processing device including a processor configured to perform signal processing for a plurality of displays, wherein the signal processing device includes a processor configured to perform signal processing for a plurality of displays mounted in a vehicle, wherein the processor is configured to execute a server virtual machine and a plurality of guest virtual machines on a hypervisor within the processor, a first guest virtual machine and a second guest virtual machine among the plurality of guest virtual machines operate for a first display and a second display, respectively, the server virtual machine is configured to encode processed video data and store the encoded video data in a shared memory, the first guest virtual machine is configured to receive and decode the encoded video data stored in the shared memory and store decoded video data in the shared memory, and the second guest virtual machine is configured to receive the decoded video data stored in the shared memory and display at least a portion of the decoded video data on the second display. Accordingly, it is possible to reduce a delay in displaying images between a plurality of displays.

DETAILED DESCRIPTION OF THE PREFERRED EMBODIMENTS

Hereinafter, the present disclosure will be described in detail with reference to the accompanying drawings.

With respect to constituent elements used in the following description, suffixes "module" and "unit" are given only in consideration of ease in preparation of the specification, and do not have or serve different meanings. Accordingly, the suffixes "module" and "unit" can be used interchangeably.

Figure 1A:
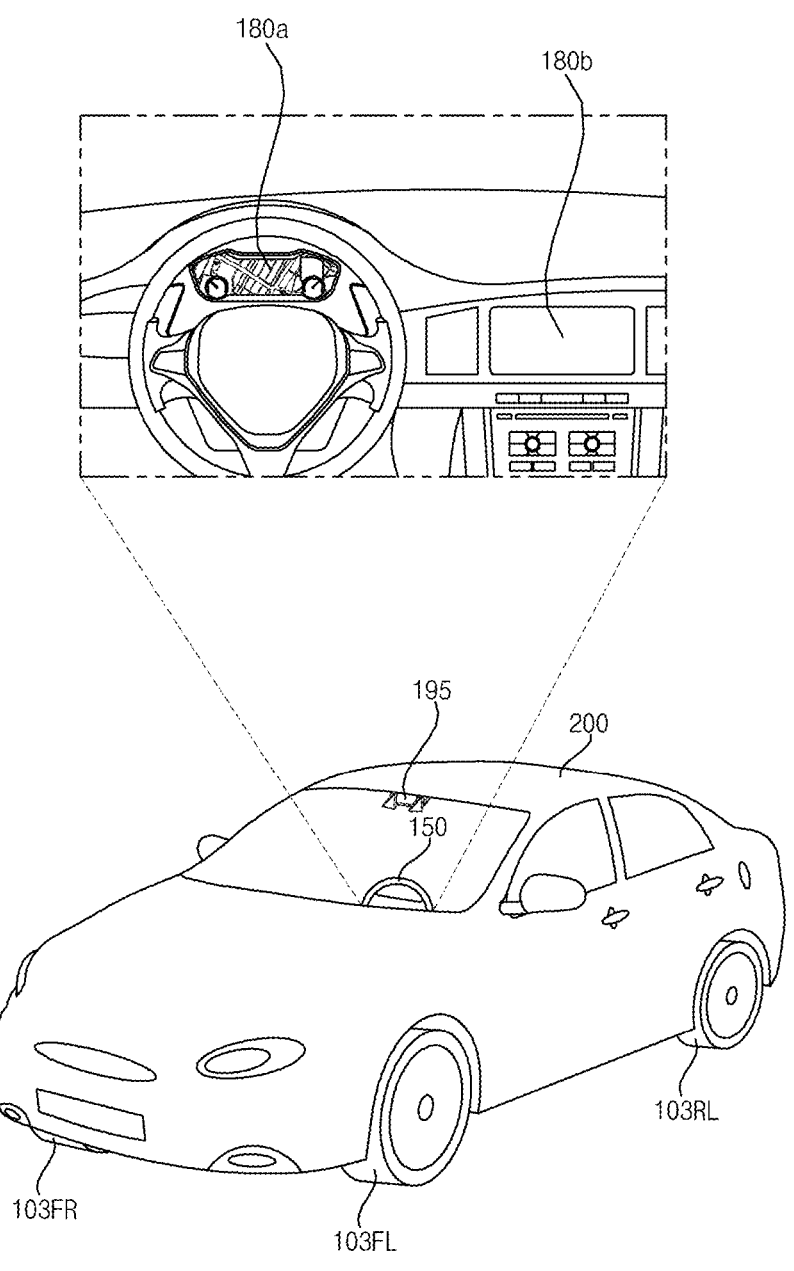
FIG. 1A is a view showing an example of the exterior and interior of a vehicle.

FIG. 1A is a view showing an example of the exterior and interior of a vehicle.

Referring to the figure, a vehicle 200 is moved by a plurality of wheels 103FR, 103FL, 103RL, . . . rotated by a power source and a steering wheel 150 configured to adjust an advancing direction of the vehicle 200.

Meanwhile, the vehicle 200 can be provided with a camera 195 configured to acquire an image of the front of the vehicle.

Meanwhile, the vehicle 200 can be further provided therein with a plurality of displays 180a and 180b configured to display images and information.

In FIG. 1A, a cluster display 180a and an audio video navigation (AVN) display 180b are illustrated as the plurality of displays 180a and 180b. In addition, a head up display (HUD) can also be used.

Meanwhile, the audio video navigation (AVN) display 180b can also be called a center information display.

Meanwhile, the vehicle 200 described in this specification can be a concept including all of a vehicle having an engine as a power source, a hybrid vehicle having an engine and an electric motor as a power source, and an electric vehicle having an electric motor as a power source.

Figure 1B:
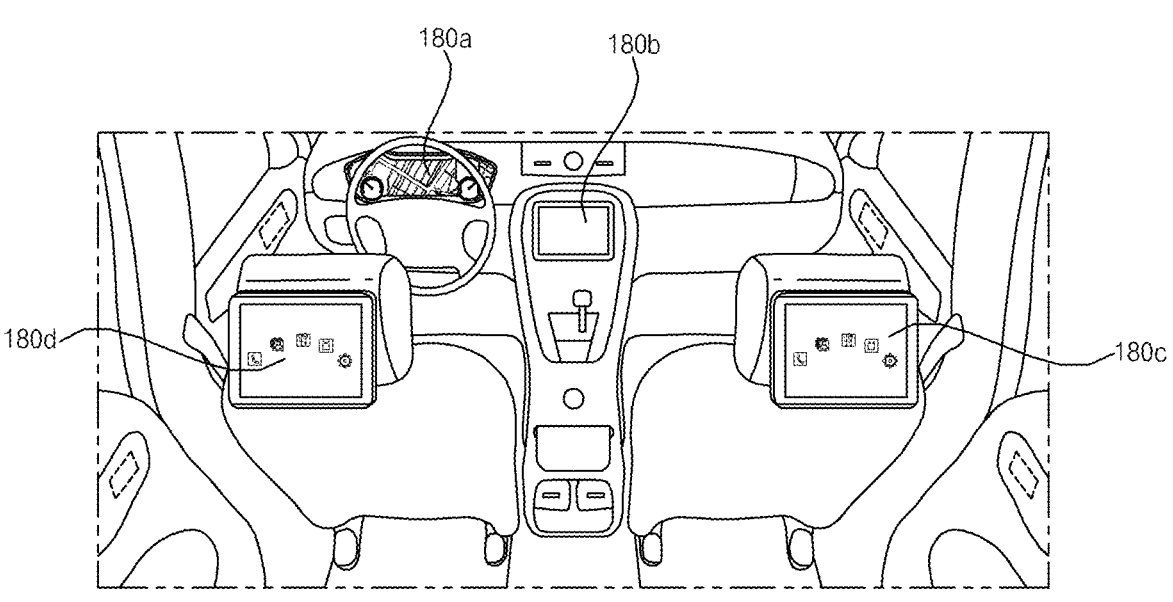
FIG. 1B is a view showing another example of the interior of the vehicle.

FIG. 1B is a view showing another example of the interior of the vehicle.

Referring to the figure, a cluster display 180a, an audio video navigation (AVN) display 180b, rear seat entertainment displays 180c and 180d, and a rear-view mirror display (not shown) can be mounted in the vehicle.

The embodiment of the present disclosure proposes a scheme for a display apparatus 100 for a vehicle including a plurality of displays 180a to 180d to reduce delay in displaying images between the plurality of displays. This will be described d with reference to FIG. 5 and subsequent figures.

Figure 2:
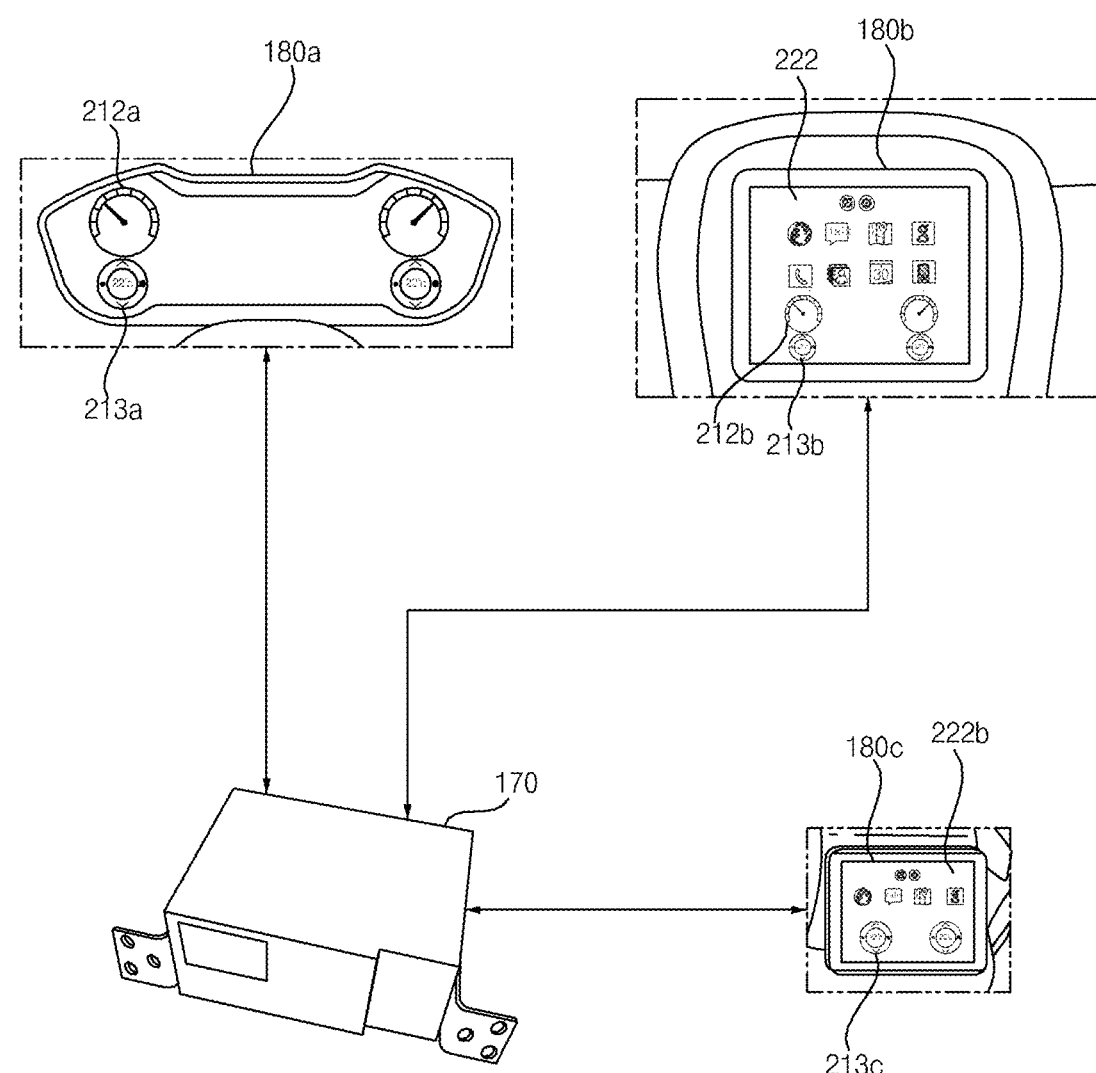
FIG. 2 is a view showing the external appearance of a display apparatus for vehicle according to an embodiment of the present disclosure.

FIG. 2 is a view showing the external appearance of a display apparatus for vehicle according to an embodiment of the present disclosure.

The display apparatus 100 for vehicle according to an embodiment of the present disclosure can include a plurality of displays 180a and 180b and a signal processing device 170 configured to perform signal processing to display images and information on the plurality of displays 180a and 180b.

The first display 180a, which is one of the plurality of displays 180a and 180b, can be a cluster display 180a configured to display a driving state and operation information, and the second display 180*b* can be an audio video navigation (AVN) display 180*b* configured to display vehicle driving information, a navigation map, various kinds of entertainment information, or an image.

The signal processing device 170 can have a processor 175 provided therein, and first to third virtual machines 520 to 540 can be executed by a hypervisor 505 in the processor 175.

The second virtual machine 530 can be operated for the first display 180*a*, and the third virtual machine 540 can be operated for the second display 180*b*.

Meanwhile, the first virtual machine 520 in the processor 175 can be configured to set a shared memory 508 based on the hypervisor 505 for transmission of the same data to the second virtual machine 530 and the third virtual machine 540. Consequently, the first display 180*a* and the second display 180*b* in the vehicle can be configured to display the same information or the same images in a synchronized state.

Meanwhile, the first virtual machine 520 in the processor 175 shares at least some of data with the second virtual machine 530 and the third virtual machine 540 for divided processing of data. Consequently, the plurality of virtual machines for the plurality of displays in the vehicle can divide and process data.

Meanwhile, the first virtual machine 520 in the processor 175 can be configured to receive and process wheel speed sensor data of the vehicle, and can transmit the processed wheel speed sensor data to at least one of the second virtual machine 530 or the third virtual machine 540. Consequently, at least one virtual machine can be configured to share the wheel speed sensor data of the vehicle.

Meanwhile, the display apparatus 100 for vehicle according to an embodiment of the present disclosure can further include a rear seat entertainment (RSE) display 180*c* configured to display driving state information, simple navigation information, various kinds of entertainment information, or an image.

The signal processing device 170 can further execute a fourth virtual machine (not shown), in addition to the first to third virtual machines 520 to 540, on the hypervisor 505 in the processor 175 to control the RSE display 180*c*.

Consequently, it is possible to control various displays 180*a* to 180*c* using a single signal processing device 170.

Meanwhile, some of the plurality of displays 180*a* to 180*c* can be operated based on a Linux Operating System (OS), and others can be operated based on a Web Operating System (OS).

In response to touch being input to any one of the displays 180*a* and 180*b* or 180*a* to 180*c* configured to be operated under various operating systems, the signal processing device 170 according to an embodiment of the present disclosure can be configured to rapidly and accurately process the touch input.

Meanwhile, illustrates that a FIG. 2 vehicle speed indicator 212*a* and an in-vehicle temperature indicator 213*a* are displayed on the first display 180*a*, a home screen 222 including a plurality of applications, a vehicle speed indicator 212*b*, and an in-vehicle temperature indicator 213*b* is displayed on the second display 180*b*, and a second home screen 222*b* including a plurality of applications and an in-vehicle temperature indicator 213*c* is displayed on the third display 180*c*.

Figure 3:
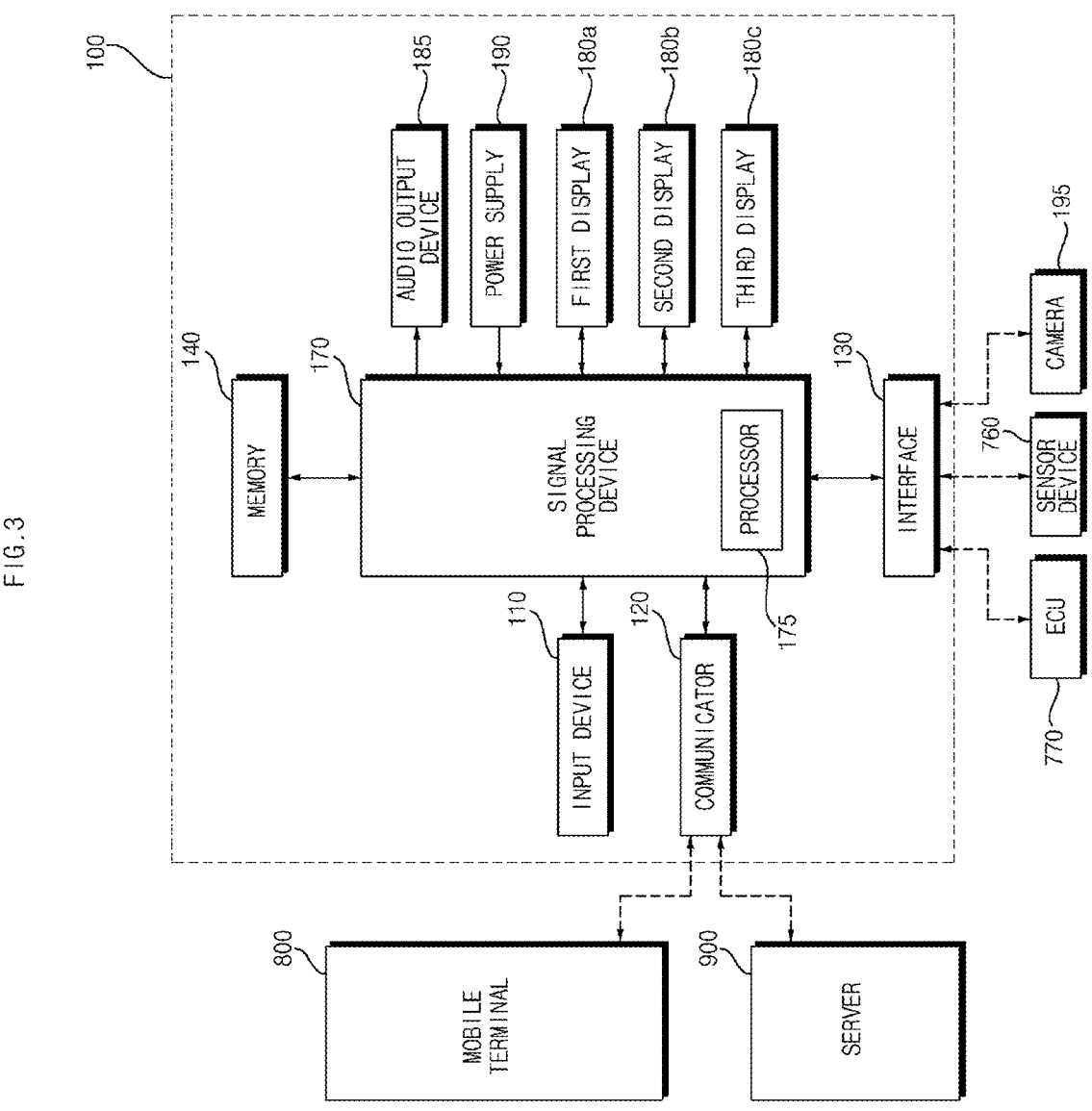
FIG. 3 illustrates an example of an internal block diagram of the display apparatus for vehicle of FIG. 2.

FIG. 3 illustrates an example of an internal block diagram of the display apparatus for vehicle according to an embodiment of the present disclosure.

Referring to the figure, the display apparatus 100 for vehicle according to an embodiment of the present disclosure can include an input device 110, a transceiver 120, an interface 130, a memory 140, a signal processing device 170, a plurality of displays 180*a* to 180*c*, an audio output device 185, and a power supply 190.

The input device 110 can include a physical button or pad for button input or touch input.

Meanwhile, the input device 110 can include a touch sensor (not shown) configured to sense touch input to the displays 180*a*, 180*b*, and 180*c*.

Meanwhile, the input device 110 can include a microphone (not shown) for user voice input.

The transceiver 120 can wirelessly exchange data with a mobile terminal 800 or a server 900.

In particular, the transceiver 120 can wirelessly exchange data with a mobile terminal of a vehicle driver. Any of various data communication schemes, such as Bluetooth, Wi-Fi, WIFI Direct, and APIX, can be used as a wireless data communication scheme.

The transceiver 120 can be configured to receive weather information and road traffic situation information, such as transport protocol expert group (TPEG) information, from the mobile terminal 800 or the server 900. To this end, the transceiver 120 can include a mobile communication module (not shown).

The interface 130 can be configured to receive sensor information from an electronic control unit (ECU) 770 or a sensor device 760, and can transmit the received information to the signal processing device 170.

Here, the sensor information can include at least one of vehicle direction information, vehicle position information (global positioning system (GPS) information), vehicle angle information, vehicle velocity information, vehicle acceleration information, vehicle inclination information, vehicle forward/backward movement information, battery information, fuel information, tire information, vehicle lamp information, in-vehicle temperature information, and in-vehicle humidity information.

The sensor information can be acquired from a heading sensor, a yaw sensor, a gyro sensor, a position sensor, a vehicle forward/backward movement sensor, a wheel sensor, a vehicle velocity sensor, a car body inclination sensor, a battery sensor, a fuel sensor, a tire sensor, a steering-wheel-rotation-based steering sensor, an in-vehicle temperature sensor, or an in-vehicle humidity sensor. Meanwhile, the position module can include a GPS module configured to receive GPS information.

Meanwhile, the interface 130 can be configured to receive front-of-vehicle video data, side-of-vehicle video data, rear-of-vehicle video data, and obstacle-around-vehicle distance information from a camera 195 or lidar (not shown), and can transmit the received information to the signal processing device 170.

The memory 140 can store various data necessary for overall operation of the display apparatus 100 for vehicle, such as programs for processing or control of the signal processing device 170.

For example, the memory 140 can store data about the hypervisor and first to third virtual machines executed by the hypervisor in the processor 175.

The audio output device 185 can convert an electrical signal from the signal processing device 170 into an audio signal, and can output the audio signal. To this end, the audio output device 185 can include a speaker.

The power supply 190 can supply power necessary to operate components under control of the signal processing device 170. In particular, the power supply 190 can be configured to receive power from a battery in the vehicle.

The signal processing device 170 can control overall operation of each device in the display apparatus 100 for vehicle.

For example, the signal processing device 170 can include a processor 175 configured to perform signal processing for the displays 180a and 180b.

The processor 175 can execute the first to third virtual machines 520 to 540 on the hypervisor 505 (see FIG. 5) in the processor 175.

Figure 5:
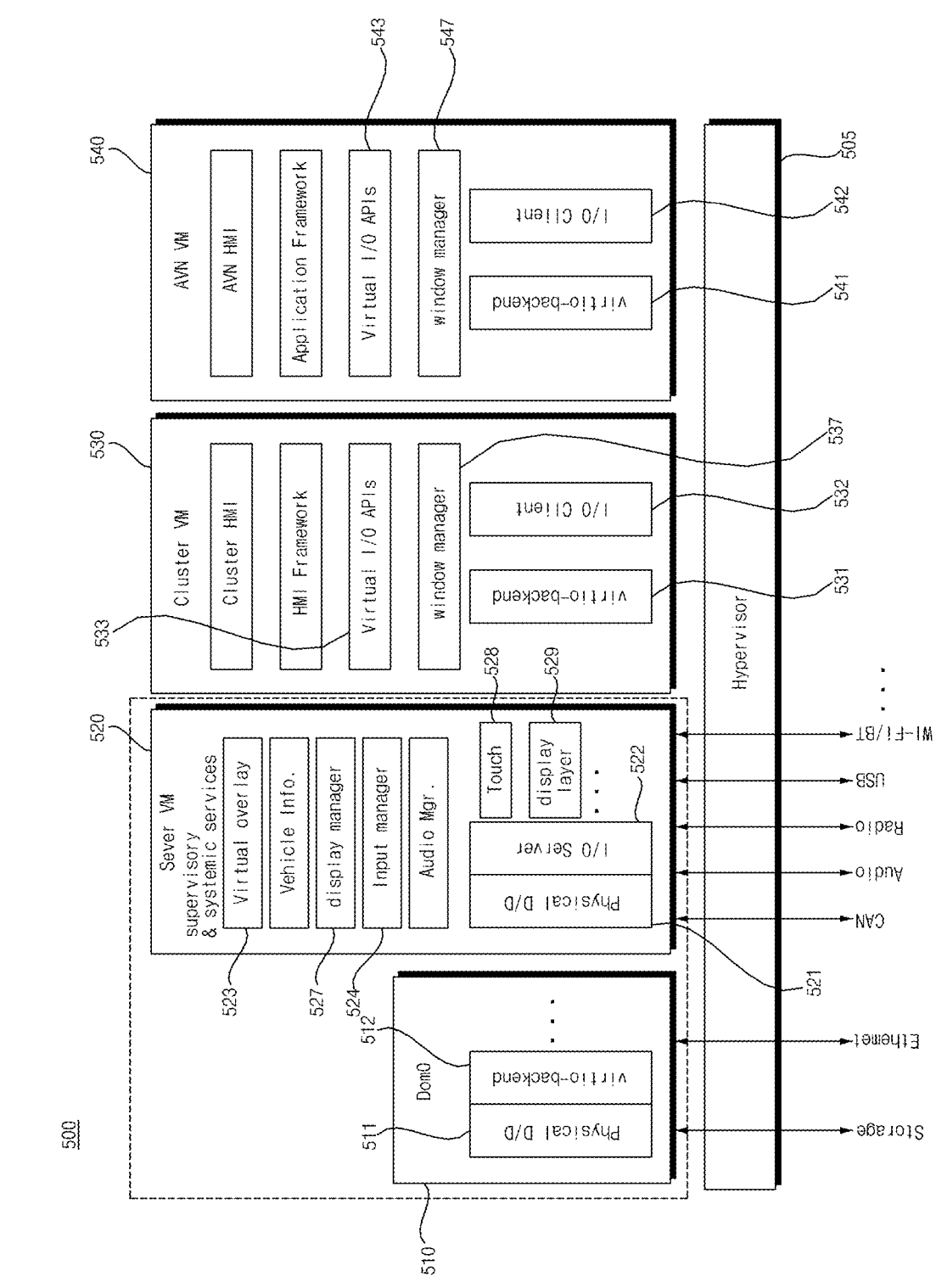
FIG. 5 is a view showing an example of a system driven in a signal processing device according to an embodiment of the present disclosure.

Meanwhile, the processor 175 can further execute a legacy virtual machine configured to receive and process Ethernet data. For example, as shown in FIG. 5, the legacy virtual machine can be executed by the first virtual machine 520 in the processor 175.

Among the first to third virtual machines 520 to 540 (see FIG. 5), the first virtual machine 520 can be called a server virtual machine, and the second and third virtual machines 530 and 540 can be called quest virtual machines.

The second virtual machine 530 can be operated for the first display 180a, and the third virtual machine 540 can be operated for the second display 180b.

For example, the first virtual machine 520 in the processor 175 can be configured to receive, process, and output vehicle sensor data, position information data, camera video data, audio data, or touch input data. Data processed legacy virtual machine and data processed by the first virtual machine 520 can be distinguished from each other, whereby data processing can be efficiently performed. In particular, the first virtual machine 520 can process most of the data, whereby 1:N data sharing can be achieved.

As another example, the first virtual machine 520 can directly receive and process can communication data, audio data, radio data, USB data, and wireless communication data for the second and third virtual machines 530 and 540.

The first virtual machine 520 can transmit the processed data to the second and third virtual machines 530 and 540.

Consequently, only the first virtual machine 520, among the first to third virtual machines 520 to 540, can be configured to receive communication data and external input data, and can perform signal processing, whereby load in signal processing by the other virtual machines can be reduced and 1:N data communication can be achieved, and therefore synchronization at the time of data sharing can be achieved.

Meanwhile, the first virtual machine 520 writes some of data in a first shared memory (not shown) to be transmitted to the second virtual machine 530, and writes some other of data in the first shared memory (not shown) to be transmitted to the third virtual machine 540. The second virtual machine 530 and the third virtual machine 540 are configured to process the received data, and write the processed data in a second shared memory (not shown). Consequently, delay in displaying images between the plurality of displays can be reduced.

At this time, data can be any one of video data, audio data, navigation data, and voice recognition data.

Meanwhile, the first virtual machine 520 can process some other of data, and can be configured to write the processed data in the second shared memory (not shown). That is, the first virtual machine 520 can perform data processing in addition to the second virtual machine 530 and the third virtual machine 540.

Meanwhile, in response to a fourth virtual machine 550 configured to be operated for the third display 180c being executed in the processor 175, the first virtual machine 520 can write some other of data in the first shared memory (not shown), and the fourth virtual machine 550 can process the received data and can be configured to write the processed data in the second shared memory (not shown).

Meanwhile, the first virtual machine 520 can generate command queues for distributed processing of data in the second virtual machine 530 and the third virtual machine 540. Consequently, the plurality of virtual machines can divide and process data.

Meanwhile, in response to the second virtual machine 530 and the third virtual machine 540 sharing the same data, the first virtual machine 520 in the processor 175 can generate one command queue. Consequently, the same data can be synchronized and shared.

Meanwhile, the first virtual machine 520 can generate command queues corresponding to the number of virtual machines for distributed processing of data.

Meanwhile, the first virtual machine 520 can be configured to transmit at least some of data to at least one of the second virtual machine 530 or the third virtual machine 540 for distributed processing of data.

For example, the first virtual machine 520 can allocate the first shared memory (not shown) for transmitting at least some of data to at least one of the second virtual machine 530 or the third virtual machine 540, and video data processed by the second virtual machine 530 or the third virtual machine 540 can be written in the second shared memory (not shown).

Meanwhile, the first virtual machine 520 can be configured to write data in the shared memory 508, whereby the second virtual machine 530 and the third virtual machine 540 share the same data.

For example, the first virtual machine 520 can be configured to write radio data or wireless communication data in the shared memory 508, whereby the second virtual machine 530 and the third virtual machine 540 share the same data. Consequently, 1:N data sharing can be achieved.

Eventually, the first virtual machine 520 can process most of the data, whereby 1:N data sharing can be achieved.

Meanwhile, the first virtual machine 520 in the processor 175 can be configured to set the shared memory 508 based on the hypervisor 505 to transmit the same data to the second virtual machine 530 and the third virtual machine 540.

That is, the first virtual machine 520 in the processor 175 can transmit the same data to the second virtual machine 530 and the third virtual machine 540 in a synchronized state using the shared memory 508 based on the hypervisor 505. Consequently, the plurality of displays 180a and 180b in the vehicle can be configured to display the same images in a synchronized state.

Meanwhile, the signal processing device 170 can process various signals, such as an audio signal, an image signal, and a data signal. To this end, the signal processing device 170 can be implemented in the form of a system on chip (SOC).

Figure 4:
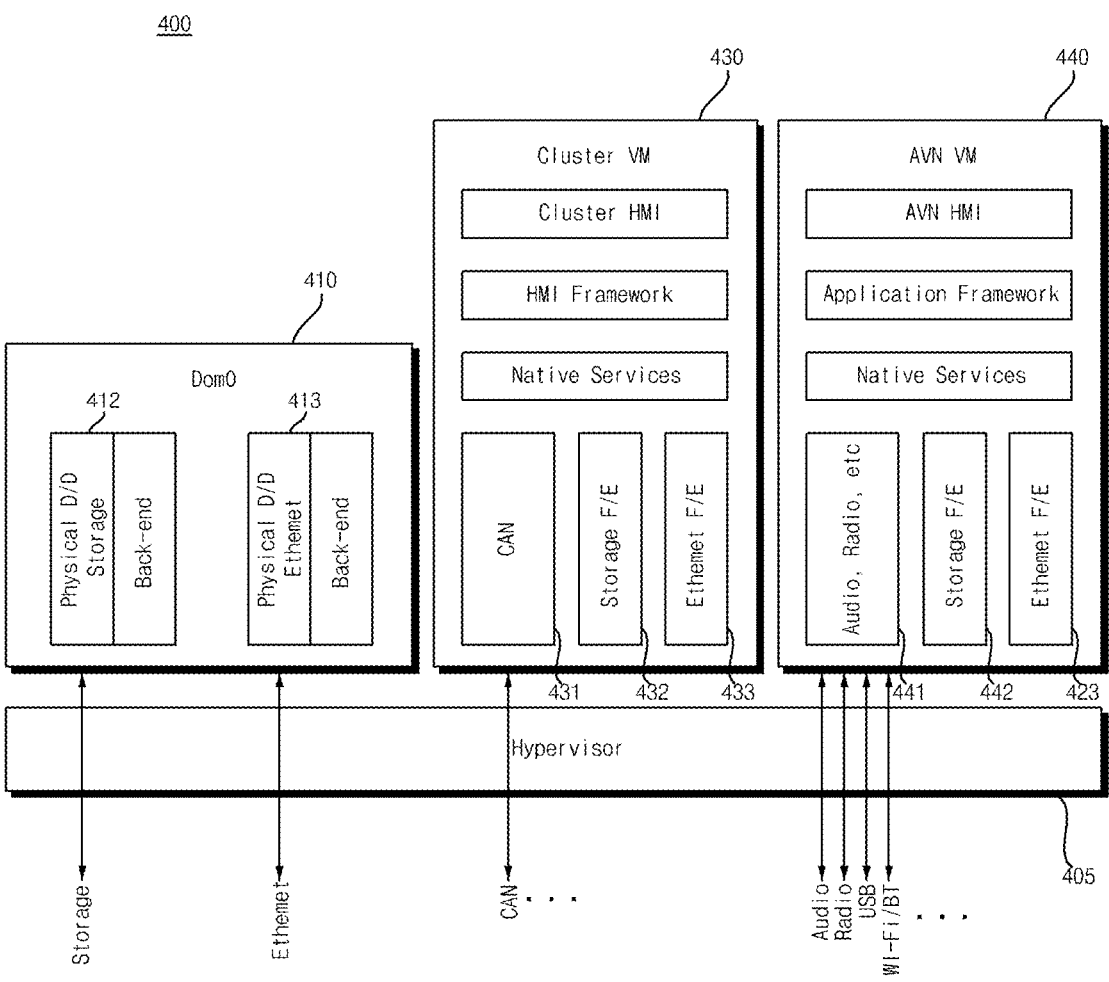
FIG. 4 is a view showing a system driven in a signal processing device related to the present disclosure.

FIG. 4 is a view showing a system driven in a signal processing device related to the present disclosure.

Referring to the figure, FIG. 4 is a view illustrating that virtual machines are used for the cluster display 180a and the AVN display 180b.

The system 400 driven in the signal processing device of FIG. 4 illustrates that a cluster virtual machine 430 and an AVN virtual machine 440 are executed through a hypervisor 405 in the processor 175.

Meanwhile, the system 400 driven in the signal processing device of FIG. 4 illustrates that a legacy virtual machine 410 is also executed on the hypervisor 405 in the processor 175.

The legacy virtual machine 410 can include an interface 412 for data communication with the memory 140 and an interface 413 for Ethernet communication.

Meanwhile, the cluster virtual machine 430 can include an interface 431 for can communication, an interface 432 for communication with the interface 412 of the legacy virtual machine 410, and an interface 433 for communication with the interface 413 of the legacy virtual machine 410.

Meanwhile, the AVN virtual machine 440 can include an interface 441 for input and output of audio data, radio data, USB data, and wireless communication data, an interface 442 for communication with the interface 412 of the legacy virtual machine 410, and an interface 443 for communication with the interface 413 of the legacy virtual machine 410.

In the system 400, there is a disadvantage in that can communication data are input and output only in the cluster virtual machine 430, whereby the can communication data cannot be utilized in the AVN virtual machine 440.

Also, in the system 400 of FIG. 4, there is a disadvantage in that audio data, radio data, USB data, and wireless communication data are input and output only in the AVN virtual machine 440, whereby these data cannot be utilized in the cluster virtual machine 430.

Meanwhile, there is a disadvantage in that the cluster virtual machine 430 and the cluster virtual machine 430 has to include the interfaces 431 and 432 and the interfaces 441 and 442, respectively, for memory data and Ethernet communication data input and output in the legacy virtual machine 410.

Therefore, the present disclosure proposes a scheme for improving the system of FIG. 4. That is, unlike FIG. 4, virtual machines are classified into a server virtual machine and guest virtual machines such that various memory data and communication data are input and output not in the guest virtual machines but in the server virtual machine. This will be described with reference to FIG. 5 and subsequent figures.

FIG. 5 is a view showing an example of a system driven in a signal processing device according to an embodiment of the present disclosure.

Referring to the figure, the system 500 of FIG. 5 illustrates that the first virtual machine 520, which is a server virtual machine, the second virtual machine 530, which is a guest virtual machine, and the third virtual machine 540, which is a guest virtual machine, are executed on the hypervisor 505 in the processor 175 of the signal processing device 170.

The second virtual machine 530 can be a virtual machine for the cluster display 180a, and the third virtual machine 540 can be a virtual machine for the AVN display 180b.

That is, the second virtual machine 530 and the third virtual machine 540 can be operated for image rendering of the cluster display 180a and the AVN display 180b, respectively.

Meanwhile, the system 50 driven in the signal processing device 170 of FIG. 5 illustrates that a legacy virtual machine 510 is also executed on the hypervisor 505 in the processor 175.

The legacy virtual machine 510 can include an interface 511 for data communication with the memory 140 and Ethernet communication.

The figure illustrates that the interface 511 is a physical device driver; however, various modifications are possible.

Meanwhile, the legacy virtual machine 510 can further include a virtio-backend interface 512 for data communication with the second and third virtual machines 530 and 540.

The first virtual machine 520 can include an interface 521 for input and output of audio data, radio data, USB data, and wireless communication data and an input and output server interface 522 for data communication with the guest virtual machines.

That is, the first virtual machine 520, machine, which is a server virtual can provide inputs/outputs (I/O) difficult to virtualize with standard virtualization technology (VirtIO) to a plurality of guest virtual machines, such as the second and third virtual machines 530 and 540.

Meanwhile, the first virtual machine 520, which is a server virtual machine, can control radio data and audio data at a supervisor level, and can provide the data to a plurality of guest virtual machines, such as the second and third virtual machines 530 and 540.

Meanwhile, the first virtual machine 520, which is a server virtual machine, can process vehicle data, sensor data, and surroundings-of-vehicle information, and can provide the processed data or information to a plurality of guest virtual machines, such as the second and third virtual machines 530 and 540.

Meanwhile, the first virtual machine 520 can provide supervisory services, such as processing of vehicle data and audio routing management.

Next, the second virtual machine 530 can include an input and output client interface 532 for data communication with the first virtual machine 520 and APIs 533 configured to control the input and output client interface 532.

In addition, the second virtual machine 530 can include a virtio-backend interface for data communication with the legacy virtual machine 510.

The second virtual machine 530 can be configured to receive memory data by communication with the memory 140 or Ethernet data by Ethernet communication from the virtio-backend interface 512 of the legacy virtual machine 510 through the virtio-backend interface.

Next, the third virtual machine 540 can include an input and output client interface 542 for data communication with the first virtual machine 520 and APIs 543 configured to control the input and output client interface 542.

In addition, the third virtual machine 540 can include a virtio-backend interface for data communication with the legacy virtual machine 510.

The third virtual machine 540 can be configured to receive memory data by communication with the memory 140 or Ethernet data by Ethernet communication from the virtio-backend interface 512 of the legacy virtual machine 510 through the virtio-backend interface.

Meanwhile, the legacy virtual machine 510 can be provided in the first virtual machine 520, unlike FIG. 5.

In the system 500, can communication data are input and output only in the first virtual machine 520, but can be provided to a plurality of guest virtual machines, such as the second and third virtual machines 530 and 540, through data processing in the first virtual machine 520. Consequently, 1:N data communication by processing of the first virtual machine 520 can be achieved.

Also, in the system 500 of FIG. 5, audio data, radio data, USB data, and wireless communication data are input and output only in the first virtual machine 520, but can be provided to a plurality of guest virtual machines, such as the second and third virtual machines 530 and 540, through data processing in the first virtual machine 520. Consequently, 1:N data communication by processing of the first virtual machine 520 can be achieved.

Also, in the system 500 of FIG. 5, touch input to the first display 180a or the second display 180b is input only to the first virtual machine 520 and is not input to the second virtual machine 530 and the third virtual machine 540.

Information regarding the touch input is transmitted to the second virtual machine 530 or the third virtual machine 540.

Consequently, the touch input can be rapidly and accurately processed. In addition, the touch input can be rapidly and accurately processed even though the number of virtual machines that are driven is increased.

Meanwhile, in the system 500 of FIG. 5, the second and third virtual machines 530 and 540 can be operated based on different operating systems.

For example, the second virtual machine 530 can be operated based on a Linux OS, and the third virtual machine 540 can be operated based on a Web OS.

In the first virtual machine 520, the shared memory 508 based on the hypervisor 505 is set for data sharing, even though the second and third virtual 540 are operated based on different machines 530 and operating systems. Even though the second and third virtual machines 530 and 540 are operated based on different operating systems, therefore, the same data or the same images can be shared in a synchronized state. Eventually, the plurality of displays 180a and 180b can be configured to display the same data or the same images in a synchronized state.

Meanwhile, the first virtual machine 520 transmits information regarding the touch input to the second virtual machine 530 or the third virtual machine 540 even though the second and third virtual machines 530 and 540 are operated based on different operating systems. Consequently, the touch input can be rapidly and accurately processed even though the second and third virtual machines 530 and 540 are operated based on different operating systems (OS).

Meanwhile, the first virtual machine 520 can include a display manager 527 configured to control overlays displayed on the first display 180a and the second display 180b, a display layer server 529, and an overlay creator 523 configured to generate an overlay.

The display layer server 529 can be configured to receive a first overlay provided by the second virtual machine 530 and a second overlay provided by the third virtual machine 540.

Meanwhile, the display layer server 529 can transmit the overlay generated by the virtual overlay creator 523 to at least one of the second virtual machine 530 or the third virtual machine 540.

Meanwhile, the display manager 527 in the first virtual machine 520 can be configured to receive the first overlay provided by the second virtual machine 530 and the second overlay provided by the third virtual machine 540 through the display layer server 529.

The display manager 527 in the first virtual machine 520 can be configured to transmit the overlay, which is different from the first overlay or the second overlay, to at least one of the second virtual machine 530 or the third virtual machine 540 through the display layer server 529.

In response thereto, the second virtual machine 530 can be configured to combine and display the first overlay and the overlay on the first display 180a.

In addition, the third virtual machine 540 can be configured to combine and display the second overlay and the overlay on the second display 180b.

Meanwhile, the first virtual machine 520 can include an input manager 524 configured to receive an input signal from the outside. At this time, the input signal can be an input signal from a predetermined button (start button) in the vehicle, a touch input signal, or a voice input signal.

For example, the input manager 524 in the first virtual machine 520 can be configured to receive touch input from the first display 180a or the second display 180b.

Meanwhile, the first virtual machine 520 can include a touch server 528 configured to transmit information regarding the touch input related to the touch input from the first display 180a or the second display 180b to the second virtual machine 530 or the third virtual machine 540.

For example, when there is touch input corresponding to the first display 180a, the touch server 528 in the first virtual machine 520 can transmit information regarding the touch input to the second virtual machine 530.

Meanwhile, the touch server 528 in the first virtual machine 520 can be configured to receive the touch input from the first display 180a or the second display 180b.

Figure 6:
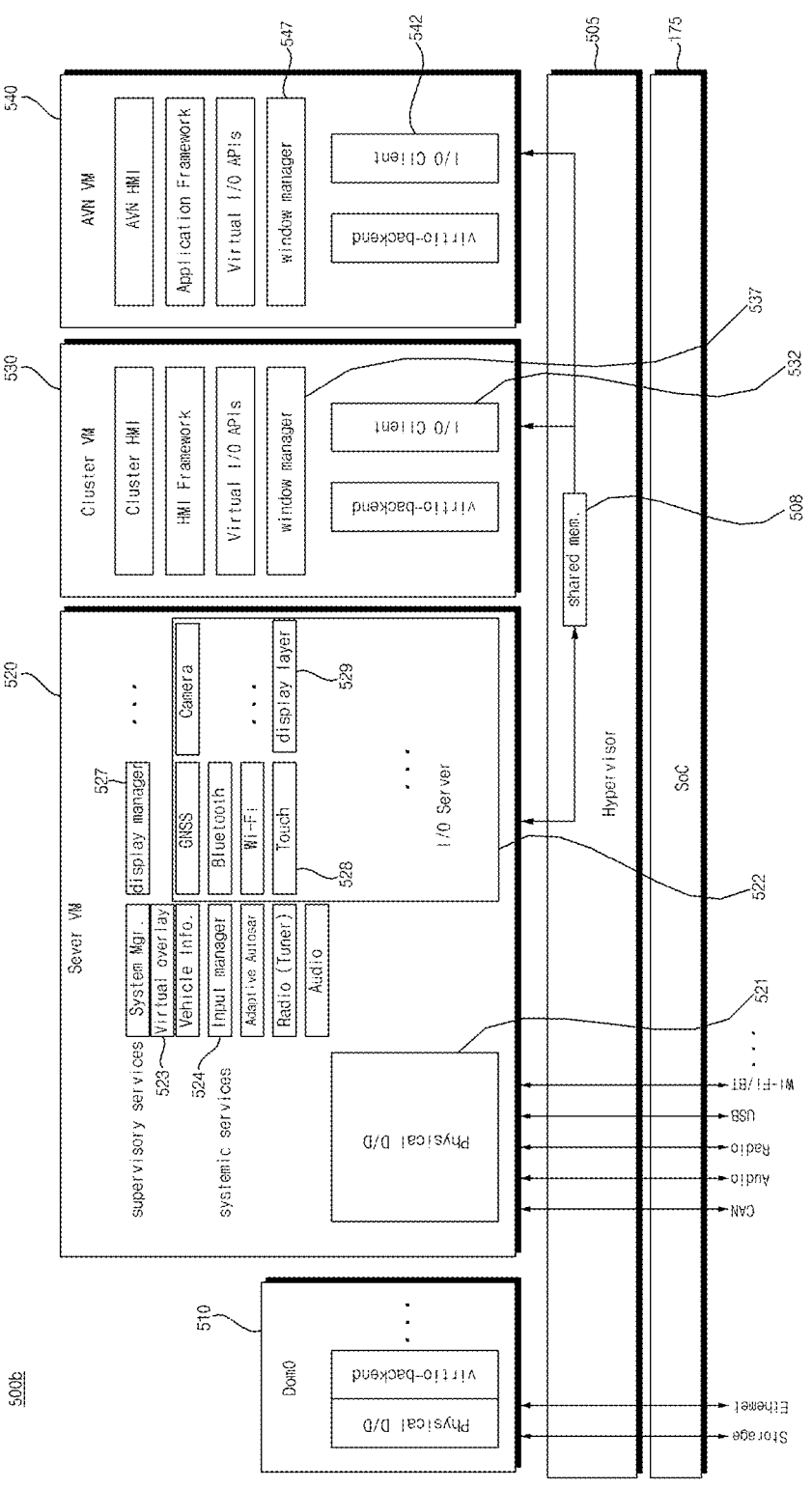
FIG. 6 is a view showing another example of the system driven in the signal processing device according to an embodiment of the present disclosure.

FIG. 6 is a view showing another example of the system driven in the signal processing device according to an embodiment of the present disclosure.

Referring to the figure, in the system 500b driven by the processor 175 in the signal processing device 170, the processor 175 in the signal processing device 170 executes the first to third virtual machines 520 to 540 on the hypervisor 505 in the processor 175, and the first virtual machine 520 in the processor 175 is configured to set the shared memory 508 based on the hypervisor 505 for transmission of data to the second and third virtual machines 530 and 540.

For example, information regarding touch input can be illustrated as the data. Consequently, the information regarding touch input can be transmitted to the second virtual machine 530 or the third virtual machine 540. Eventually, the touch input to the first display 180a or the second display 180b can be rapidly and accurately processed. In addition, the touch input can be rapidly and accurately processed even though the number of virtual machines that are driven is increased.

As another example, video data can be illustrated as the data. Consequently, an image can be displayed on the first display 180a or the second display 180b.

Meanwhile, in response to the same video data being shared in the shared memory 508, the plurality of displays 180a and 180b in the vehicle can be configured to display the same data in a synchronized state.

As another example, can communication data, audio data, radio data, USB data, wireless communication data, or position information data can be illustrated as the data. Consequently, information regarding the data can be displayed on the first display 180a or the second display 180b.

Meanwhile, although not shown in FIG. 6, the legacy virtual machine 510 can transmit memory data from the memory 140 or Ethernet data by Ethernet communication to the second and third virtual machines 530 and 540 using the shared memory 508 based on the hypervisor 505. Consequently, information corresponding to the memory data or the Ethernet data can be displayed on the first display 180a or the second display 180b.

Meanwhile, the first virtual machine 520 in the system 500b of FIG. 6 can include a display manager 527, a display layer server 529, an overlay creator 523, an input manager 524, and a touch server 528, similarly to the first virtual machine 520 in the system 500 of FIG. 5.

Meanwhile, the input and output server interface 522 in the first virtual machine 520 in the system 500b of FIG. 6 can include a display layer server 529 and a touch server 528, unlike FIG. 5.

The operation of the display manager 527, the display layer server 529, the input manager 524, the overlay creator 523, and the touch server 528 is the same to FIG. 5, and therefore a description thereof will be omitted.

Meanwhile, the first virtual machine 520 of FIG. 6 can further include a system manager for overall system control, a vehicle information manager for vehicle information management, an audio manager for audio control, and a radio manager for radio control.

Meanwhile, the input and output server interface 522 in the first virtual machine 520 in the system 500b of FIG. 6 can further include a GNSS server for GPS information input and output, a Bluetooth server for Bluetooth input and output, a Wi-Fi server for Wi-Fi input and output, and a camera server for camera data input and output.

Figure 7:
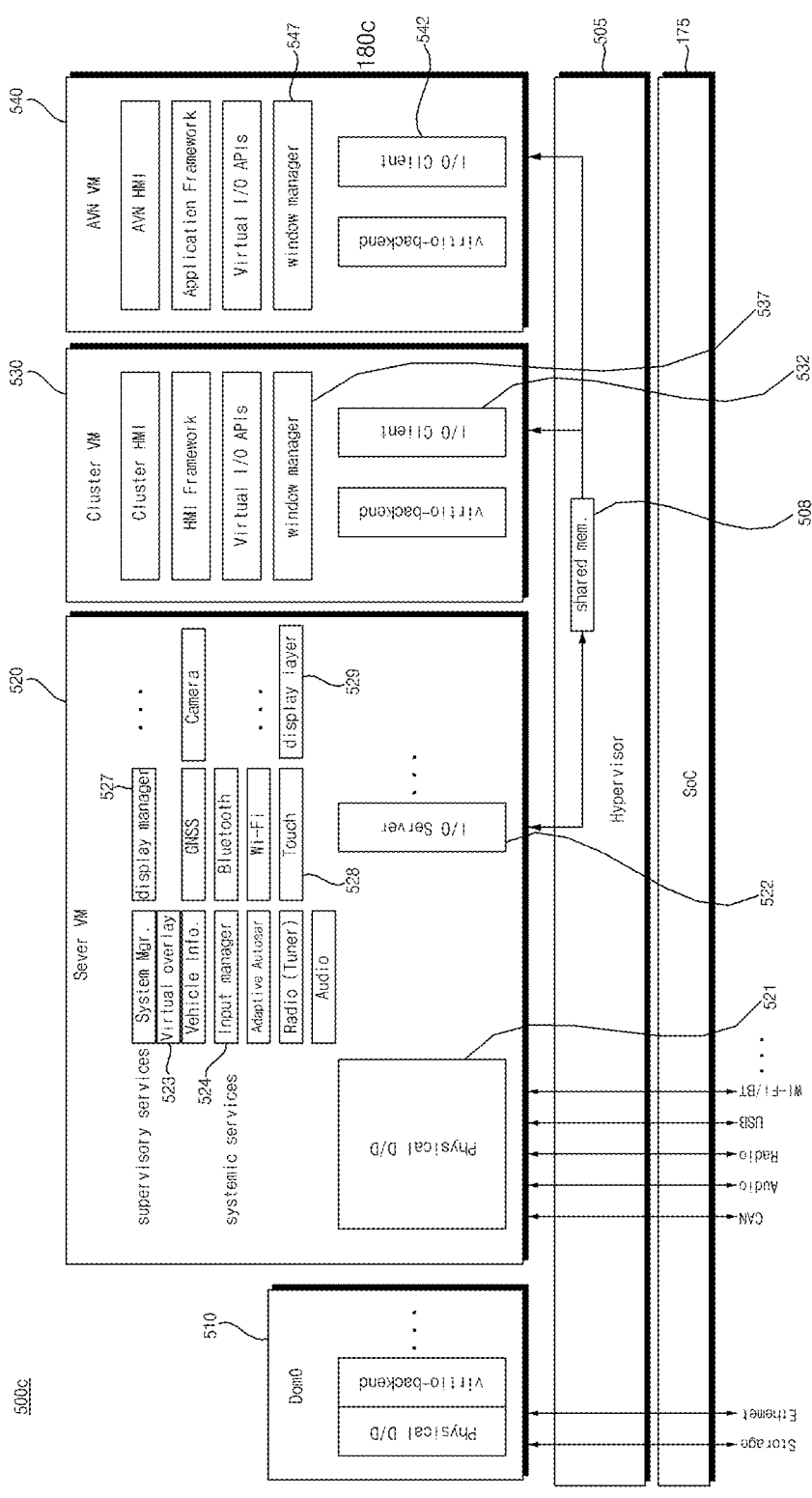
FIG. 7 is a view showing a further example of the system driven in the signal processing device according to an embodiment of the present disclosure.

FIG. 7 is a view showing a further example of the system driven in the signal processing device according to an embodiment of the present disclosure.

Referring to the figure, the system 500c driven by the processor 175 in the signal processing device of FIG. 7 is similar to the system 500b of FIG. 6.

That is, like FIG. 6, the processor 175 of FIG. 7 executes the first to third virtual machines 520 to 540 on the hypervisor 505 in the processor 175.

In FIG. 7, however, the display layer server 529 and the touch server 528 can be provided and executed in the first virtual machine 520 outside the input and output server interface 522, unlike FIG. 6.

In addition, the GNSS server for GPS information input and output, the Bluetooth server for Bluetooth input and output, the Wi-Fi server for Wi-Fi input and output, and the camera server for camera data input and output can be provided and executed in the first virtual machine 520 outside the input and output server interface 522, unlike FIG. 6.

That is, the display manager 527, the display layer server 529, the overlay creator 523, the input manager 524, and the touch server 528 can be provided and executed in the first virtual machine 520.

The operation of the display manager 527, the display layer server 529, the overlay creator 523, the input manager 524, and the touch server 528 is the same to FIG. 5, and therefore a description thereof will be omitted.

Figure 8:
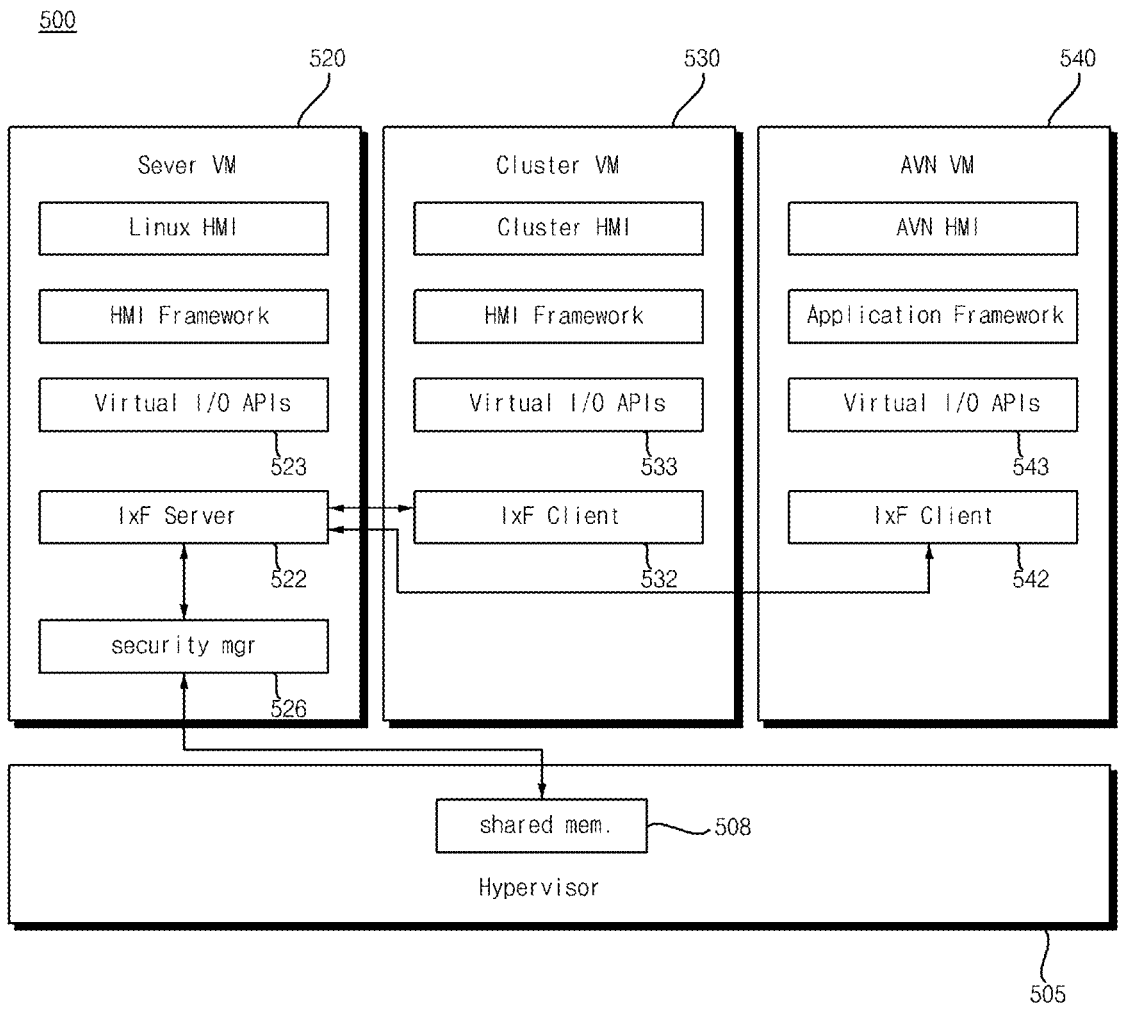
FIGS. 8 to 9B are views referred to in the description of FIG. 5.
Figure 9A:
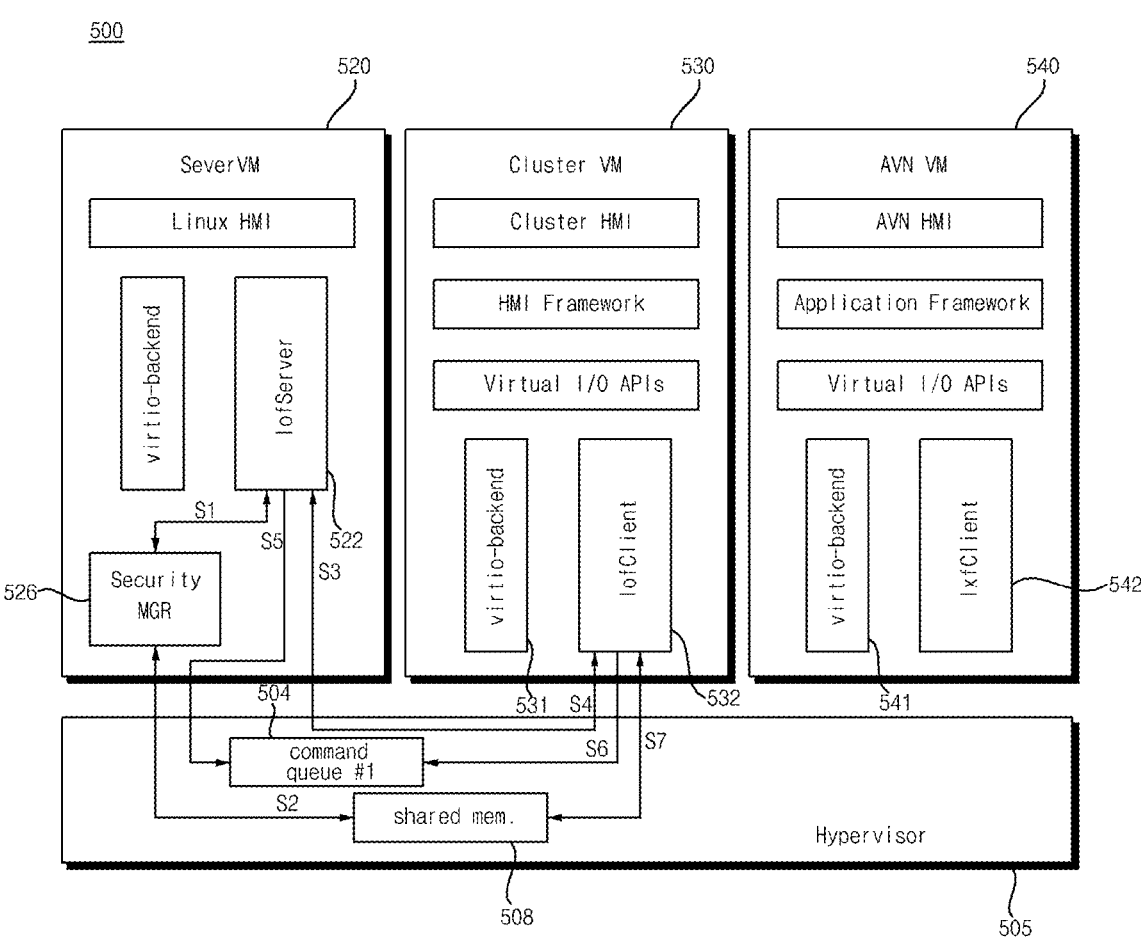
Figure 9B:
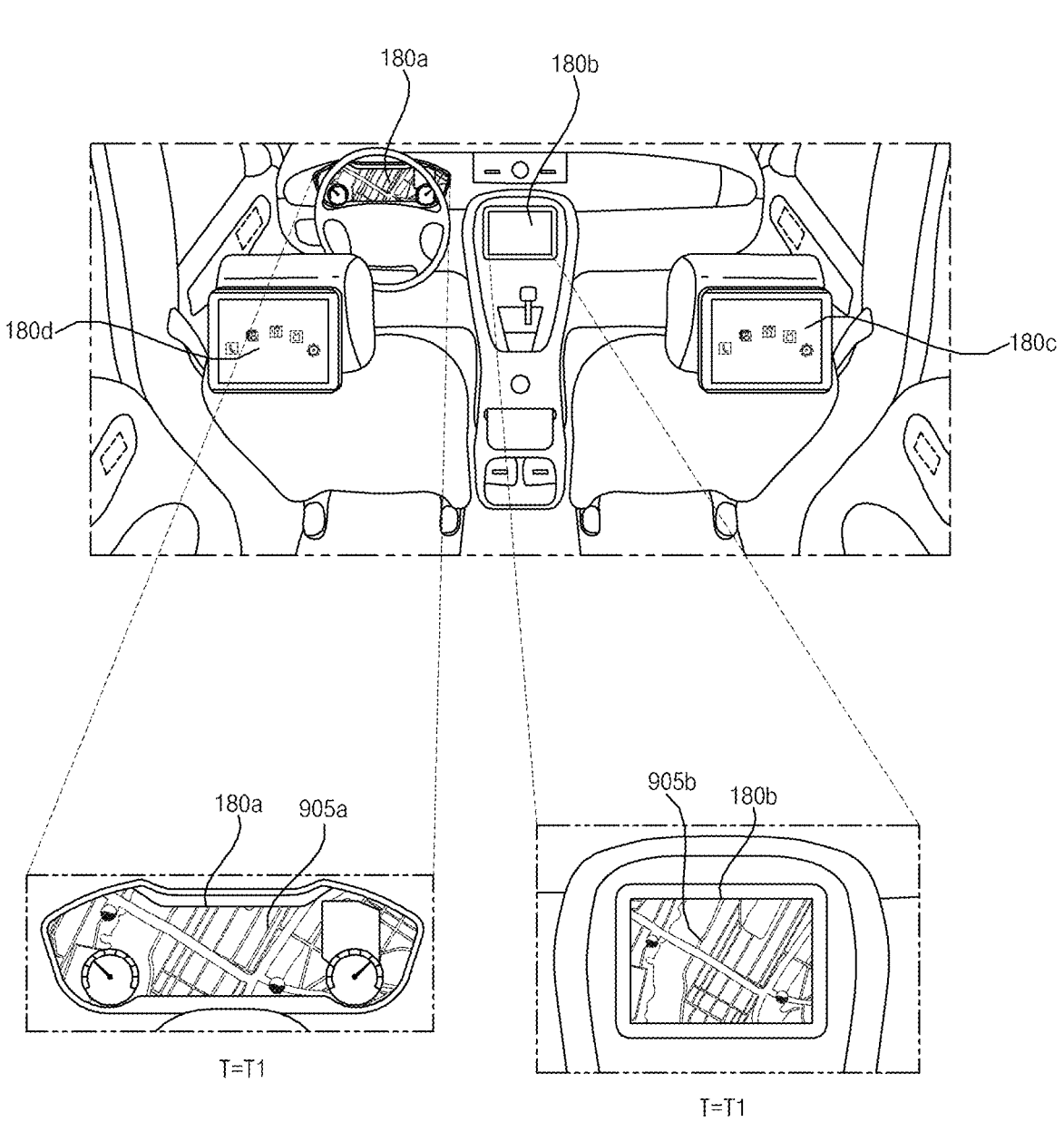

FIGS. 8 to 9B are views referred to in the description of FIG. 5.

First, FIG. 8 illustrates that the first to third virtual machines 520 to 540 are executed on the hypervisor 505 in the processor 175 of the system 500 according to the present disclosure and that the first virtual machine 520 in the processor 175 is configured to set the shared memory 508 based on the hypervisor 505 to transmit the same data to the second virtual machine 530 and the third virtual machine 540.

Consequently, the first display 180a and the second display 180b in the vehicle can be configured to display the same images in a synchronized state.

Meanwhile, high-speed data communication can be performed between the plurality of virtual machines. Furthermore, high-speed data communication can be performed even though the plurality of virtual machines is driven by different operating systems.

Meanwhile, the first virtual machine 520 in the processor 175 can not allocate memories corresponding in number to the virtual machines but can use a single shared memory 508, not memory allocation in response to transmitting the data processed by the first virtual machine 520 to another virtual machine. Consequently, 1:N data communication using the shared memory 508, not 1:1 data communication, can be performed between the virtual machines.

Meanwhile, the first virtual machine 520 in the processor 175 can include an input and output server interface 522 and a security manager 526.

Meanwhile, the second virtual machine 530 and the third virtual machine 540 can include input and output client interfaces 532 and 542, respectively. Consequently, high-speed data communication between the plurality of virtual machines can be performed using the input and output server interface 522 and the input and output client interfaces 532 and 542.

The input and output server interface 522 in the first virtual machine 520 can be configured to receive requests for transmission of the same data from the input and output client interfaces 532 and 542 in the second virtual machine 530 and the third virtual machine 540, and can transmit shared data to the shared memory 508 through the security manager 526 based thereon.

FIG. 9A is a view illustrating transmission of shared data in more detail.

Referring to the figure, to transmit shared data, the input and output server interface 522 in the first virtual machine 520 transmits a request for allocation of the shared memory 508 to the security manager 526 (S1).

Subsequently, the security manager 526 can allocate the shared memory 508 using the hypervisor 505 (S2), and can write shared data in the shared memory 508.

Meanwhile, the input and output client interfaces 532 and 542 can transmit a request for connection to the input and output server interface 522 after allocation of the shared memory 508 (S3).

Meanwhile, the input and output server interface 522 transmits information regarding the shared memory 508 including key data to the input and output client interfaces 532 and 542 after allocation of the shared memory 508 (S4). At this time, the key data can be private key data.

Meanwhile, the first virtual machine 520 in the processor 175 can transmit information regarding the shared memory 508 to the second virtual machine 530 and the third virtual machine 540 after setting of the shared memory 508.

Subsequently, the input and output server interface 522 in the first virtual machine 520 is configured a command or a command queue for event to generate processing, other than data, to control distributed processing between the virtual machines (S5).

The figure illustrates that a command queue is generated in a command queue buffer 504 in the hypervisor 505 under control of the input and output server interface 522. However, the present disclosure is not limited thereto, and the command queue can be generated in the first virtual machine 520, not the hypervisor 505, under control of the input and output server interface 522.

Subsequently, the input and output client interfaces 532 and 542 access the command queue buffer 504 to receive the generated command queue or information regarding the command queue (S6).

For example, in response to the commands transmitted to the input and output client interfaces 532 and 542 being the same, the generated command queues can be the same.

As another example, in response to the commands transmitted to the input and output client interfaces 532 and 542 being different from each other, different command queues can be transmitted to the input and output client interfaces 532 and 542.

Subsequently, the input and output client interfaces 532 and 542 can access the shared memory 508 based on the received key data (S5), and can copy or read the shared data from the shared memory 508 (S7).

Particularly, when the input and output client interfaces 532 and 542 receive the same shared vfv input and output client interfaces 532 and 542 can access the shared memory 508 based on the same command queues and the same key data (S5), and can copy or read the shared data from the shared memory 508.

Consequently, the second virtual machine 530 and the third virtual machine 540 can access the shared memory 508, and can eventually share the shared data.

For example, in the case in which the shared data are video data, the second virtual machine 530 and the third virtual machine 540 can be configured to share the video data, and eventually the plurality of displays 180a and 180b in the vehicle can be configured to display the same shared images in a synchronized state.

FIG. 9B illustrates that, by the system 500 of FIG. 9A, the second virtual machine 530 displays video data received through the shared memory 508 on the first display 180a, and the third virtual machine 540 displays video data received through the shared memory 508 on the second display 180b.

FIG. 9B illustrates that an image 905a displayed on the first display 180a and an image 905b displayed on the second display 180b are synchronized, whereby the same images 905a and 905b are displayed at the time of T1.

That is, video data processed by the first virtual machine 520 in the processor 175 are transmitted to the second virtual machine 530 and the third virtual machine 540 through the shared memory 508, and the first image 905a displayed on the first display 180a and the second image 905b displayed on the second display 180b based on the video data can be the same. Consequently, the plurality of displays 180a and 180b in the vehicle can be configured to display the same images in a synchronized state.

Figure 10:
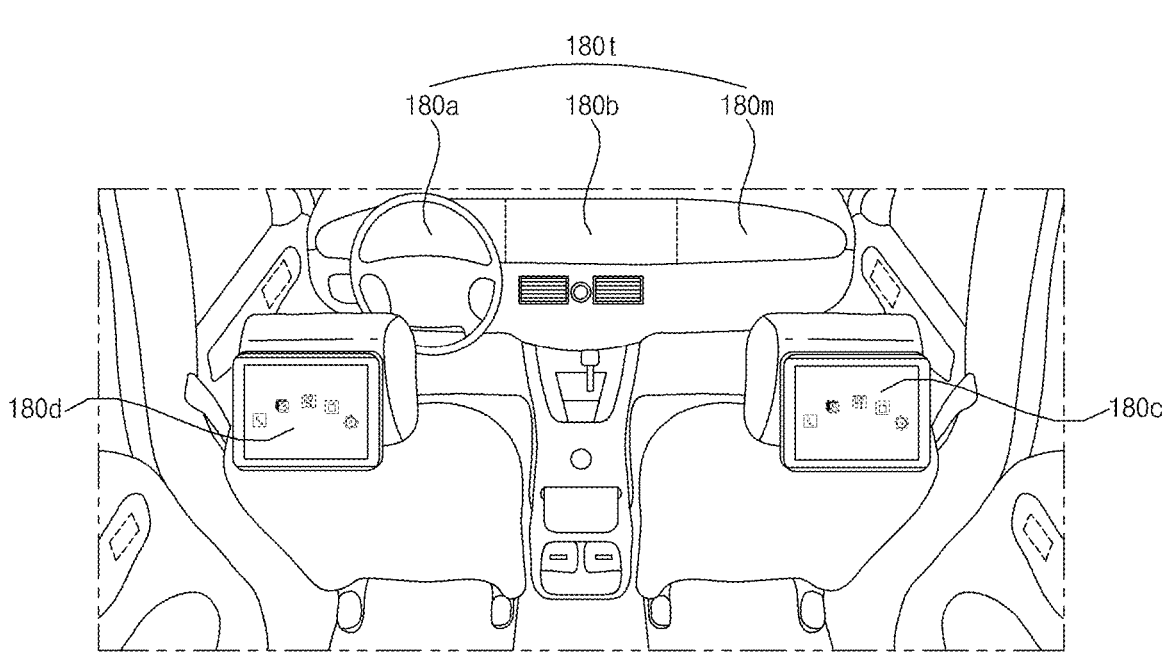
FIG. 10 is a diagram illustrating an appearance of a display apparatus for a vehicle according to another embodiment of the present disclosure.

FIG. 10 is a diagram illustrating an appearance of a display apparatus for a vehicle according to another embodiment of the present disclosure.

Referring to the figure, a display apparatus 100 for a vehicle according to another embodiment of the present disclosure can include a plurality of displays 180a, 180b, and 180m extending from a driver's seat to a passenger seat and a signal processing device 170 that performs signal processing to display images, information, etc. on the plurality of displays 180a, 180b, and 180m.

The plurality of displays 180a, 180b, and 180m can be disposed in a single frame.

For example, the plurality of displays 180a, 180b, and 180m can be implemented as a single seamless display 170t.

Among the plurality of displays 180a, 180b, and 180m, the first display 180a can be a cluster display, the second display 180b can be an AVN display, and the third display 180m can be a passenger seat display.

The signal processing device 170 can have a processor 175 provided therein and execute a server virtual machine 520 and a first guest virtual machine 530 to a third guest virtual machine 550 on the hypervisor 505 within the processor 175.

The first guest virtual machine 530 can be operated for the first display 180a, the second guest virtual machine 540 can be operated for the second display 180b, and the third guest virtual machine 550 can be operated for the third display 180m.

Figure 11:
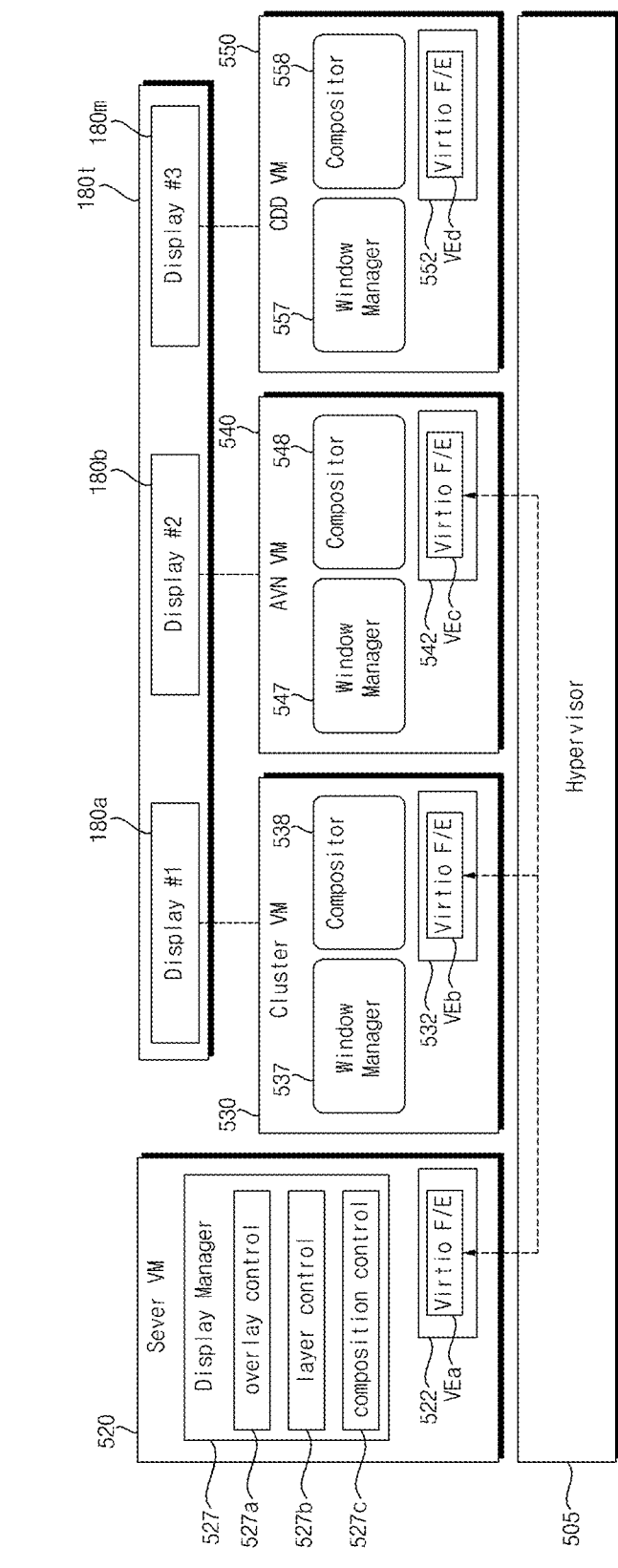
FIG. 11 is a diagram illustrating another example of a system driven by a signal processing device according to an embodiment of the present disclosure.

FIG. 11 is a diagram illustrating another example of a system driven by a signal processing device according to an embodiment of the present disclosure.

Referring to the figure, in the system 500d of FIG. 11, the processor 175 in the signal processing device 170 drives the hypervisor 505 and executes the server virtual machine 520, the first guest virtual machine 530, the second guest virtual machine 540, and the third guest virtual machine 550 on the hypervisor 505.

Meanwhile, the server virtual machine 520 according to an embodiment of the present disclosure can change the layer sequence or display area of an overlay and transmit the changed overlay or information regarding the changed overlay to the first guest virtual machine 530, the second guest virtual machine 540, or the third guest virtual machine 550, so that changed overlay can be displayed on the first display 180a, the second display 180b, or the third display 180m.

Meanwhile, the first guest virtual machine 530, the second guest virtual machine 540, or the third guest virtual machine 550 can combine the changed overlay with each physical overlay and can be configured to display the composite overlay on the first display 180a, the second display 180b, or the third display 180m.

Meanwhile, the server virtual machine 520 can include a display manager 527 including an overlay controller 527a configured to control an overlay, a layer controller 527b configured to control a layer, and a composition controller 527c configured to control the construction or sequence of the layer.

Meanwhile, an input and output server interface 522 in the server virtual machine 520 can include a front interface VEa configured to transmit a command for configuring the overlay to the first guest virtual machine 530 and the second guest virtual machine 540 or to receive a command for configuring the overlay from the first guest virtual machine 530 and the second guest virtual machine 540.

Meanwhile, an input and output client interface 532 in the first guest virtual machine 530 can include a front interface VEb configured to receive a command for configuring the overlay from the server virtual machine 520 or to transmit a command for configuring the overlay to the server virtual machine 520.

Meanwhile, the first guest virtual machine 530 can include a window manager 537 configured to control a window of an image in which an overlay will be generated or displayed and compositor 538 configured to combine overlays or windows generated by the first guest virtual machine 530.

Meanwhile, an input and output client interface 542 in the second guest virtual machine 540 can include a front interface VEc configured to receive a command for configuring the overlay from the server virtual machine 520 or to transmit a command for configuring the overlay to the server virtual machine 520.

Meanwhile, the second guest virtual machine 540 can include a window manager 547 configured to control a window of an image in which an overlay will be generated or displayed and a compositor 548 configured to combine overlays or windows generated by the second guest virtual machine 540.

Meanwhile, an input and output client interface 552 in the third guest virtual machine 550 can include a front interface VEd configured to receive a command for configuring the overlay from the server virtual machine 520 or to transmit a command for configuring the overlay to the server virtual machine 520.

Meanwhile, the third guest virtual machine 550 can include a window manager 557 configured to control a window of an image in which an overlay will be generated or displayed and a compositor 558 configured to combine overlays or windows generated by the third guest virtual machine 550.

Meanwhile, the server virtual machine 520 and the first guest virtual machine 530 to the third guest virtual machine 550 can transmit or receive each overlay or video data using the shared memory 508.

Meanwhile, the server virtual machine 520 can change the construction of the layer displayed on the first display 180*a*, the second display 180*b*, or the third display 180*m* during run time. Consequently, the configuration of the layer displayed during run time can be changed.

Meanwhile, the server virtual machine 520 can be configured to move the generated overlay or image to be moved from the first display 180*a*, the second display 180*b*, or the third display 180*m* to be displayed. Consequently, the generated overlay or image can be easily moved.

Figure 12A:
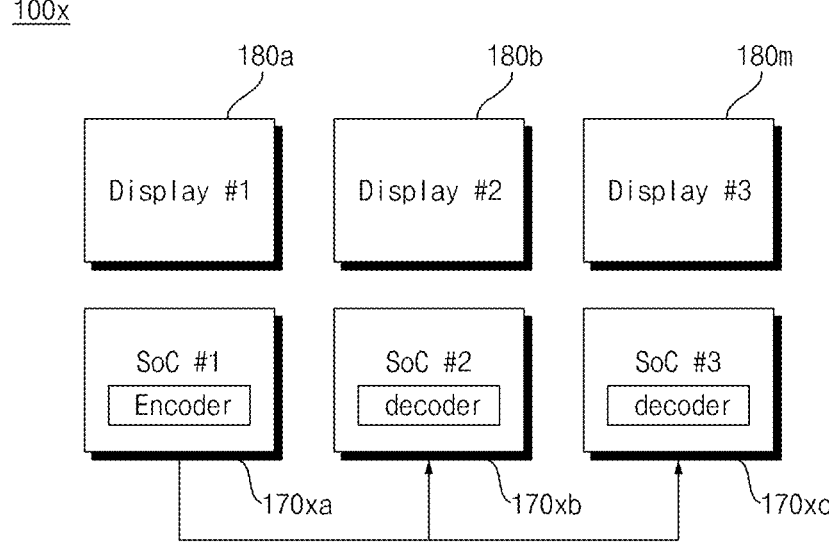
FIGS. 12A to 12C are examples of internal block diagrams of a display apparatus for a vehicle related to the present disclosure.
Figure 12B:
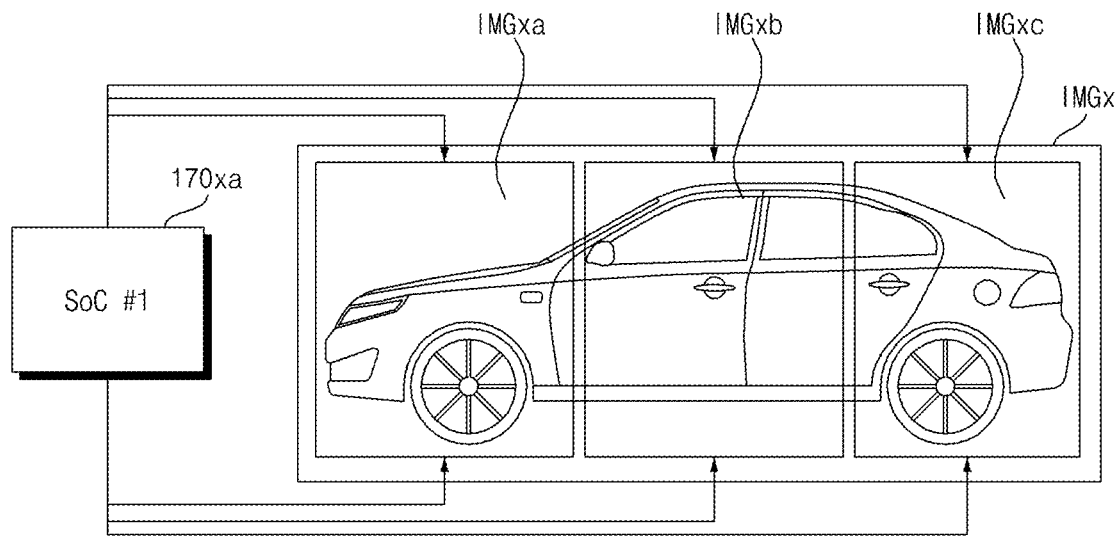
Figure 12C:
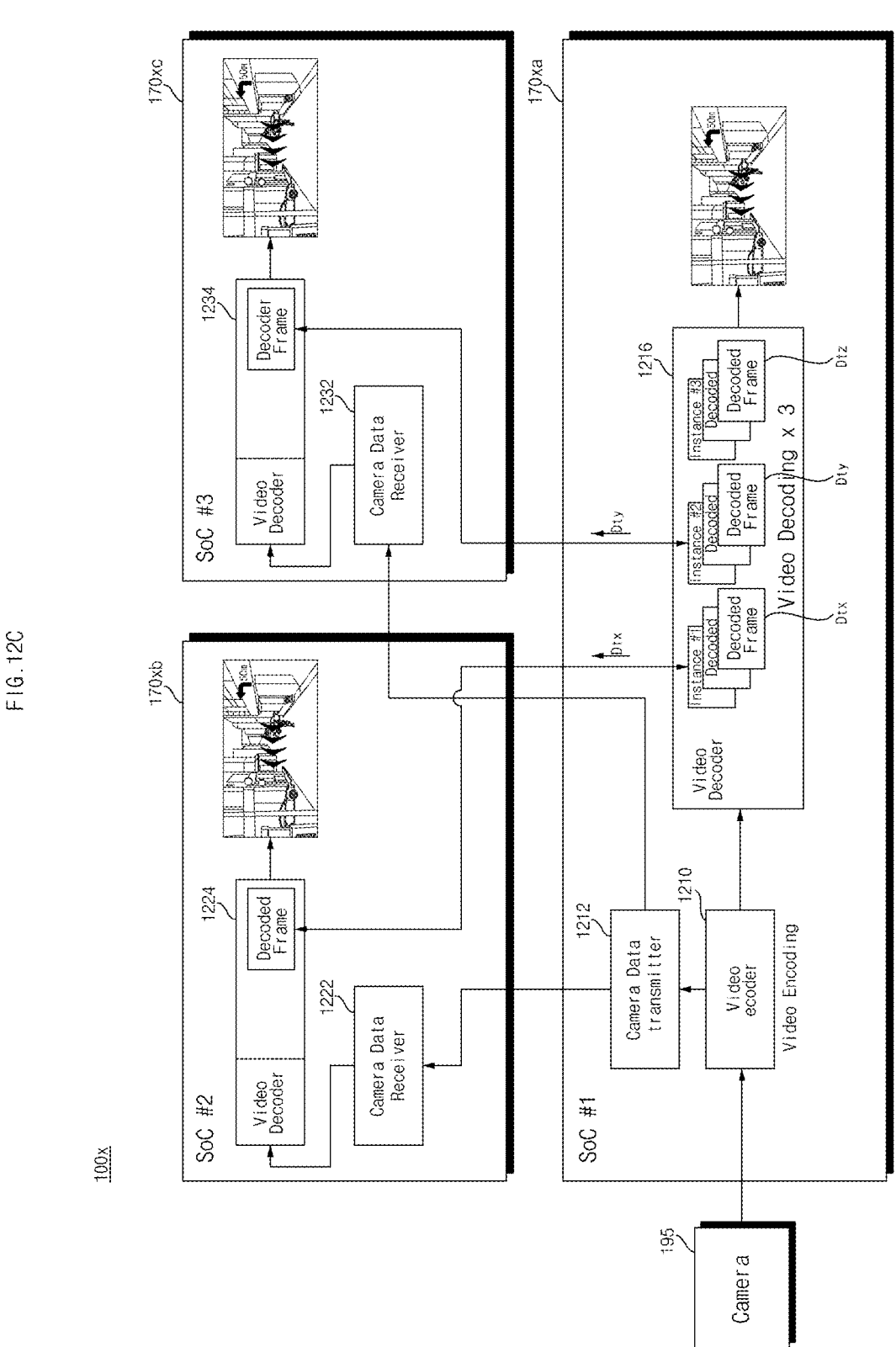

FIGS. 12A to 12C are diagrams illustrating an operation of a display apparatus for a vehicle related to the present disclosure.

First, FIG. 12A is an example of an internal block diagram of a display apparatus for a vehicle related to the present disclosure.

Referring to the figure, a display apparatus 100*x* for a vehicle related to the present disclosure can include a first display 180*a*, a second display 180*b*, and a third display 180*m* and can include signal processing devices 170*xa*, 170*xb*, and 170*xc* for driving the displays. respectively.

For example, in order to move an image displayed on the first display 180*a* to display the image on the second display 180*b* and the third display 180*m*, encoded video data has to be transmitted from the first signal processing device 170*xa* to the second signal processing device 170*xb* and the third signal processing device 170*xc* via a cable, and the second signal processing device 170*xb* and the third signal processing device 170*xc* have to each decode the encoded video data and perform image display based on the decoded video data.

Accordingly, in the case of moving and displaying images and copying and displaying images using the respective signal processing device 170*xa*, 170*xb*, and 170*xc* for each of a plurality of displays 180*a*, 180*b*, and 180*m*, there is a problem that the amount of image processing and delay significantly increases.

FIGS. 12B to 12C are diagrams referred to in the description of FIG. 12A.

FIG. 12B illustrates that the first signal processing device 170*xa* divides an image IMGx into three areas IMGxa, IMGxb, and IMGxc.

For example, in order to display the three areas IMGxa, IMGxb, and IMGxc on the plurality of displays 180*a*, 180*b*, and 180*m* in FIG. 12A, the first signal processing device 170*xa* can encode two areas MGxb and IMGxc among the three areas IMGxa, IMGxb, and IMGxc and transmit the same to the second signal processing device 170*xb* and the third signal processing device 170*xc* via a cable.

Also, the second signal processing device 170*xb* and the third signal processing device 170*xc* can be configured to receive encoded video data of a corresponding area among the two areas MGxb and IMGxc and perform decoding, respectively. In this manner, in the case of moving and displaying images or copying and displaying images using the respective signal processing device 170*xa*, 170*xb*, and 170*xc*, the image processing amount and delay are significantly increased.

FIG. 12C is a diagram illustrating that camera data is processed in the display apparatus 100*x* for a vehicle of FIG. 12A.

Referring to the figure, the first signal processing device 170*xa* includes an encoder 1210 that is configured to receive and encode camera data, a transmitter 1212 that transmits the encoded camera data, and a decoder 1216 that decodes the encoded camera data.

The decoder 1216 performs decoding three times for the first display 180*a*, the second signal processing device 170*xb*, and the third signal processing device 170*xc* and output three decoded camera data Dtx, Dty, and Dtz respectively.

For example, the first decoded camera data Dtx and the second decoded camera data Dty are output to the second signal processing device 170*xb* and the third signal processing device 170*xc*, respectively, and the third decoded camera data Dtz is displayed on the first display 180*a*.

The second signal processing device 170*xb* includes a camera data receiver 1222 that is configured to receive camera data and a decoder 1224 that decodes the camera data.

Meanwhile, the decoder 1224 is configured to receive the first decoded camera data Dtx from the first signal processing device 170*xa*, processes the first decoded camera data Dtx, and displays the same on the second display 180*b*.

The third signal processing device 170*xc* includes a camera data receiver 1232 that is configured to receive the camera data and a decoder 1234 that decodes the camera data.

Meanwhile, the decoder 1234 is configured to receive the third decoded camera data Dty from the first signal processing device 170*xa*, processes the third decoded camera data Dty, and displays the same on the third display 180*c*.

According to FIG. 12C, since the same camera data is decoded three times and three decoded camera data Dtx, Dty, and Dtz are output respectively, there is a problem that the amount of image processing and delay significantly increases. In this regard, the present disclosure proposes a method for reducing delay in displaying images between a plurality of displays. This will be described with reference to FIG. 13A and subsequent figures.

Figure 13A:
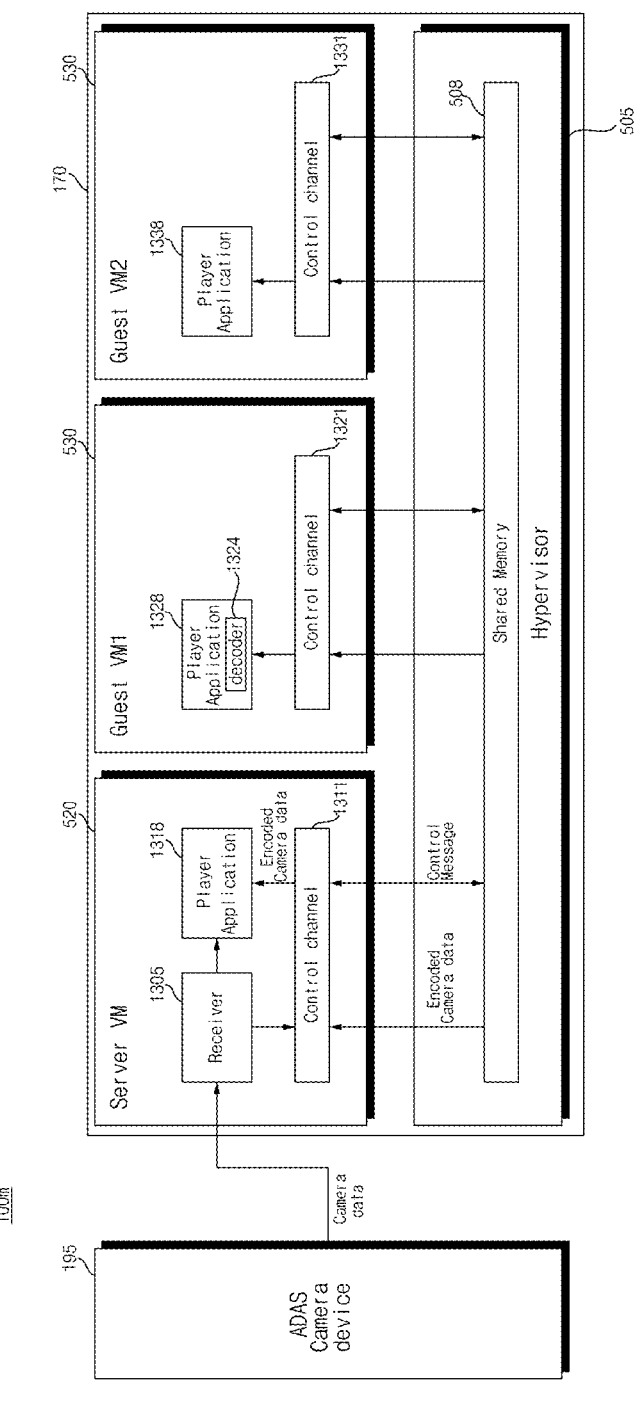
FIG. 13A is an example of an internal block diagram of a display apparatus for a vehicle according to an embodiment of the present disclosure.

FIG. 13A is an example of an internal block diagram of a display apparatus for a vehicle according to an embodiment of the present disclosure.

Referring to the figure, a display apparatus 100*m* for a vehicle according to an embodiment of the present disclosure includes at least one camera 195 and a signal processing device 170 that performs signal processing of video data from the camera.

The signal processing device 170 according to an embodiment of the present disclosure includes a processor 175 that performs signal processing for a plurality of displays 180*a* and 180*b* mounted on a vehicle.

The processor 175 according to an embodiment of the present disclosure executes a server virtual machine 520 and a plurality of guest virtual machines 530 and 540 on the hypervisor 505 within the processor 175.

Among the plurality of guest virtual machines 530 to 550, the first guest virtual machine 530 and the second guest virtual machine 540 operate for the first display 180*a* and the second display 180*b*, respectively.

The server virtual machine 520 is configured to encode processed video data and store the encoded video data in the shared memory 508.

The first guest virtual machine 530 is configured to receive and decode encoded video data stored in the shared memory 508 and store the decoded video data in the shared memory 508.

The second guest virtual machine 540 is configured to receive decoded video data stored in the shared memory 508 and display at least a portion of the decoded video data on the second display 180b. Accordingly, the delay in displaying images between the plurality of displays 180a and 180b can be reduced.

Meanwhile, the first guest virtual machine 530 can be configured to receive and decode encoded video data stored in the shared memory 508 and display at least a portion of the decoded video data on the first display 180a. Accordingly, the delay in displaying images between the plurality of displays 180a and 180b can be reduced. In addition, images corresponding to the resolutions of the plurality of displays 180a and 180b can be displayed with reduced delay.

Meanwhile, the video data can be camera data, radar data, lidar data, streaming data, etc.

For example, the server virtual machine 520 can be equipped with a receiver 1305 that is configured to receive camera data from a camera 195 and execute a playback application 1318 and a control channel 1311.

The server virtual machine 520 can store the encoded camera data in the shared memory 508 through the control channel 1311 and transmit a control message to the shared memory 508.

For example, the control channel 1311 can transmit a control message related to bit rate, latency negotiation, buffer sharing, or time stamp (e.g., frame forced drop) to the shared memory 508.

The first guest virtual machine 530 can execute a playback application 1328 and a control channel 1321. The control channel 1321 can operate similarly to the control channel 1311.

For example, the first guest virtual machine 530 can be configured to receive the encoded camera data through the control channel 1321 and decode the encoded camera data through a decoder 1324 in the playback application 1328.

Also, the first guest virtual machine 530 can store the decoded camera data in the shared memory 508 through the control channel 1321 and transmit a control message to the shared memory 508.

The second guest virtual machine 540 can execute a playback application 1338 and the control channel 1331. The control channel 1331 can operate similarly to the control channel 1311.

For example, the second guest virtual machine 540 is configured to receive the decoded camera data through the control channel 1331, receive the decoded camera data through the playback application 1338, and display the decoded camera data on the second display 180b. Accordingly, the delay in displaying images between the plurality of displays 180a and 180b can be reduced.

Figure 13B:
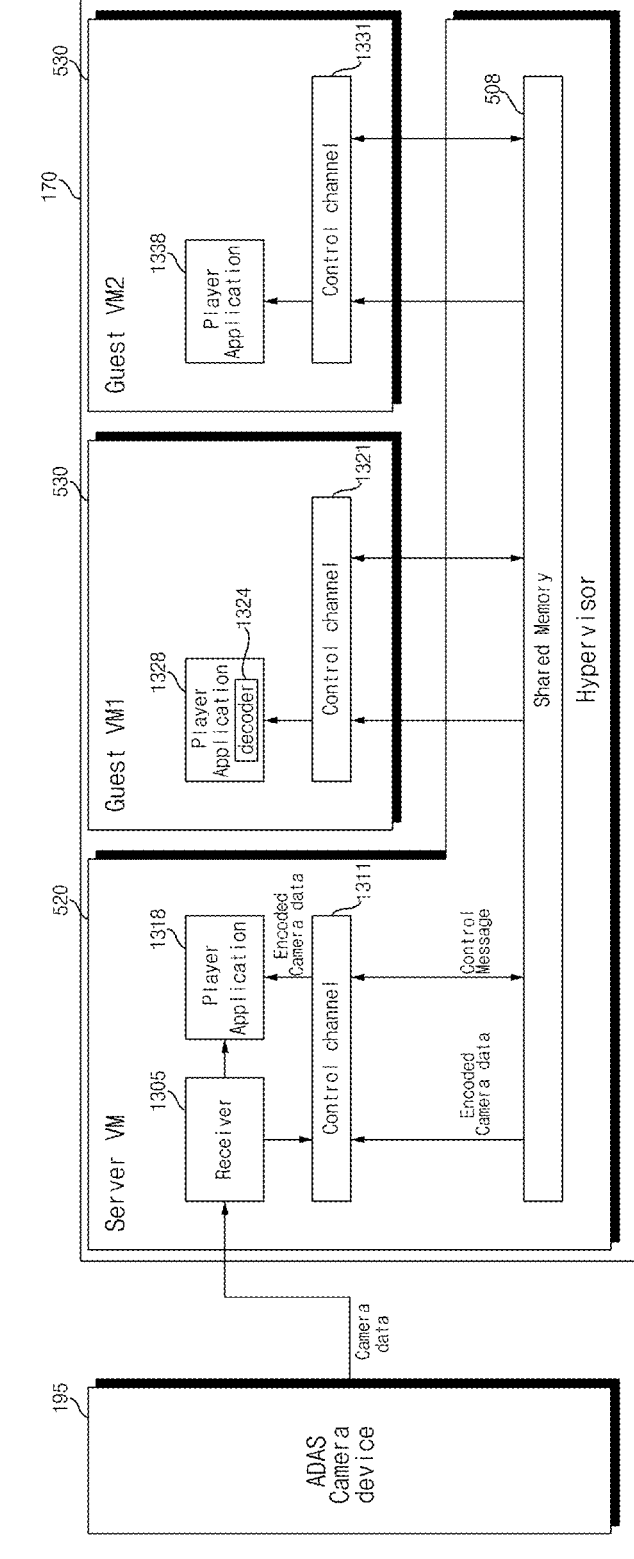
FIG. 13B is an example of an internal block diagram of a display apparatus for a vehicle according to another embodiment of the present disclosure.

FIG. 13B is an example of an internal block diagram of a display apparatus for a vehicle according to another embodiment of the present disclosure.

Referring to the figure, the signal processing device 170 of FIG. 13B is similar to the signal processing device of FIG. 13A, but differs in that the hypervisor 505 and the shared memory 508 are provided within the server virtual machine 520, and other operations can be performed in the same manner.

FIG. 14A to FIG. 16 are diagrams referred to in the description of an operation of FIG. 13A.

Figure 14A:
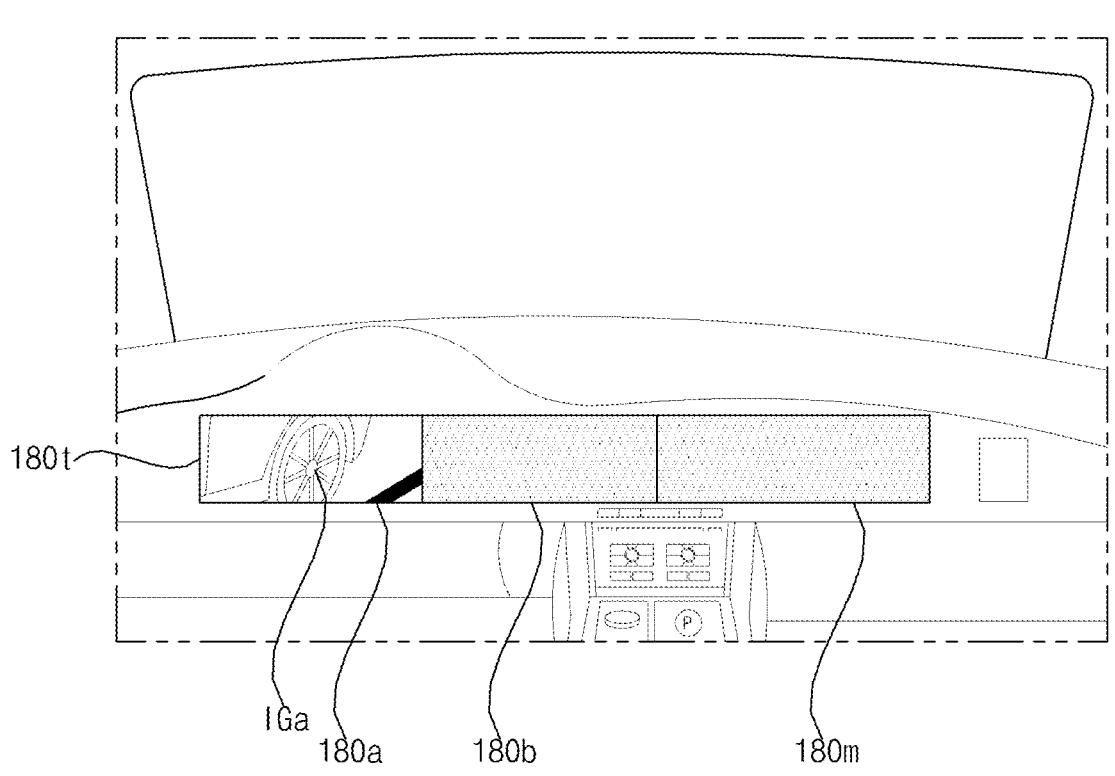
FIGS. 14A to 16 are diagrams referred to in description of an operation of FIG. 13A.

FIG. 14A illustrates that an image 180t based on camera data is displayed on the first display 180a among the plurality of displays 180a, 180b, and 180m within the vehicle 200.

In this manner, since the image 180t based on the camera data is displayed only on a lower portion of the vehicle, particularly, a tire portion, which is a portion of the plurality of displays 180a, 180b, and 180m, it can be difficult to recognize an external situation based on the camera data.

Figure 14B:
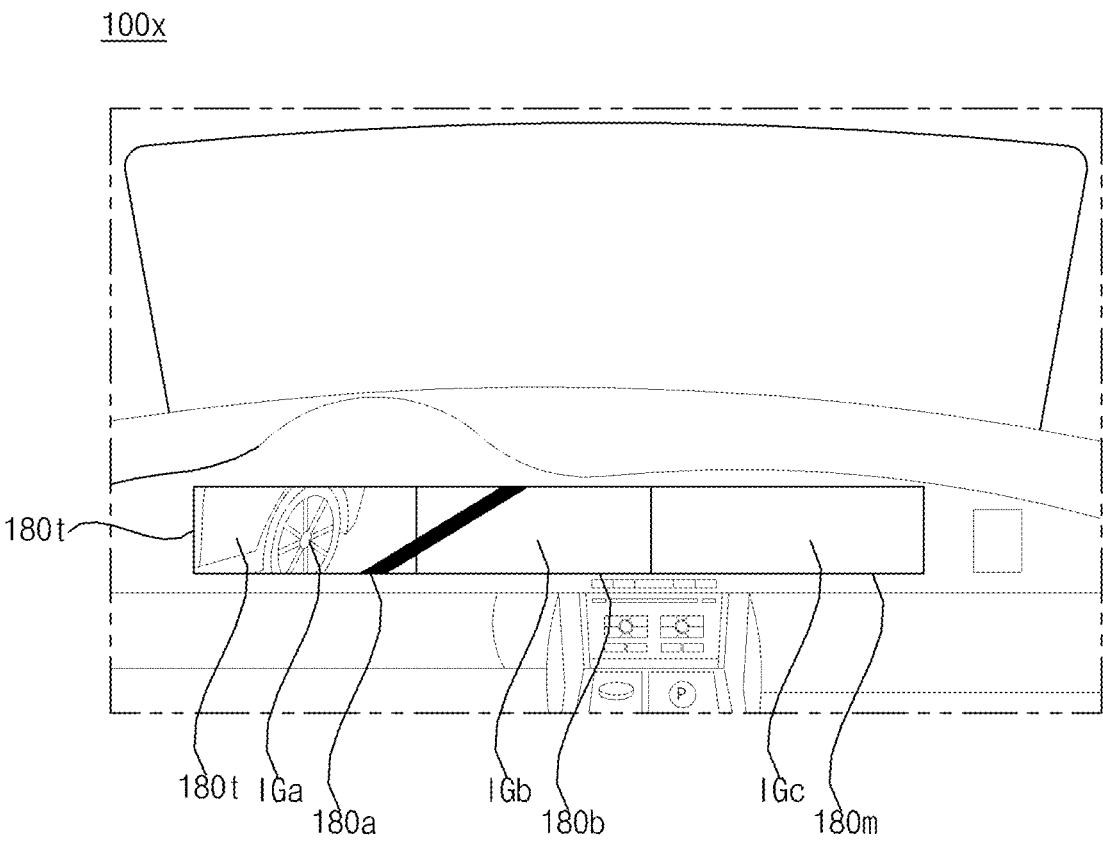

FIG. 14B illustrates that an image 180t based on camera data is displayed on all of the plurality of displays 180a, 180b, and 180m in the vehicle 200.

In this manner, since the image 180t based on the camera data is displayed on all of the plurality of displays 180a, 180b, and 180m, recognition of an external situation based on the camera data can be improved.

To this end, it is preferable that the signal processing device 170 according to an embodiment of the present disclosure operates as in FIG. 13A or FIG. 13B.

Meanwhile, in order to control the operation of the third display 180m, the signal processing device 170 according to an embodiment of the present disclosure can be configured to receive the decoded video data stored in the shared memory 508 and display at least a portion of the decoded video data on the third display 180m.

Meanwhile, the second guest virtual machine 540 and the third guest virtual machine 550 can be configured to share a portion of the shared memory 508 in which the decoded video data is stored. Accordingly, the delay in displaying images between the plurality of displays 180a and 180b can be reduced.

Figure 14C:
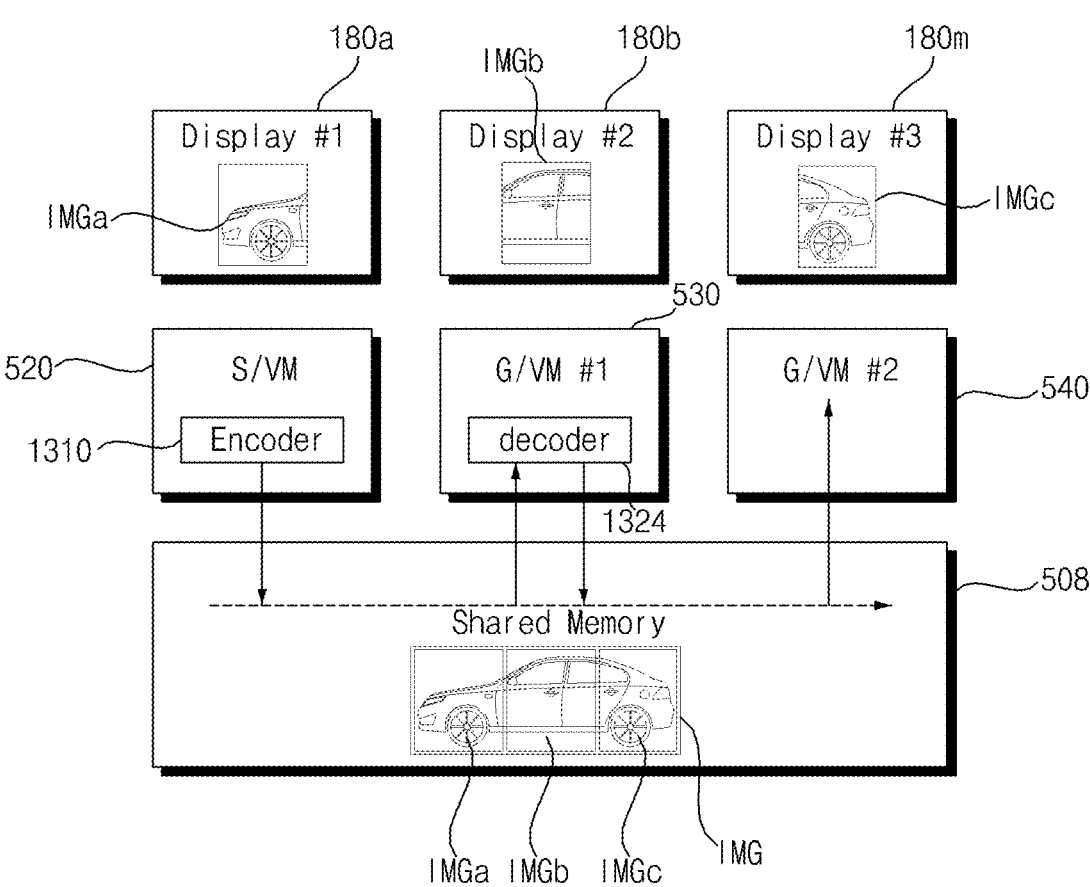

FIG. 14C is a diagram illustrating that the first guest virtual machine 530 decodes camera data divided into three areas.

Referring to the figure, the server virtual machine 520 within the signal processing device 170 can be configured to receive camera data, encode the camera data through the encoder 1310, and store the encoded camera data in the shared memory 508.

The first guest virtual machine 530 can be configured to receive the encoded camera data from the shared memory 508, decode the same, and store the decoded camera data in the shared memory 508.

In addition, the first guest virtual machine 530 can be configured to display the camera data IMGa of the first area among the decoded camera data on the first display 180a.

Next, the second guest virtual machine 540 can be configured to receive the decoded camera data from the shared memory 508, display the camera data IMGb of the second area among the decoded camera data on the second display 180b, and display the camera data IMGc of the third area on the third display 180m.

In this manner, since one decoding, etc. is performed on the same camera data, the amount of image processing and delay are significantly reduced compared to FIG. 12C, etc.

Meanwhile, unlike FIG. 14C, the third guest virtual machine 550 can be further executed within the signal processing device 170.

Accordingly, the second guest virtual machine 540 can be configured to receive the decoded camera data from the shared memory 508, display the camera data IMGb of the second area among the decoded camera data on the second display 180b, and the third guest virtual machine 550 can be configured to display the camera data IMGc of the third area on the third display 180m.

Figure 14D:
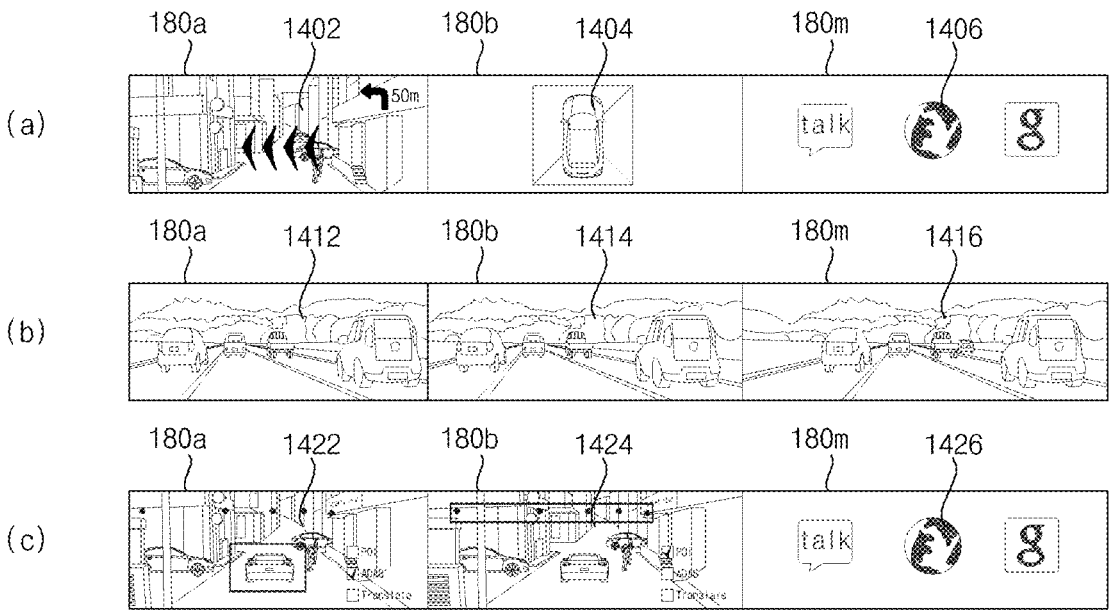

FIG. 14D illustrates various images displayed on the first to third displays 180a, 180b, and 180m.

(a) of FIG. 14D illustrates that a camera image 1402, a surround view image 1404, and an application screen image 1406 are displayed on the first to third displays 180a, 180b, and 180m, respectively.

The first to third guest virtual machines 530 to 550 can perform signal processing to display the images 1402, 1404, and 1406, respectively.

(b) of FIG. 14D illustrates that camera images 1412, 1414, and 1416 are displayed on the first to third displays 180a, 180b, and 180m, respectively.

The first to third guest virtual machines 530 to 550 can perform signal processing to display the camera images 1412, 1414, and 1416, respectively.

(c) of FIG. 14D illustrates that camera images 1422, camera images 1424, and application screen images 1426 are displayed on the first to third displays 180a, 180b, and 180m, respectively.

The first to third guest virtual machines 530 to 550 can perform signal processing to display the images 1422, 1424, and 1426.

Meanwhile, as in (c) of FIG. 14D, when copying and displaying an image between the plurality of displays 180a and 180b, the first guest virtual machine 530 is configured to receive and decode the encoded camera data stored in the shared memory 508 and store the decoded camera data in the shared memory 508, and the second guest virtual machine 540 is configured to receive the decoded camera data stored in the shared memory 508 and display the decoded camera data on the second display 180b.

That is, the first guest virtual machine 530 can be configured to display the camera image 1422 on the first display 180a at a first time point and at a second time point after the first time point, and the second guest virtual machine 540 can be configured to display the camera image 1424 corresponding to the camera image 1422 on the second display 180b at the second time point. Accordingly, the delay in copying and displaying the image between the plurality of displays 180a and 180b can be reduced.

Meanwhile, the second guest virtual machine 540 can be configured to output the scaled second image to the second display 180b based on the size, output resolution, or operating system of the second display 180b.

That is, the second guest virtual machine 540 can be configured to output the scaled camera image 1424 to the second display 180b based on the size, output resolution, or operating system of the second display 180b. Accordingly, images corresponding to the resolutions of the plurality of displays 180a and 180b can be displayed with reduced delay.

Meanwhile, as in (b) of FIG. 14D, when copying and displaying an image between the plurality of displays 180a, 180b, and 180m, the first guest virtual machine 530 can be configured to receive and decode encoded camera data stored in the shared memory 508 and store the decoded camera data in the shared memory 508, the second guest virtual machine 540 can be configured to receive the decoded camera data stored in the shared memory 508 and display the decoded camera data on the second display 180b, and the third guest virtual machine 550 can be configured to receive the decoded camera data stored in the shared memory 508 and display the decoded camera data on the third display 180m.

That is, the first guest virtual machine 530 can be configured to display the camera image 1412 on the first display 180a at the first time point, the second time point after the first time point, and a third time point after the second time point, the second guest virtual machine 540 can be configured to display the camera image 1414 corresponding to the camera image 1412 on the second display 180b at the second time point and the third time point, and the third guest virtual machine 550 can be configured to display the camera image 1416 corresponding to the camera image 1412 on the third display 180c at the third time point. Accordingly, the delay in copying and displaying the image between the plurality of displays 180a, 180b, and 180m can be reduced.

Meanwhile, the second guest virtual machine 540 can be configured to output the scaled second image to the second display 180b based on the size, output resolution, or operating system of the second display 180b.

That is, the second guest virtual machine 540 can be configured to output the scaled camera image 1414 to the second display 180b based on the size, output resolution, or operating system of the second display 180b. Accordingly, the images corresponding to the resolutions of the plurality of displays 180a and 180b can be displayed with reduced delay.

Meanwhile, the third guest virtual machine 550 can be configured to output the scaled third image to the third display 180m based on the size, output resolution, or operating system of the third display 180m.

That is, the third guest virtual machine 550 can be configured to output the scaled camera image 1416 to the third display 180m based on the size, output resolution, or operating system of the third display 180m. Accordingly, images corresponding to the resolutions of the plurality of displays 180a, 180b, and 180m can be displayed with reduced delay.

Figure 15A:
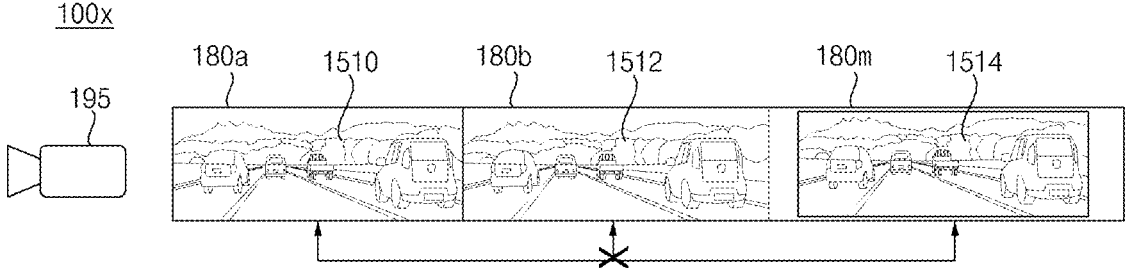

FIG. 15A is a diagram illustrating that three signal processing devices 170xa, 170xb, and 170xc are used for three displays 180a, 180b, and 180m, as in FIG. 12A.

Referring to the figure, camera data from the camera 195 is received, and three signal processing devices 170xa, 170xb, and 170xc perform decoding, etc., and display camera images 1510, 1512, and 1514, respectively, so that the amount of image processing and delay significantly increase.

Figure 15B:
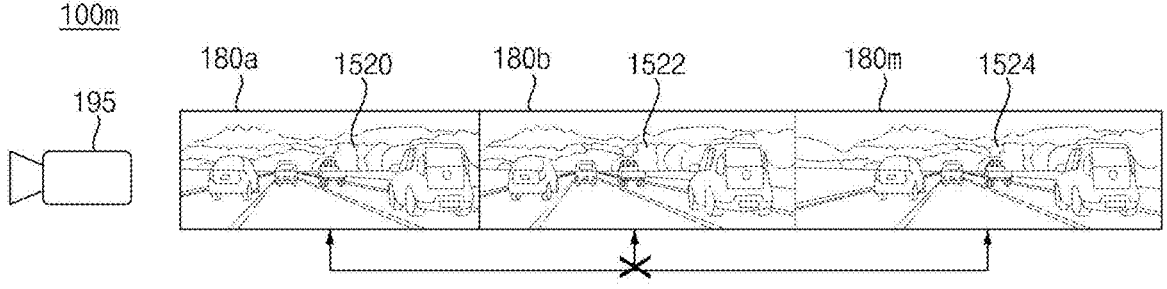

FIG. 15B is a diagram illustrating that three guest virtual machines 530, 540, and 550 within one signal processing device 170 are used for three displays 180a, 180b, and 180m, as in (b) of FIG. 14D.

Referring to the figure, the server virtual machine 520 can be configured to receive camera data from the camera 195 and store the encoded camera data in the shared memory 508.

Also, among the three guest virtual machines 530, 540, and 550, the first guest virtual machine 530 can be configured to receive encoded camera data from the shared memory 508, decode the same, and store the decoded camera data in the shared memory 508.

Also, the first guest virtual machine 530 can be configured to receive the decoded camera data and display the camera image 1412.

Also, the remaining two guest virtual machines 540 and 550 can be configured to receive the decoded camera data from the shared memory 508 and display the camera image 1414 and 1416, respectively. Accordingly, the amount of image processing and delay when copying and displaying the image between a plurality of displays 180a, 180b, and 180m can be significantly reduced.

Figure 15C:
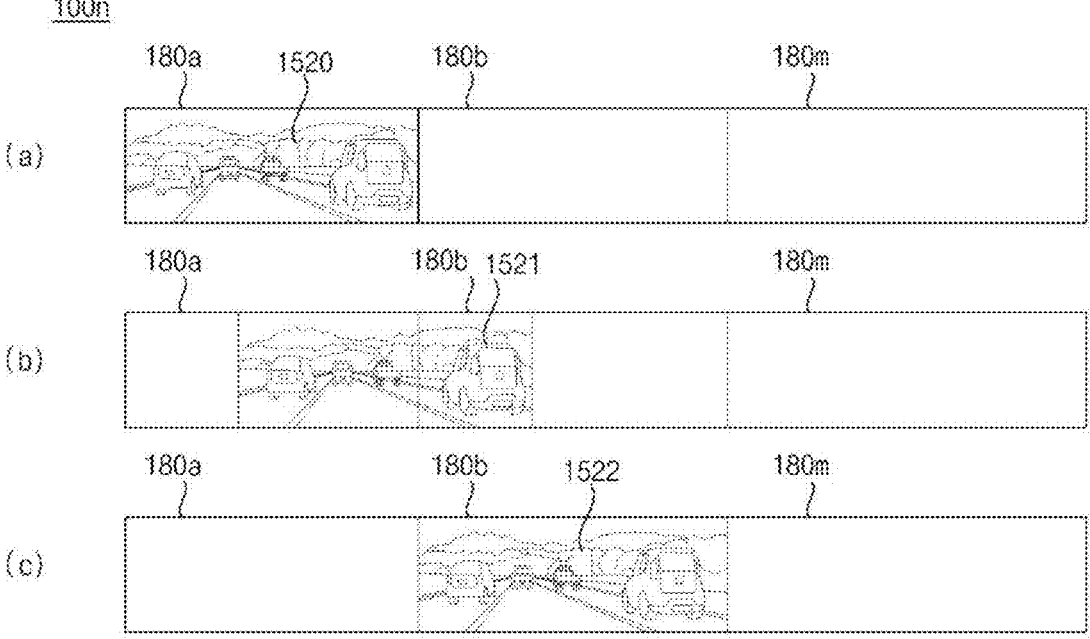

FIG. 15C is a diagram referred to describe movement of images between the plurality of displays 180a, 180b, and 180m.

Referring to the figure, the first guest virtual machine 530 in the signal processing device 170 according to an embodiment of the present disclosure can be configured to display the camera image 1520 on the first display 180a among the three displays 180a, 180b, and 180m, as shown in (a) of FIG. 15C.

For the movement of the camera image, the first guest virtual machine 530 and the second guest virtual machine 540 in the signal processing device 170 according to an embodiment of the present disclosure can be configured to display a portion of the camera image 1521, as shown in (b) of FIG. 15C.

Next, the second guest virtual machine 540 in the signal processing device 170 according to an embodiment of the present disclosure can be configured to display the camera image 1522 on the second display 180b, as in (c) of FIG. 15C.

To this end, the first guest virtual machine 530 can be configured to receive encoded camera data controlled by the server virtual machine 520 from the shared memory 508 and decode the camera data.

Also, the first guest virtual machine 530 can store the decoded camera data in the shared memory 508, and the second guest virtual machine 540 can be configured to receive the decoded camera data stored in the shared memory 508 and display the camera image 1522.

That is, the first guest virtual machine 530 can be configured to display the camera image 1520 on the first display 180a at the first time point, and the second guest virtual 540 can be configured to display the camera image 1522 corresponding to the camera image 1520 on the second display 180b at the second time point after the first time point. Accordingly, the delay in moving and displaying the image between the plurality of displays 180a and 180b can be reduced and the image can be displayed seamlessly.

Meanwhile, it is also possible to move the image displayed on the first display 180a to be displayed on the third display 180m.

For example, the first guest virtual machine 530 can be configured to display the first image on the first display 180a at the first time point, and the third guest virtual machine 550 can be configured to display the second display 180b corresponding to the first image on the third display 180m at the second time point after the first time point. Accordingly, the delay in moving and displaying the image between the plurality of displays 180a and 180b can be reduced.

Meanwhile, it is also possible to sequentially move the image displayed on the first display 180a to be displayed on second display 180b and the third display 180m.

For example, the first guest virtual machine 530 can be configured to display the first image on the first display 180a at the first time point, the second guest virtual machine 540 can be configured to display the second image corresponding to the first image on the second display 180b at a second time point after the first time point, and the third guest virtual machine 550 can be configured to display the third image corresponding to the first image on the third display 180m at the third time point after the second time point. Accordingly, the delay in moving and displaying the image movement between the plurality of displays 180a and 180b can be reduced.

Meanwhile, in the descriptions in FIGS. 13A to 15C, the first guest virtual machine 530 is described as decoding the encoded video data, but, unlike this, the server virtual machine 520 can also decode the encoded video data.

According to another embodiment of the present disclosure, the server virtual machine 520 in the signal processing device 170 is configured to encode processed video data and store the encoded video data in the shared memory 508, the first guest virtual machine 530 is configured to receive the encoded video data stored in the shared memory 508 and transmit a decoding request to the server virtual machine 520, the server virtual machine 520 is configured to decode the encoded video data based on the decoding request and store the decoded video data in the shared memory 508, and the first guest virtual machine 530 is configured to receive the decoded video data stored in the shared memory 508 and display at least a portion of the decoded video data on the first display 180a. Accordingly, a delay in displaying an image between the plurality of displays 180a and 180b can be reduced.

Meanwhile, the second guest virtual machine 540 can be configured to receive the decoded video data stored in the shared memory 508 and display at least a portion of the decoded video data on the second display 180b. Accordingly, the delay in displaying the image between the plurality of displays 180a and 180b can be reduced. In addition, the image corresponding to the resolution of each of the plurality of displays 180a and 180b can be displayed with reduced delay.

The signal processing device 170 according to another embodiment of the present disclosure is different only in that the server virtual machine 520 decodes the encoded video data, and other image copying, image movement, etc. can be performed as described in FIGS. 13A to 15C.

The description of the server virtual machine 520 decoding the encoded video data, etc. is described with reference to FIG. 16 and the subsequent figures.

Figure 16:
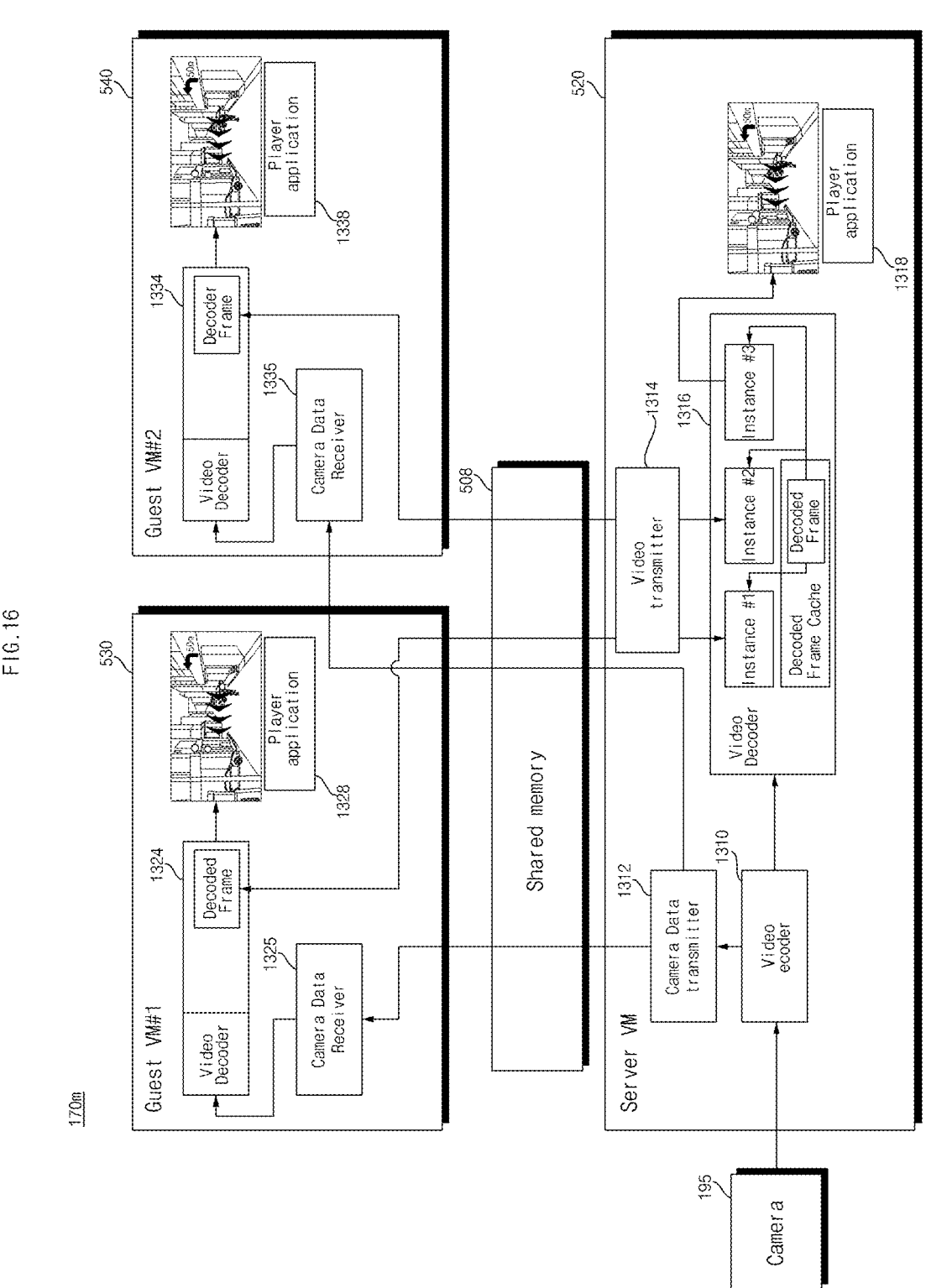

FIG. 16 is a diagram referred to for the image display of (b) of FIG. 14D.

Referring to the figure, the display apparatus 100m for a vehicle according to an embodiment of the present disclosure includes at least one camera 195 and the signal processing device 170 that performs signal processing of camera data from the camera.

The signal processing device 170 according to an embodiment of the present disclosure includes the processor 175 that performs signal processing for the plurality of displays 180a and 180b mounted on the vehicle and the shared memory 508.

The processor 175 according to an embodiment of the present disclosure executes the server virtual machine 520 and the plurality of guest virtual machines 530 and 540 on the hypervisor 505 within the processor 175.

The encoder 1310 within the server virtual machine 520 is configured to receive camera data and encode the received camera data, and a camera data transmitter 1312 within the server virtual machine 520 transmits the encoded camera data to the shared memory 508.

The decoder 1310 within the server virtual machine 520 decodes the encoded camera data, and the camera data transmitter 1312 within the server virtual machine 520 transmits the decoded camera data to the shared memory 508.

Meanwhile, the camera data decoded within the server virtual machine 520 can be transmitted to a player application 1318 so that a camera image 1520 can be displayed on the first display 180a as shown in FIG. 15B.

The camera data receiver 1325 in the first guest virtual machine 530 can be configured to receive the encoded camera data stored in the shared memory 508, and the decoder 1324 can decode the encoded camera data.

Alternatively, the decoder 1324 in the first guest virtual machine 530 can be configured to receive decoded camera data stored in the shared memory 508, and the decoded camera data can be transmitted to the player application 1328 so that the camera image 1522 can be displayed on the second display 180b as in FIG. 15B.

A camera data receiver 1335 in the second guest virtual machine 540 can be configured to receive the encoded camera data stored in the shared memory 508, and the decoder 1334 can decode the encoded camera data.

Alternatively, the decoder 1334 in the second guest virtual machine 540 is configured to receive the decoded camera data stored in the shared memory 508, and the decoded camera data is transmitted to the player application 1338 so that the camera image 1524 can be displayed on the third display 180*m* as in FIG. 15B.

Meanwhile, unlike FIG. 16, the player application 1318 can be executed in the first guest virtual machine 530 rather than the server virtual machine 520, so that the camera image 1520 can be displayed on the first display 180*a* as in FIG. 15B.

In addition, the player application 1328 can be executed in the second guest virtual machine 540 rather than the first guest virtual machine 530, so that the camera image 1522 can be displayed on the second display 180*b* as in FIG. 15B.

In addition, the player application 1338 can be executed in the third guest virtual machine 550 rather than the second guest virtual machine 540, so that the camera image 1524 can be displayed on the third display 180*m* as in FIG. 15B.

Figure 17A:
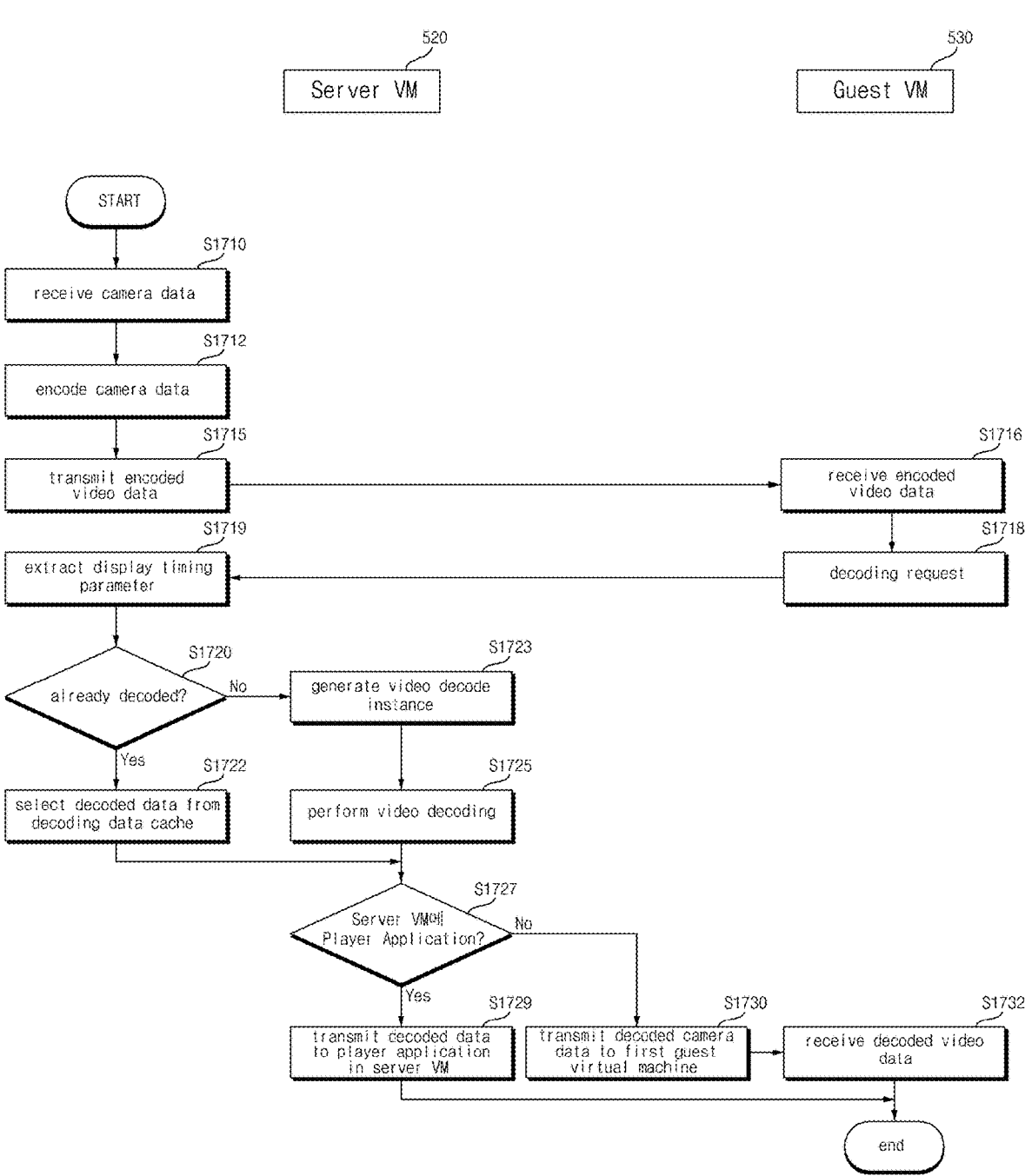
FIG. 17A is an example of an operating method of a signal processing device according to an embodiment of the present disclosure.

FIG. 17A is an example of an operating method of a signal processing device according to an embodiment of the present disclosure.

Referring to the figure, the server virtual machine 520 in the signal processing device 170 is configured to receive camera data from the camera 195 (S1710).

Next, the encoder 1310 in the server virtual machine 520 encodes the camera data (S1712), and the camera data transmitter 1312 in the server virtual machine 520 transmits the encoded camera data to the shared memory 508 (S1715).

Meanwhile, the camera data receiver 1325 in the first guest virtual machine 530 is configured to receive the encoded camera data from the shared memory 508 (S1716).

Then, the first guest virtual machine 530 transmits a decoding request for the encoded camera data (S1718). In response, the server virtual machine 520 is configured to receive the decoding request.

Next, the decoder 1316 in the server virtual machine 520 extracts a display timing parameter (S1719).

Thereafter, the decoder 1316 in the server virtual machine 520 determines whether the encoded camera data has already been decoded (S1720), and if the encoded camera data has already been decoded, the decoder 1316 in the server virtual machine 520 selects decoded camera data from a decoding data cache (S1722).

Meanwhile, in operation 1720 (S1720), if the encoded camera data has not been decoded, the decoder 1316 in the server virtual machine 520 generates a decoding instance (S1723) and performs decoding based on the decoding instance (S1725).

Next, it is determined whether the player application in the server virtual machine 520 is executed (S1727), and if it is running, the decoder 1316 in the server virtual machine 520 can transmit the decoded camera data to the player application 1318 (S1729).

Meanwhile, if the player application in the server virtual machine 520 is not executed, the decoded camera data is transmitted to the first guest virtual machine 530 (S1730), and in response, the first guest virtual machine 530 can be configured to receive the decoded camera data (S1729).

According to FIG. 17A, the camera data decoded in the server virtual machine 520 can be played and displayed through the player application 1318, or transmitted to the first guest virtual machine 530 and played and displayed through the player application 1328.

Figure 17B:
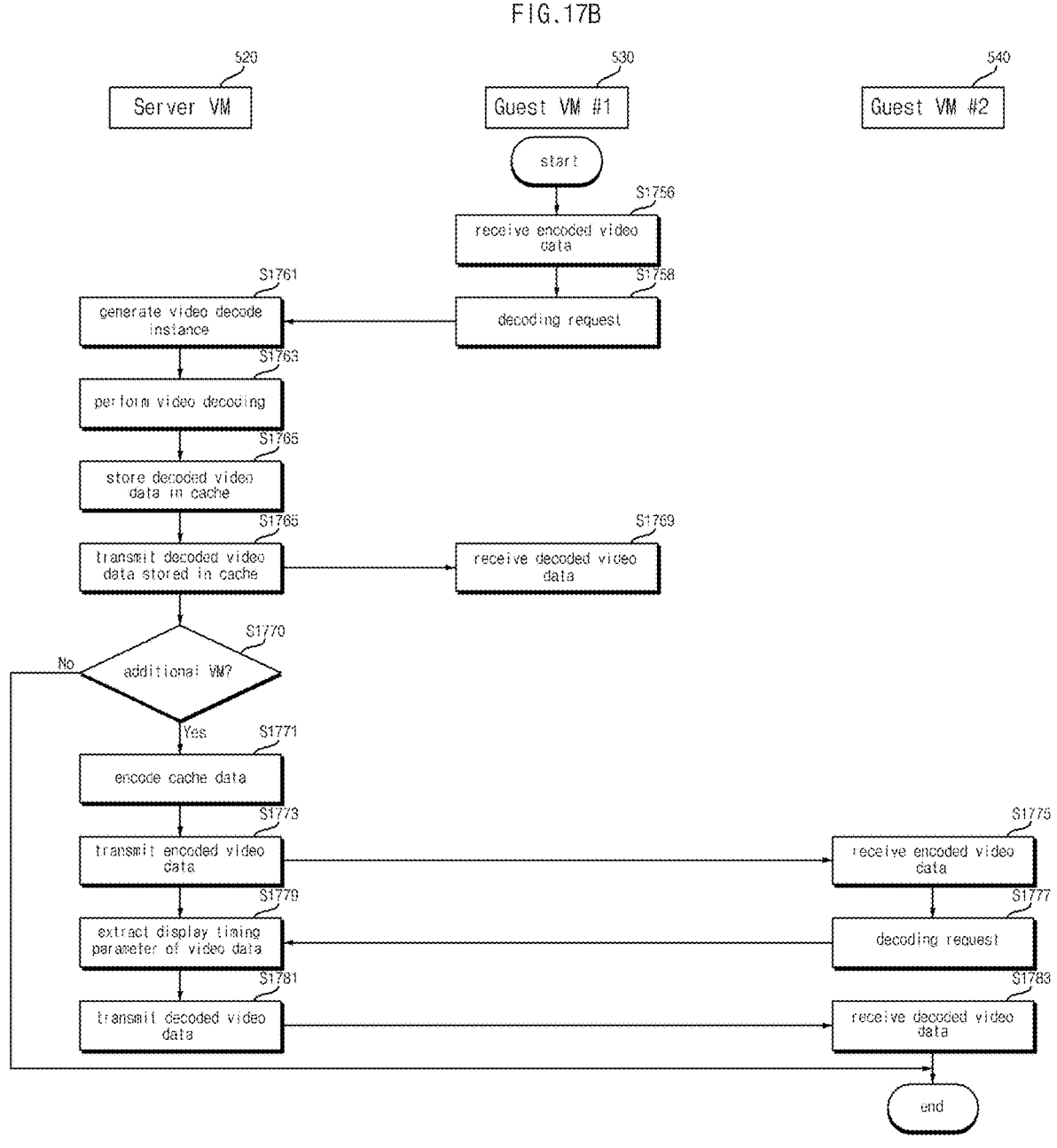
FIG. 17B is another example of an operating method of a signal processing device according to an embodiment of the present disclosure.

FIG. 17B is another example of an operating method of a signal processing device according to an embodiment of the present disclosure.

Referring to the figure, the camera data receiver 1325 in the first guest virtual machine 530 is configured to receive the encoded camera data from the shared memory 508 (S1756).

Also, the first guest virtual machine 530 transmits a decoding request for the encoded camera data (S1758). In response, the server virtual machine 520 is configured to receive the decoding request.

Next, the decoder 1316 in the server virtual machine 520 performs decoding (S1763) and stores the decoded camera data in the decoding data cache (S1765).

Next, the decoder 1316 in the server virtual machine 520 transmits the decoded camera data stored in the decoding data cache to the shared memory 508 (S1768).

In response, the first guest virtual machine 530 is configured to receive the decoded camera data through the shared memory 508 (S1769).

Meanwhile, the server virtual machine 520 determines whether there is an additional guest virtual machine to be transmitted (S1770), and if so, the encoder 1310 in the server virtual machine 520 encodes the camera data stored in the decoding data cache (S1771).

Then, the camera data transmitter 1312 in the server virtual machine 520 transmits the encoded camera data to the shared memory 508 (S1773).

In response, the camera data receiver 1335 of the second guest virtual machine 540 is configured to receive the encoded camera data through the shared memory 508 (S1775).

Then, the second guest virtual machine 540 transmits a decoding request to the server virtual machine 520 (S1777).

In response, the server virtual machine 520 can be configured to receive the decoding request and extract a display timing parameter (S1779).

Next, the decoder 1316 in the server virtual machine 520 selects decoded camera data from the decoding data cache and transmit the same to the shared memory 508 (S1781).

In response, the second guest virtual machine 540 is configured to receive the decoded camera data from the shared memory 508 (S1783).

According to FIG. 17B, since the camera data decoded in the server virtual machine 520 is transmitted to the first guest virtual machine 530 and the second guest virtual machine 540, the same camera image can be displayed on the first display 180*a* and the second display 180*b*.

Figure 18:
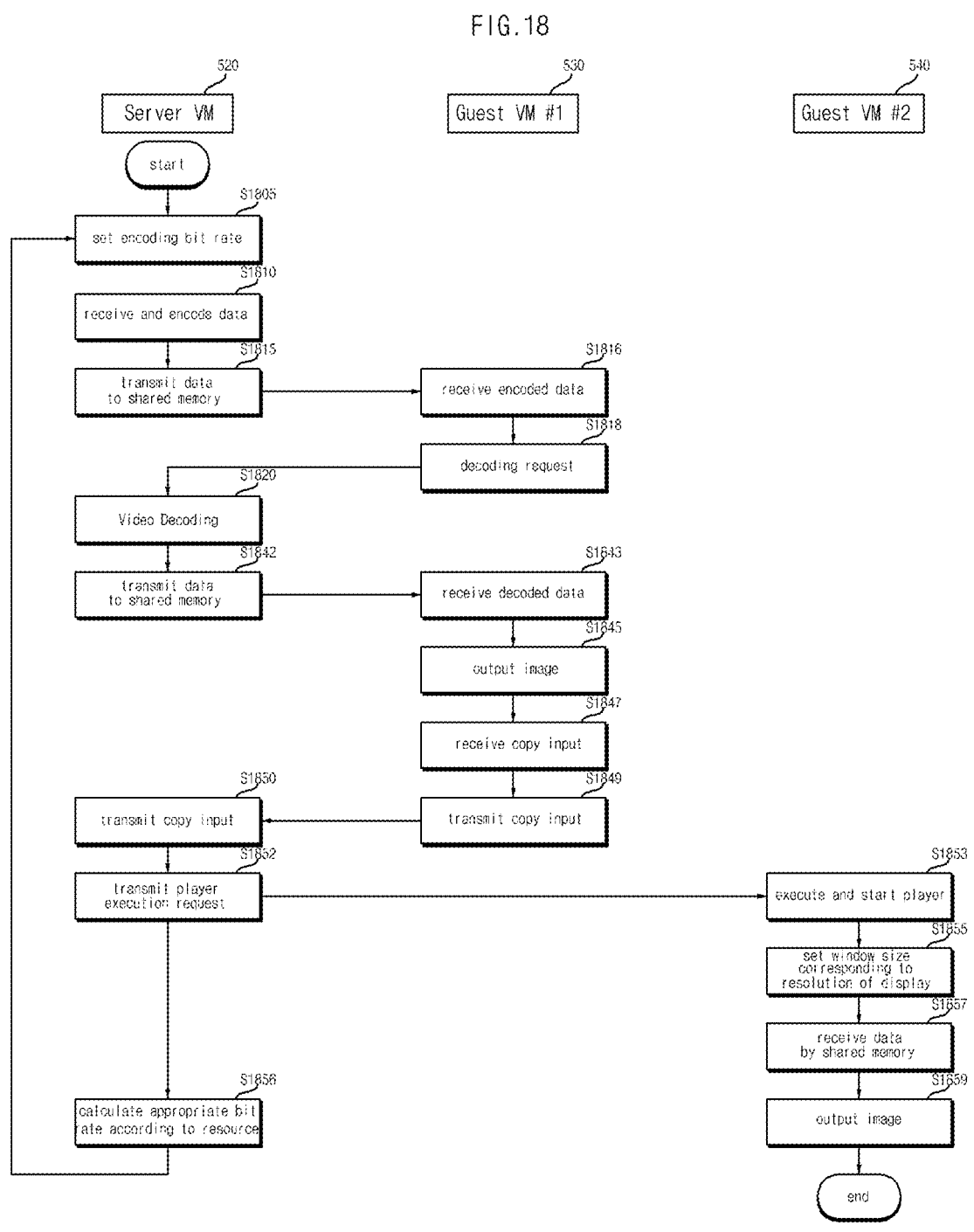
FIG. 18 is another example of an operating method of a signal processing device according to an embodiment of the present disclosure.

FIG. 18 is another example of an operating method of a signal processing device according to an embodiment of the present disclosure.

Referring to the figure, the encoder 1310 in the server virtual machine 520 sets an encoding bit rate (S1805).

Next, the encoder 1310 in the server virtual machine 520 is configured to receive camera data and encode the received camera data based on the set encoding bit rate (S1810).

The camera data transmitter 1312 in the server virtual machine 520 transmits the encoded camera data to the shared memory 508 (S1815).

The camera data receiver 1325 in the first guest virtual machine 530 is configured to receive the encoded camera data from the shared memory 508 (S1816).

Then, the first guest virtual machine 530 transmits a decoding request for the encoded camera data (S1818). In response, the server virtual machine 520 is configured to receive the decoding request.

Next, the decoder 1316 in the server virtual machine 520 is configured to perform decoding (S1823) and transmit the decoded camera data to the shared memory 508 (S1842).

In response, the first guest virtual machine 530 is configured to receive the decoded camera data through the shared memory 508 (S1843) and output camera image based on the camera data to the first display 180a (S1845).

Meanwhile, the first guest virtual machine 530 is configured to receive an image copy input through a touch input or the like (S1847) and transmit the copy input (S1849).

In response, the server virtual machine 520 is configured to receive the copy input (S1850) and transmit a player application execution request to the second guest virtual machine 540 (S1852).

In response, the second guest virtual machine 540 is configured to receive the player application execution request and executes the player application (S1853).

Next, the second guest virtual machine 540 sets a size of the second display 180b, an output resolution, or a window size corresponding to the operating system (S1855).

Then, the second guest virtual machine 540 is configured to receive the decoded camera data through the shared memory 508 (S1857), and output a camera image based on the camera data to the second display 180b to correspond to the set window size (S1859).

In particular, the second guest virtual machine 540 can be configured to output the scaled camera image to the second display 180b based on the size of the second display 180b, the output resolution, or the operating system. Accordingly, the image corresponding to the resolution of each display can be displayed with reduced delay.

Meanwhile, the server virtual machine 520 calculates an appropriate bit rate according to resource of the camera data (S1856).

Based on the calculated bit rate, the encoder 1310 in the server virtual machine 520 can re-set the encoding bit rate (S1805).

FIGS. 19A to 19E are diagrams referred to in the description of an operation of FIGS. 17A to 18.

Figure 19A:
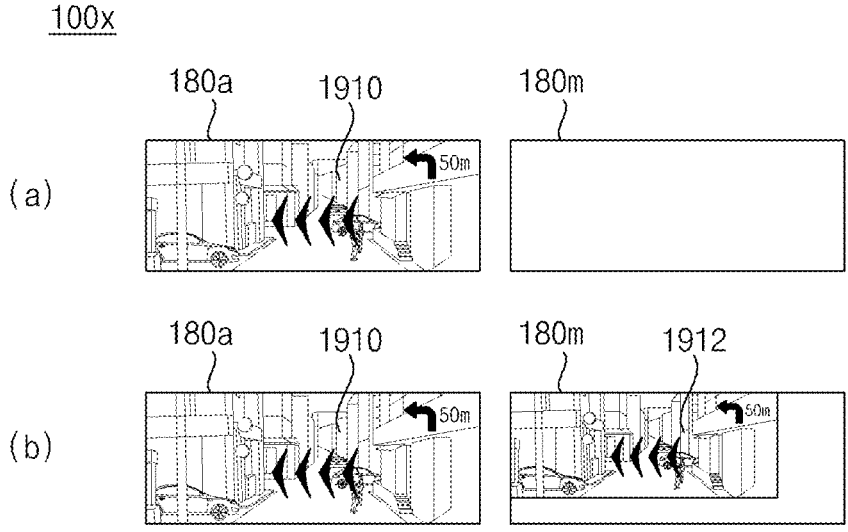
FIGS. 19A to 19E are diagrams referred to in the description of an operation of FIGS. 17A to 18.

FIG. 19A is a diagram illustrating an example of image copying in the display apparatus 100x for a vehicle related to the present disclosure.

The signal processing device 170x related to the present disclosure can be configured to display a first image 1910 on the first display 180a as in (a) of FIG. 19A, and when there is an image copy input, the signal processing device 170x can be configured to display a first image 1910 on the first display 180a and display a copied image 1912 on the third display 180m as in (b) of FIG. 19A.

At this time, if an output resolution of the third display 180m is greater than an output resolution of the first display 180a, a margin occurs in a portion of the third display 180m as in (b) of FIG. 19A.

Accordingly, the signal processing device 100 according to an embodiment of the present disclosure performs scaling, etc. according to an output resolution of the third display 180m when copying an image. This will be described with reference to FIG. 19B.

Figure 19B:
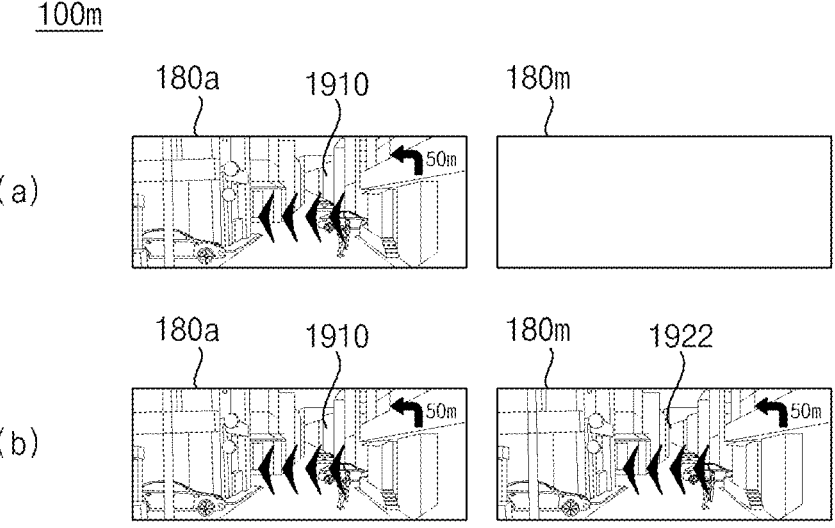

FIG. 19B is a diagram illustrating an example of image copying in the display apparatus 100m for a vehicle according to an embodiment of the present disclosure.

The signal processing device 170 according to an embodiment of the present disclosure can display the first image 1910 on the first display 180a as shown in (a) of FIG. 19B, and when there is an image copy input, the signal processing device 170 can be configured to display the first image 1910 on the first display 180a and display a copied image 1922 on the third display 180m as shown in (b) of FIG. 19B.

At this time, when an output resolution of the third display 180m is greater than an output resolution of the first display 180a, as shown in (b) of FIG. 19A, the signal processing device 170 performs scaling corresponding to the output resolution of the third display 180m and provides control so that no margin occurs in a portion of the third display 180m. Accordingly, the image copying is performed to correspond to the output resolution of the third display 180m.

Figure 19C:
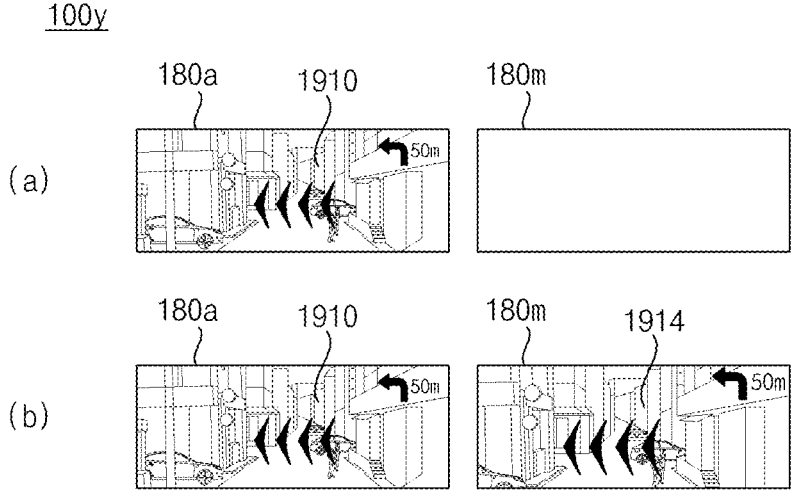

FIG. 19C is a diagram illustrating another example of image copying in a display apparatus 100y for a vehicle related to the present disclosure.

The signal processing device 170y related to the present disclosure can display the first image 1910 on the first display 180a as in (a) of FIG. 19C, and then, when there is an image copy input, the signal processing device 170y can be configured to display the first image 1910 on the first display 180a and display a copied image 1914 on the third display 180m as in (b) of FIG. 19C.

At this time, when the output resolution of the third display 180m is lower than the output resolution of the first display 180a, only a portion of the first image 1910 is displayed on the third display 180m and the other portion is not displayed as in (b) of FIG. 19C.

Accordingly, the signal processing device 100 according to an embodiment of the present disclosure performs scaling, etc. according to the resolution of the output resolution of the third display 180m when copying an image. This will be described with reference to FIG. 19D.

Figure 19D:
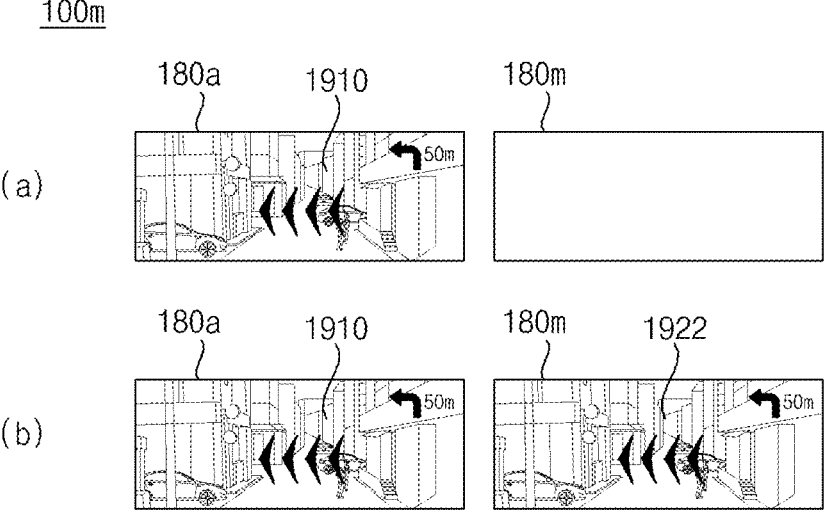

FIG. 19D is a diagram illustrating another example of image copying in the display apparatus 100m for a vehicle according to an embodiment of the present disclosure.

The signal processing device 170 according to an embodiment of the present disclosure can display of the first image 1910 on the first display 180a as in (a) of FIG. 19D, and when there is an image copy input, the signal processing device 170 can be configured to display of the first image 1910 on the first display 180a and display the copied image 1922 on the third display 180m as in (b) of FIG. 19D.

At this time, if the output resolution of the third display 180m is lower than the output resolution of the first display 180a, as in (b) of FIG. 19C, the signal processing device 170 performs scaling, etc. corresponding to the output resolution of the third display 180m so that the entire area of the first image 1910 is displayed on the third display 180m without being cut off. Accordingly, image copying is performed to correspond to the output resolution of the third display 180m.

Figure 19E:
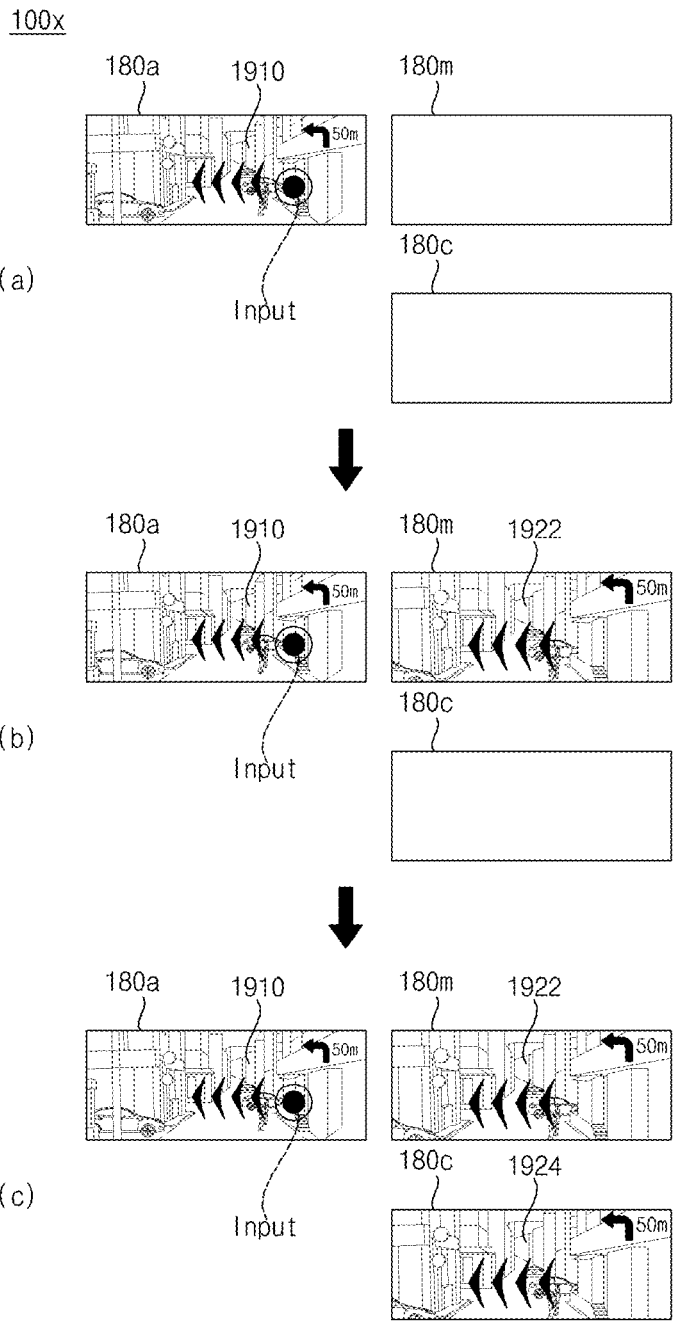

FIG. 19E is a diagram illustrating that image copying is performed sequentially in the display apparatus 100m for a vehicle according to an embodiment of the present disclosure.

The signal processing device 170 according to an embodiment of the present disclosure can display the first image 1910 on the first display 180a at the first time point as in (a) of FIG. 19E, and, when there is an image copy input, the signal processing device 170 can display the first image 1910 on the first display 180a and display the copied image 1922 on the third display 180m at the second time point after the first time point as in (b) of FIG. 19E.

Meanwhile, the signal processing device 170 according to an embodiment of the present disclosure can display the first image 1910 on the first display 180a and display the copied image 1922 on the third display 180m at the second time point as shown in (b) of FIG. 19E, and then, if there is an image copy input, the signal processing device 170 can display the first image 1910 on the first display 180a, display the copied image 1922 on the third display 180m, and display a copied image 1924 on the RSE display 180c at the third time point after the second time point as shown in (c) of FIG. 19E. Accordingly, image copying can be performed sequentially.

Figure 20:
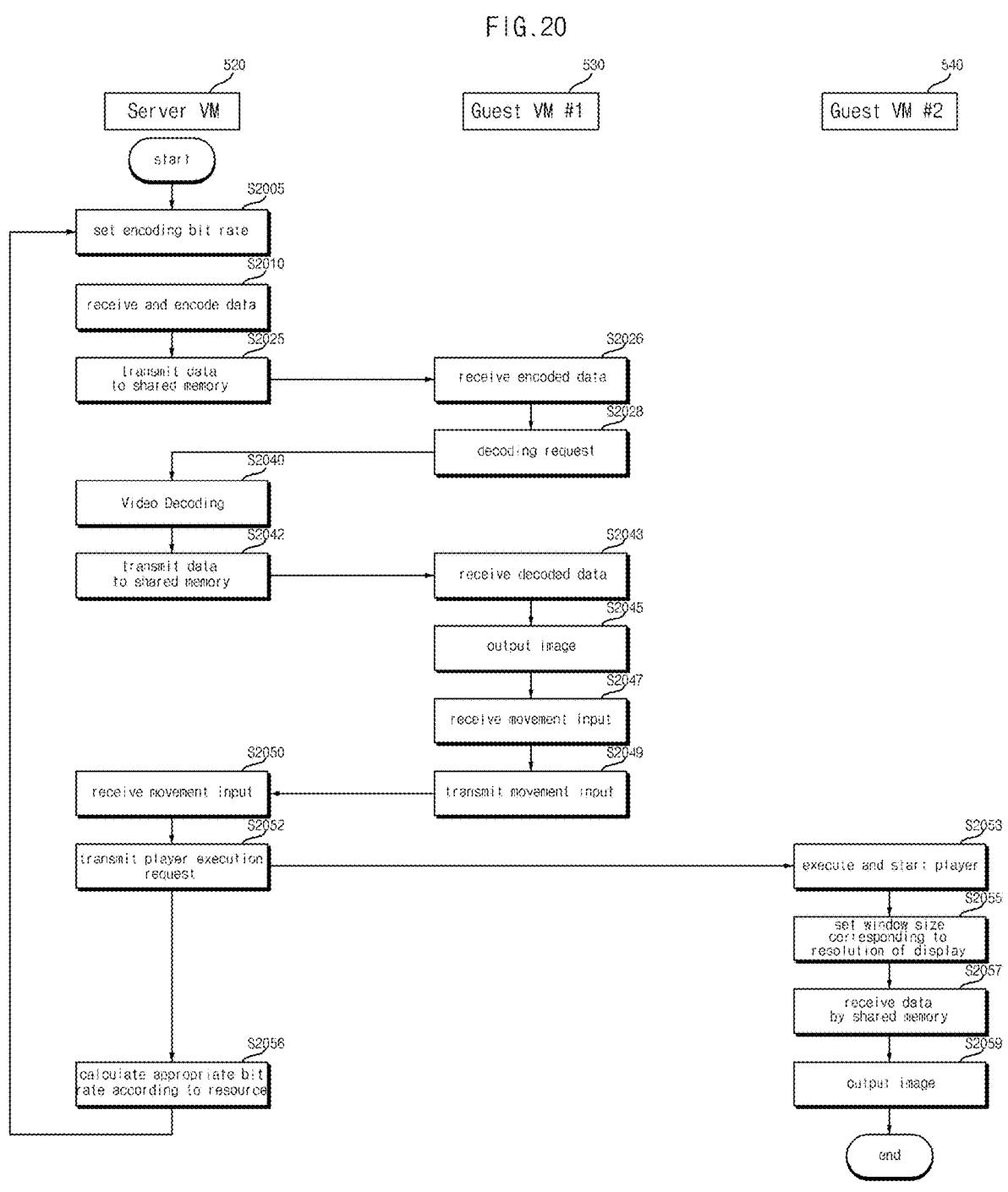
FIG. 20 is another example of an operating method of a signal processing device according to an embodiment of the present disclosure.

FIG. 20 is another example of an operating method of the signal processing device according to an embodiment of the present disclosure.

Referring to the figure, the encoder 1310 in the server virtual machine 520 sets an encoding bit rate (S2005).

Next, the encoder 1310 in the server virtual machine 520 is configured to receive camera data and encode the received camera data based on the set encoding bit rate (S2010).

The camera data transmitter 1312 in the server virtual machine 520 transmits the encoded camera data to the shared memory 508 (S2025).

The camera data receiver 1325 in the first guest virtual machine 530 is configured to receive the encoded camera data from the shared memory 508 (S2026).

Also, the first guest virtual machine 530 transmits a decoding request for the encoded camera data (S2028). In response, the server virtual machine 520 is configured to receive the decoding request.

Next, the decoder 1316 in the server virtual machine 520 is configured to perform decoding (S2040) and transmit the decoded camera data to the shared memory 508 (S2042).

In response, the first guest virtual machine 530 is configured to receive the decoded camera data through the shared memory 508 (S2043) and output a camera image based on the camera data to the first display 180a (S2045).

Meanwhile, the first guest virtual machine 530 is configured to receive an image movement input through a touch input, etc. (S2047) and transmit the movement input (S2049).

In response, the server virtual machine 520 is configured to receive a movement input (S2050) and transmit a player application execution request to the second guest virtual machine 540 (S2052).

In response, the second guest virtual machine 540 is configured to receive the player application execution request and executes the player application (S2053).

Next, the second guest virtual machine 540 sets the size of the second display 180b, the output resolution, or the window size corresponding to the operating system (S2055).

Then, the second guest virtual machine 540 is configured to receive the decoded camera data through the shared memory 508 (S2057) and output a camera image based on the camera data to the second display 180b in response to the set window size (S2059).

In particular, the second guest virtual machine 540 can be configured to output the scaled camera image to the second display 180b based on the size, output resolution, or operating system of the second display 180b. Accordingly, the image corresponding to the resolution of each display can be moved and displayed with reduced delay.

Meanwhile, the server virtual machine 520 calculates an appropriate bit rate according to resource of the camera data (S2056).

Based on the calculated bit rate, the encoder 1310 in the server virtual machine 520 can set the encoding bit rate again (S2005).

FIGS. 21A to 21E are diagrams referred to in the description of an operation of FIG. 20.

Figure 21A:
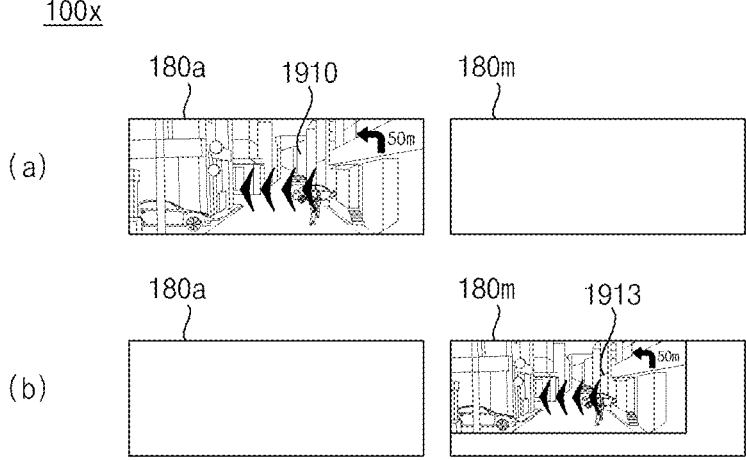
FIGS. 21A to 21F are diagrams referred to in the description of an operation of FIG. 20.

FIG. 21A is a diagram illustrating an example of image movement in the display apparatus 100x for a vehicle related to the present disclosure.

The signal processing device 170x related to the present disclosure can display of the first image 1910 on the first display 180a, and then, when there is an image movement input, the signal processing device 170x can be configured to display the moved image 1912 on the third display 180m as shown in (a) of FIG. 21A.

At this time, when the output resolution of the third display 180m is greater than the output resolution of the first display 180a, a margin can occur in a portion of the third display 180m as shown in (b) of FIG. 21A.

Accordingly, the signal processing device 100 according to an embodiment of the present disclosure performs scaling, etc. according to the resolution of the output resolution of the third display 180m when the image is moved. This will be described with reference to FIG. 21B.

FIGS. 21A to 21F are diagrams referred to in the description of an operation of FIG. 20.

Figure 21B:
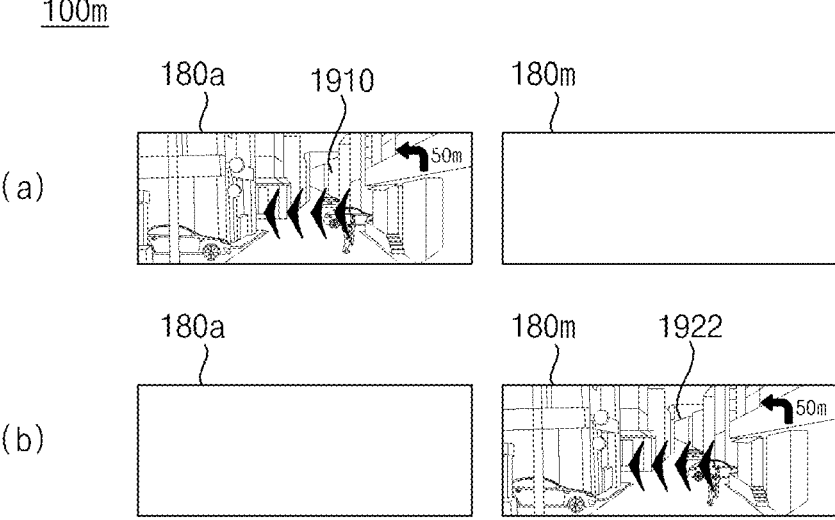

FIG. 21B is a diagram illustrating an example of image movement in the display apparatus 100m for a vehicle according to an embodiment of the present disclosure.

The signal processing device 170 according to an embodiment of the present disclosure can display the first image 1910 on the first display 180a as in (a) of FIG. 21B, and then, when there is an image movement input, the signal processing device 170 can be configured to display the moved image 1922 on the third display 180m as in (b) of FIG. 21B.

At this time, if the output resolution of the third display 180m is greater than the output resolution of the first display 180a, the signal processing device 170 etc. performs scaling, corresponding to the output resolution of the third display 180m so that no margin occurs in a portion of the third display 180m as in (b) of FIG. 21A. Accordingly, the image movement is performed in response to the output resolution of the third display 180m.

Figure 21C:
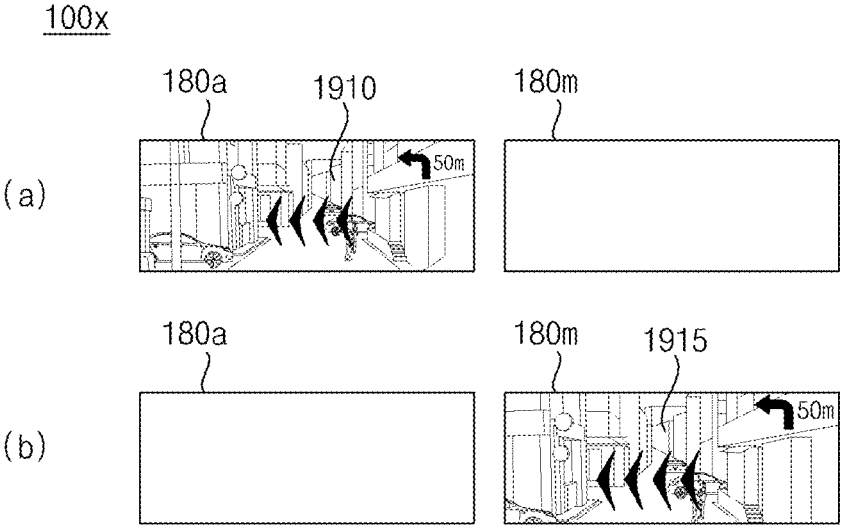

FIG. 21C is a diagram illustrating another example of image movement in the display apparatus 100y for a vehicle related to the present disclosure.

The signal processing device 170y related to the present disclosure can display of the first image 1910 on the first display 180a as in (a) of FIG. 21C, and then, when there is an image movement input, the signal processing device 170y can be configured to display the moved image 1914 on the third display 180m as in (b) of FIG. 21C.

At this time, if the output resolution of the third display 180m is lower than the output resolution of the first display 180a, only a portion of the first image 1910 is displayed on the third display 180m and the other portion is not displayed as in (b) of FIG. 21C.

Accordingly, the signal processing device 100 according to an embodiment of the present disclosure performs scaling, etc. according to the resolution of the output resolution of the third display 180m when moving the image. This is described with reference to FIG. 21D.

Figure 21D:
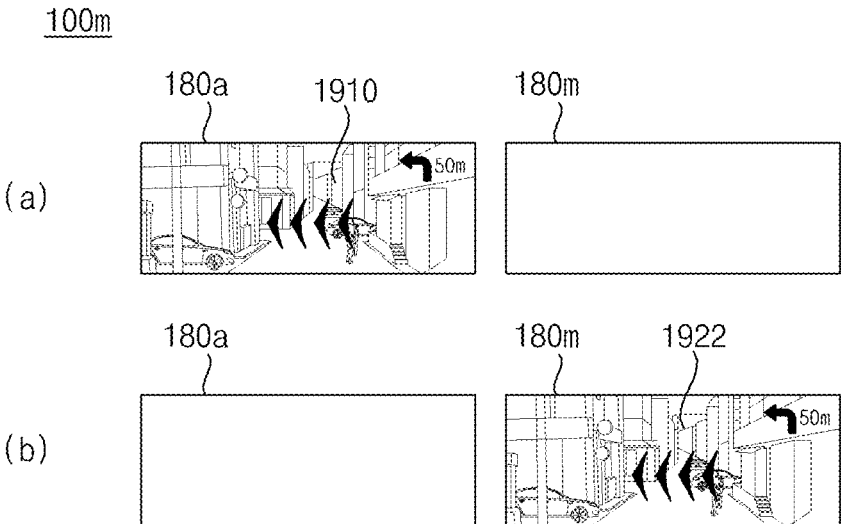

FIG. 21D is a diagram illustrating another example of image movement in the display apparatus 100m for a vehicle according to an embodiment of the present disclosure.

The signal processing device 170 according to an embodiment of the present disclosure can display the first image 1910 on the first display 180a as in (a) of FIG. 21D, and then, when there is an image movement input, the signal processing device 170 can display the moved image 1922 on the third display 180m as in (b) of FIG. 21D.

At this time, if the output resolution of the third display 180m is lower than the output resolution of the first display 180a, the signal processing device 170 performs scaling, etc. corresponding to the output resolution of the third display 180m, so that the entire area of the first image 1910 is displayed on the third display 180m without being cut off as in (b) of FIG. 21C. Accordingly, the image movement is performed to correspond to the output resolution of the third display 180m.

Figure 21E:
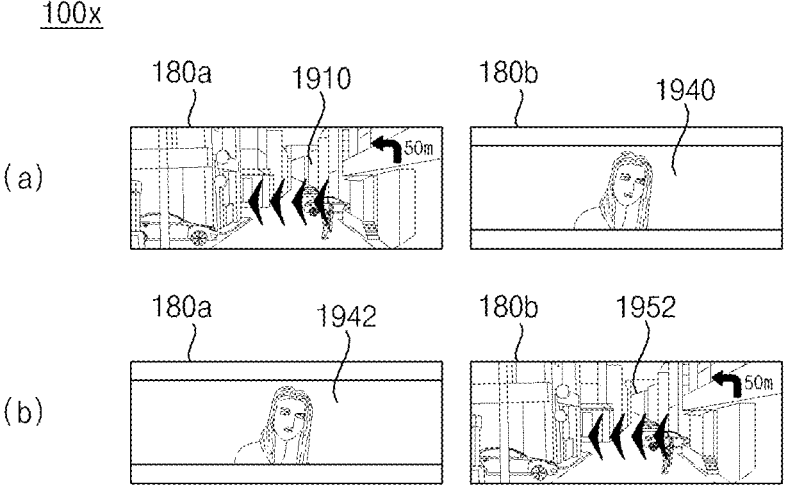

FIG. 21E is a diagram illustrating a case in which resolutions between an image and the display do not match in the display apparatus 100x for a vehicle related to the present disclosure.

As shown in (a) of FIG. 21E, when the first image 1910 is displayed on the first display 180a and the second image 1940 is displayed on the second display 180b, the second image 1940 can not match the output resolution of the second display 180b, so a margin can occur.

Meanwhile, in order to resolve the resolution mismatch of (a) of FIG. 21E, if the images are switched to be displayed, the second image 1942 can be displayed on the first display 180a and the first image 1952 can be displayed on the second display 180b as shown in (b) of FIG. 21E, but the second image 1942 can mismatch the output resolution of the first display 180a, resulting in a margin.

Figure 21F:
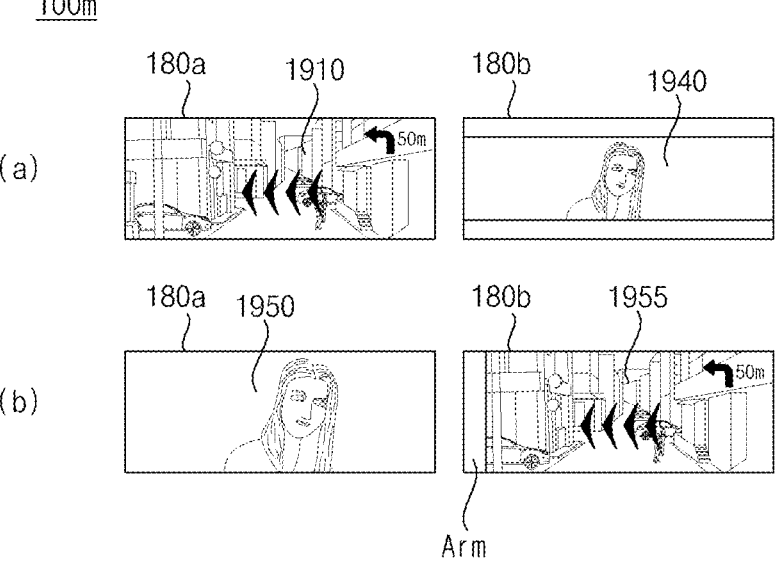

FIG. 21F is a diagram illustrating that the resolutions between an image in the display apparatus 100m for a vehicle and the display match according to an embodiment of the present disclosure.

Referring to the figure, as in (a) of FIG. 21F, when the first image 1910 is displayed on the first display 180a and a second image 1940 is displayed on the second display 180b, the second image 1940 does not match the output resolution of the second display 180b, resulting in a margin.

Accordingly, in order to resolve the resolution mismatch of (a) of FIG. 21F, the display apparatus 100m for a vehicle according to an embodiment of the present disclosure can replace the image to be displayed so that a portion of the second image 1950 is displayed on the first display 180a and the remaining portion Arm is displayed on the second display 180b in consideration of the output resolution of the display.

That is, the second guest virtual machine 540 can be configured to receive the decoded video data stored in the shared memory 508 and display at least a portion of the decoded video data on the second display 180b.

Meanwhile, the first image 1955 can also be displayed on the second display 180b. Accordingly, both the first image and the second image can be displayed on the plurality of displays.

Figure 22:
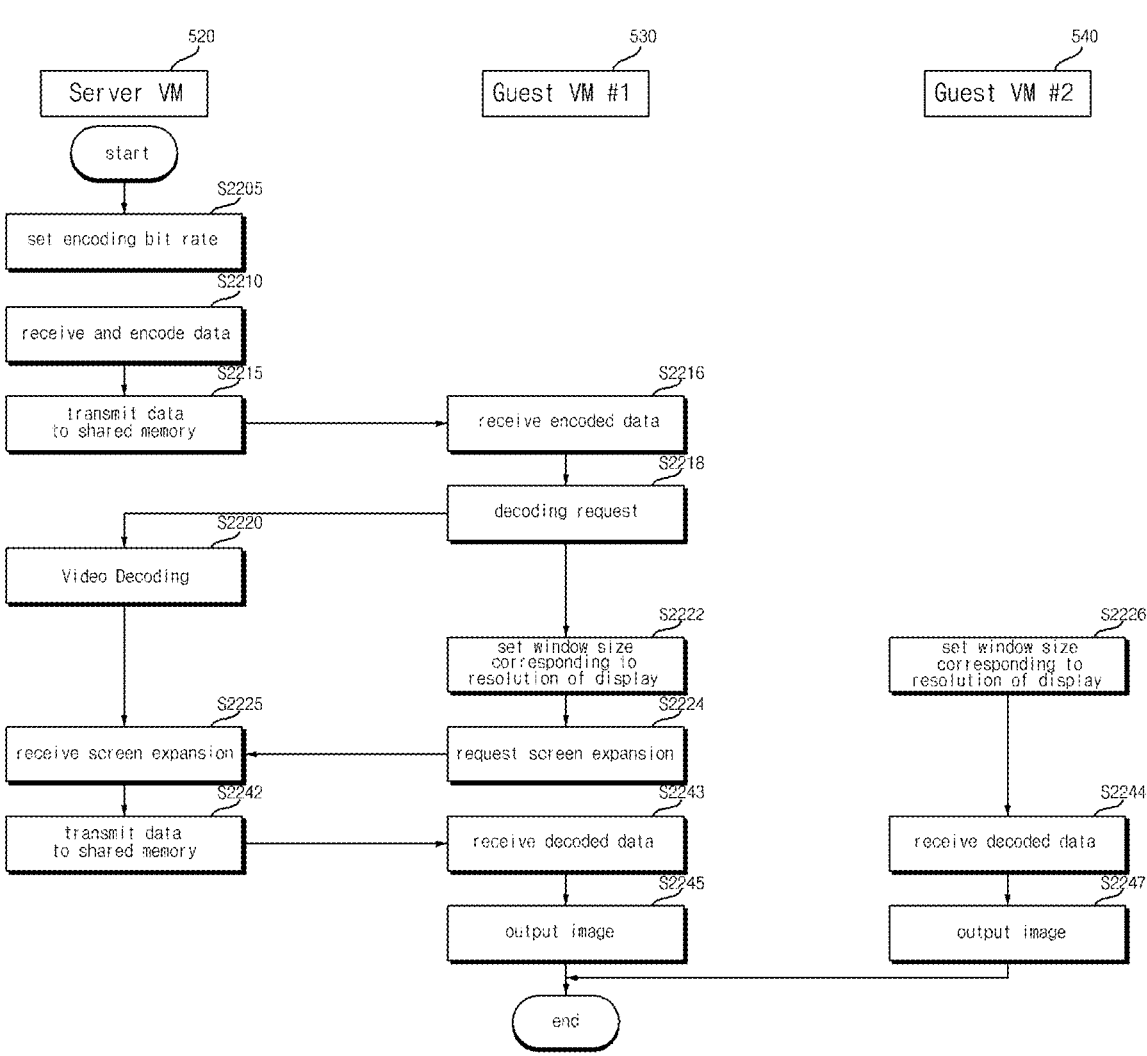
FIG. 22 is another example of an operating method of a signal processing device according to an embodiment of the present disclosure.

FIG. 22 is another example of an operating method of a signal processing device according to an embodiment of the present disclosure.

Referring to the figure, the encoder 1310 in the server virtual machine 520 sets an encoding bit rate (S2205).

Next, the encoder 1310 in the server virtual machine 520 is configured to receive camera data and encode the received camera data based on the set encoding bit rate (S2210).

The camera data transmitter 1312 in the server virtual machine 520 transmits the encoded camera data to the shared memory 508 (S2215).

The camera data receiver 1325 in the first guest virtual machine 530 is configured to receive the encoded camera data from the shared memory 508 (S2216).

Then, the first guest virtual machine 530 transmits a decoding request for the encoded camera data (S2218). In response, the server virtual machine 520 is configured to receive the decoding request.

Next, the decoder 1316 in the server virtual machine 520 performs decoding (S2220).

Meanwhile, the first guest virtual machine 530 sets a window size corresponding to the output resolution of the first display 180a (S2222). Also, the first guest virtual machine 530 transmits a screen expansion request to the server virtual machine 520 to correspond to the window size (S2224).

In response, the server virtual machine 520 is configured to receive the screen expansion request (S2225).

Next, the server virtual machine 520 is configured to expand the decoded camera data and transmit the expanded decoded camera data to the shared memory 508 (S2242).

In response, the first guest virtual machine 530 can be configured to receive the extended decoded camera data from the shared memory 508 and display the image on the first display 180a (S2245).

Meanwhile, the second guest virtual machine 540 sets the window size corresponding to the output resolution of the second display 180b (S2226). Also, the second guest virtual machine 540 can transmit a screen request to the server virtual machine 520 to correspond to the window size.

The second guest virtual machine 540 can be configured to receive the decoded camera data from the shared memory 508 (S2244) and display the image on the second display 180b (S2247). Accordingly, images 1950 and 1955 such as in (b) of FIG. 21E can be displayed on the first display 180a and the second display 180b, respectively.

Figure 23A:
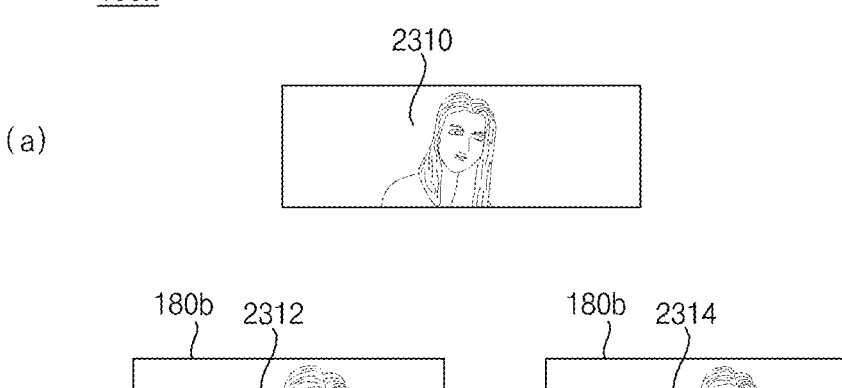
FIGS. 23A to 23B are diagrams referred to in the description of an operation of FIG. 22.
Figure 23B:
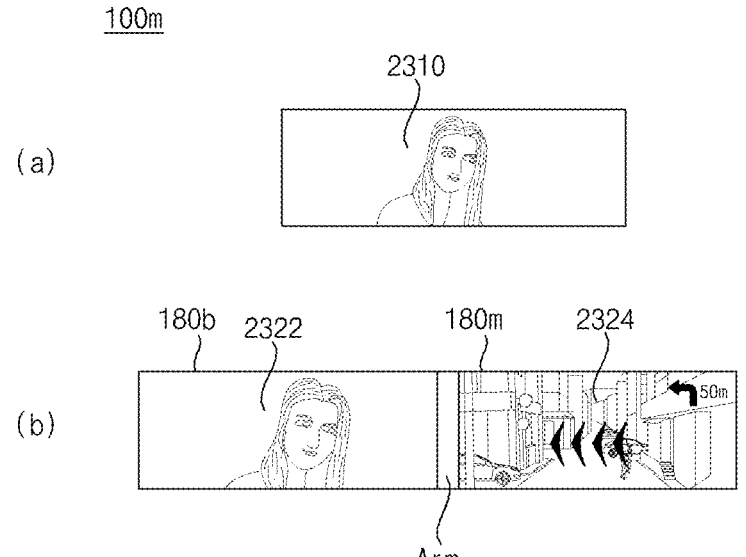

FIGS. 23A and 23B are diagrams referred to in the description of the operation of FIG. 22.

FIG. 23A is a diagram illustrating an example of image display in the display apparatus 100x for a vehicle related to the present disclosure.

The signal processing device 170x related to the present disclosure can be configured to display a first image 2310 as in (a) of FIG. 23A as a partially cut image 2312 on the first display 180a or as an image 2314 with a changed screen ratio, such as the second display 180b.

Therefore, the signal processing device 100 according to an embodiment of the present disclosure performs image enlargement, scaling, etc., considering the resolution of the image and the output resolution of each display.

FIG. 23B is a diagram illustrating an example of image display in the display apparatus 100m for a vehicle according to an embodiment of the present disclosure.

The signal processing device 170 according to an embodiment of the present disclosure can be configured to display the first image 2310 as in (a) of FIG. 23B in a portion of the first display 180a and the second display 180b, and display a second image 2324 on a remaining area of the second display 180b. Accordingly, since an image is displayed across the plurality of displays 180a and 180b, it is possible to control the image so that a portion of the image is not deleted.

It will be apparent that, although the preferred embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. A signal processing device comprising a processor configured to perform signal processing for a plurality of displays mounted in a vehicle, wherein:

the processor is configured to execute a server virtual machine and a plurality of guest virtual machines on a hypervisor within the processor, a first guest virtual machine and a second guest virtual machine among the plurality of guest virtual machines operate for a first display and a second display, respectively, the server virtual machine is configured to encode processed video data and store the encoded video data in a shared memory, the first guest virtual machine is configured to receive and decode the encoded video data stored in the shared memory, store decoded video data in the shared memory, and, in an extended-display mode of the plurality of displays, display a first area image corresponding to a first portion of the decoded video data on the first display among the plurality of displays, the second guest virtual machine is configured to receive the decoded video data stored in the shared memory and, in the extended-display mode, display a second area image corresponding to a second portion of the decoded video data on the second display among the plurality of displays, and the decoding of the encoded video data is performed once through the first guest virtual machine.

2. The signal processing device of claim 1, wherein, in a copy-and-display mode:

the first guest virtual machine is configured to display a first image on the first display at a first time point, and the second guest virtual machine is configured to display a second image corresponding to the first image on the second display at a second time point after the first time point.

3. The signal processing device of claim 1, wherein, in a copy-and-display mode, the first guest virtual machine is configured to display a first image on the first display at a first time point and at a second time point after the first time point, and wherein the second guest virtual machine is configured to display a second image on the second display at the second time point, corresponding to the first image.

4. The signal processing device of claim 2, wherein the second guest virtual machine is configured to output a scaled second image to the second display based on a size, output resolution or operating system of the second display.

5. The signal processing device of claim 1, wherein a third guest virtual machine among the plurality of guest virtual machines operates for a third display, and wherein the third guest virtual machine is configured to receive the decoded video data stored in the shared memory and, in the extended-display mode, display a third area image corresponding to a third portion of the decoded video data on the third display.

6. The signal processing device of claim 5, wherein the second guest virtual machine and the third guest virtual machine share a portion of the shared memory in which the decoded video data is stored.

7. The signal processing device of claim 5, wherein, in a copy-and-display mode:

the first guest virtual machine is configured to display a first image on the first display at a first time point, the second guest virtual machine is configured to display a second image corresponding to the first image on the second display at a second time point after the first time point, and the third guest virtual machine is configured to display a third image corresponding to the first image on the third display at a third time point after the second time point.

8. The signal processing device of claim 5, wherein, in a copy-and-display mode, the first guest virtual machine is configured to display a first image on the first display at a first time point, a second time point after the first time point, and a third time point after the second time point, the second guest virtual machine is configured to display a second image corresponding to the first image on the second display at the second time point and the third time point, and the third guest virtual machine is configured to display the third image corresponding to the first image on the third display at the third time point.

9. A signal processing device comprising a processor configured to perform signal processing for a plurality of displays mounted in a vehicle, wherein:

the processor is configured to execute a server virtual machine and a plurality of guest virtual machines on a hypervisor within the processor, a first guest virtual machine and a second guest virtual machine among the plurality of guest virtual machines operate for a first display and a second display, respectively, the server virtual machine is configured to encode processed video data and store the encoded video data in a shared memory, the first guest virtual machine is configured to receive the encoded video data stored in the shared memory and transmit a decoding request to the server virtual machine, the server virtual machine is configured to decode the encoded video data based on the decoding request and store the decoded video data in the shared memory, the first guest virtual machine is configured to receive the decoded video data stored in the shared memory and, in an extended-display mode of the plurality of displays, display a first area image corresponding to a first portion of the decoded video data on the first display among the plurality of displays, the second guest virtual machine is configured to receive the decoded video data stored in the shared memory and, in the extended-display mode, display a second area image corresponding to a second portion of the decoded video data on the second display, and the decoding of the encoded video data is performed once through the server virtual machine.

10. The signal processing device of claim 9, wherein, in a copy-and-display mode, the first guest virtual machine is configured to display a first image on the first display at a first time point, and wherein the second guest virtual machine is configured to display a second image corresponding to the first image on the second display at a second time point after the first time point.

11. The signal processing device of claim 9, wherein, in a copy-and-display mode, the first guest virtual machine is configured to display a first image on the first display at a first time point and at a second time point after the first time point, and wherein the second guest virtual machine is configured to display a second image on the second display at the second time point, corresponding to the first image.

12. The signal processing device of claim 10, wherein the second guest virtual machine is configured to output a scaled second image to the second display based on a size, output resolution or operating system of the second display.

13. The signal processing device of claim 9, wherein a third guest virtual machine among the plurality of guest virtual machines operates for a third display, and wherein the third guest virtual machine is configured to receive the decoded video data stored in the shared memory and, in the extended-display mode, display a third area image corresponding to a third portion of the decoded video data on the third display.

14. The signal processing device of claim 13, wherein, in a copy-and-display mode:

the first guest virtual machine is configured to display a first image on the first display at a first time point, the second guest virtual machine is configured to display a second image corresponding to the first image on the second display at a second time point after the first time point, and the third guest virtual machine is configured to display a third image corresponding to the first image on the third display at a third time point after the second time point.

15. The signal processing device of claim 13, wherein, in a copy-and-display mode:

the first guest virtual machine is configured to display a first image on the first display at a first time point, a second time point after the first time point, and a third time point after the second time point, the second guest virtual machine is configured to display a second image corresponding to the first image on the second display at the second time point and the third time point, and the third guest virtual machine is configured to display a third image corresponding to the first image on the third display at the third time point.

16. A display apparatus for a vehicle, the display apparatus comprising:

a plurality of displays; and a signal processing device comprising a processor configured to perform signal processing for the plurality of displays, wherein:

the processor is configured to execute a server virtual machine and a plurality of guest virtual machines on a hypervisor within the processor, a first guest virtual machine and a second guest virtual machine among the plurality of guest virtual machines operate for a first display and a second display, respectively, the server virtual machine is configured to encode processed video data and store the encoded video data in a shared memory, the first guest virtual machine is configured to receive and decode the encoded video data stored in the shared memory, store decoded video data in the shared memory, and, in an extended-display mode of the plurality of displays, display a first area image corresponding to a first portion of the decoded video data on the first display among the plurality of displays, the second guest virtual machine is configured to receive the decoded video data stored in the shared memory and, in the extended-display mode, display a second area image corresponding to a second portion of the decoded video data on the second display among the plurality of displays, and the decoding of the encoded video data is performed once through the first guest virtual machine.

17. The display apparatus for vehicle of claim 16, wherein, in a copy-and-display mode:

the first guest virtual machine is configured to display a first image on the first display at a first time point, and the second guest virtual machine is configured to display a second image corresponding to the first image on the second display at a second time point after the first time point.

* * * * *